United States Patent
Naitoh et al.

[11] Patent Number: 5,540,200
[45] Date of Patent: Jul. 30, 1996

[54] FUEL INJECTION VALVE

[75] Inventors: Ken Naitoh, Yokohama; Akihiro Iiyama, Zushi; Satoshi Takeyama, Yokohama; Hiroko Hishinuma, Yokohama; Yasuo Takagi, Yokohama, all of Japan

[73] Assignee: Nissan Motor Co., Ltd., Yokohama, Japan

[21] Appl. No.: 365,639

[22] Filed: Dec. 28, 1994

[30] Foreign Application Priority Data

| Dec. 28, 1993 | [JP] | Japan | 5-335712 |
| Mar. 17, 1994 | [JP] | Japan | 6-046703 |
| May 17, 1994 | [JP] | Japan | 6-101434 |
| Jun. 30, 1994 | [JP] | Japan | 6-148859 |
| Jul. 25, 1994 | [JP] | Japan | 6-171498 |

[51] Int. Cl.$^6$ .................... F02M 51/00; F02M 61/18
[52] U.S. Cl. ................ 123/299; 123/305; 123/585; 239/543; 239/544; 239/533.12; 239/585.4
[58] Field of Search ............................ 123/299, 300, 123/305, 585; 239/418, 422, 533.12, 585.1–585.5, 543, 544

[56] References Cited

U.S. PATENT DOCUMENTS

| 1,494,020 | 5/1924 | Riehm | 123/305 |
| 4,570,598 | 2/1986 | Samson et al. | 123/585 X |
| 4,621,772 | 11/1986 | Blythe et al. | 239/585.4 |
| 4,646,974 | 3/1987 | Sofianek et al. | 239/533.12 X |
| 4,699,323 | 10/1987 | Rush et al. | 239/544 |

FOREIGN PATENT DOCUMENTS

| 12316 | 8/1910 | France | 123/299 |
| 57-114163 | 7/1982 | Japan . | |
| 60-88074 | 6/1985 | Japan . | |
| 4-105967 | 9/1992 | Japan . | |
| 2002055 | 2/1979 | United Kingdom | 123/299 |

*Primary Examiner*—Tony M. Argenbright
*Attorney, Agent, or Firm*—Lowe, Price, LeBlanc & Becker

[57] ABSTRACT

A fuel injection valve includes a valve body to which liquid to be injected is supplied. A nozzle tip is connected with an end portion of the valve body. A valve member is installed in the valve body to stop and start a supply of the liquid to the nozzle tip. The nozzle tip has first and second nozzle holes which are formed so that fluid injected through the first nozzle hole is collided with fluid injected through the second nozzle hole and that a ratio between a square root of a cross-sectional area of the first nozzle hole and a square root of a cross-sectional area of the second nozzle hole is within a range 1.25 to 3.5. Therefore, the collided fuel is effectively atomized as a result of a resonance phenomenon by the collision.

17 Claims, 47 Drawing Sheets

FUEL INJECTION VALVE

BACKGROUND OF THE INVENTION

The present invention relates to improvements in a fuel injection valve for an internal combustion engine, and more particularly to a fuel injection valve which has a plurality of nozzle holes.

Various fuel injection valves have been proposed and are in practical use. A typical fuel injection valve is arranged to inject fuel through a pair of equal-size nozzle holes of a nozzle tip and to collide the fuel with each other in order to improve an atomization of fuel. However, in this field it is desired to further improve the atomization of fuel.

SUMMARY OF THE INVENTION

It is an object of the present invention to provide a fuel injection valve which improves the atomization caused by a collision of injected fuel.

It is another objection of the present invention to provide a fuel injection valve which performs a fuel injection with a high-directivity.

According to one aspect of the present invention, there is provided a liquid injection valve which comprises a valve body, a valve member and a nozzle tip including first and second nozzle hole. The valve body receives liquid to be injected. The nozzle tip is connected with an end portion of the valve body. The valve member is installed in the valve body to stop and start a supply of the liquid to the nozzle tip. The nozzle tip has first and second nozzle holes which are formed so that fluid injected from the first nozzle hole is collided with fluid injected from the second nozzle hole and that a ratio between a square root of a cross-sectional area of the first nozzle hole and a square root of a cross-sectional area of the second nozzle hole is within a range 1.25 to 3.5.

According to another aspect of the present invention, there is provided a fuel injection valve which comprises a casing, a valve body and a nozzle tip including at least three nozzle holes. The casing receives fuel to be injected. The nozzle tip is integrally connected with an end portion of said valve body. The valve member is installed in the valve body to stop and start a supply of the fuel to the nozzle tip. At least three nozzle holes in the nozzle tip are formed so that fuel injected through each of the nozzle holes is collided with fuel injected through the other of the nozzle holes and that a ratio between a square root of a cross-sectional area of at least one of the nozzle holes and a square root of a cross-sectional area of another one of the nozzle holes is larger than 1.2.

According to a further aspect of the present invention, there is provided a fuel injection valve which comprises a casing, a valve member and a nozzle tip including at least four nozzle holes. The casing receives fuel to be injected. The nozzle tip is integrally connected with an end portion of the valve body. The valve member is installed in the valve body to stop and start a supply of the fuel to the nozzle tip. At least four nozzle holes in the nozzle tip are formed so that fuel injected through each of the nozzle holes is collided with fuel injected through the other of the nozzle holes and that a cross-sectional area of at least one of the nozzle holes is different from a cross-sectional area of the other of the nozzle holes.

BRIEF DESCRIPTION OF THE DRAWINGS

In the drawings, like reference numerals designate like parts and element throughout figures; in which.

DETAILED DESCRIPTION OF THE INVENTION

Figure 1:
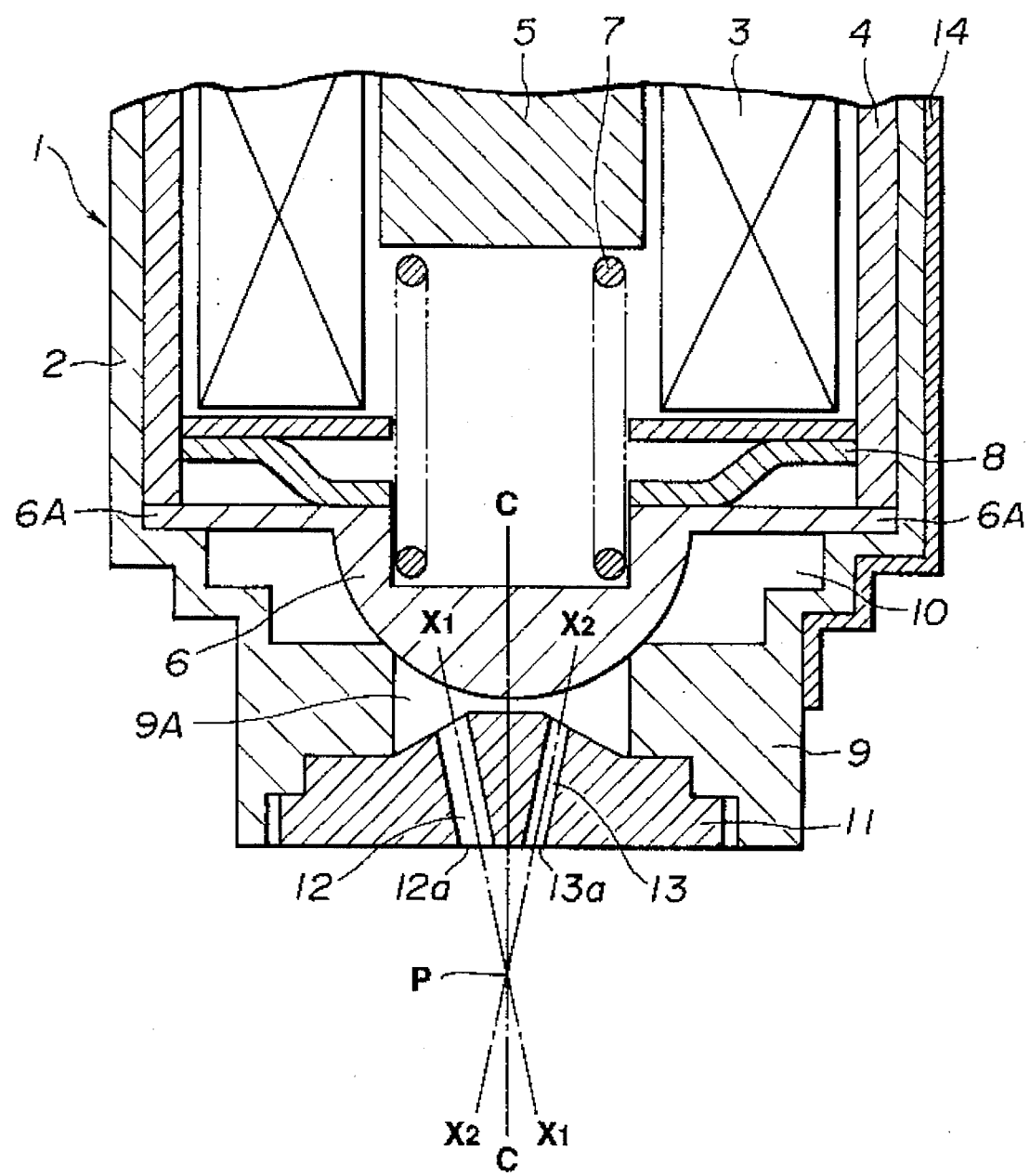
FIG. 1 is a sectional view showing an essential part of a fuel injection valve according to a first embodiment of the present invention.

Referring to the drawings, preferred embodiments of a fuel injection valve according to the present invention will be discussed hereinafter.

Referring to FIGS. 1 to 5, there is shown a first embodiment of a fuel injection value according to the present invention. The fuel injection valve comprises a valve body 1 which is disposed in an intake passage (not shown) so as to face to an intake port (not shown). As shown in FIG. 1, the valve body 1 comprises a casing 2 of a stepped cylinder. A magnetic actuator 3 including a coil is installed in the casing 2 through a yoke 4. The casing 2 is fixedly supported by a stay 14 so as to be installed in the intake passage. The magnetic actuator 3 is provided with a space thereinside, and a columnar core 5 made of magnetic material is disposed in the space. A generally semi-spherical valve plug 6 made of a magnetic material is disposed in the space of the casing 2. The valve plug 6 is integrally connected at its peripheral end with a supporting member 6A. An outer peripheral end of the supporting member 6A is fixedly put between the yoke 4 and the casing 2. The valve body 6 is biased by a coil spring 7 and a plate spring 8 so as to put the fuel injection valve into a normal closed position. When the magnetic actuator 6 is energized upon receipt of a signal from a controller (not shown), the valve plug 6 is moved by the core 5 so as to be separated from a valve sheet portion 9. The valve plug 6 is moved generally along an axis C of the valve body 1.

Figure 2:
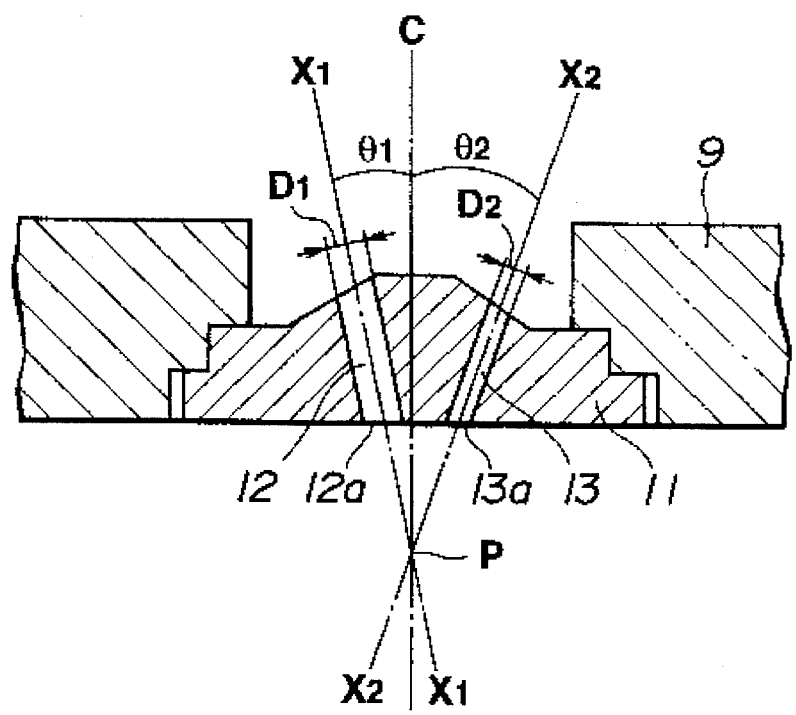
FIG. 2 is an enlarged sectional view which shows nozzle holes of a nozzle tip.
Figure 3:
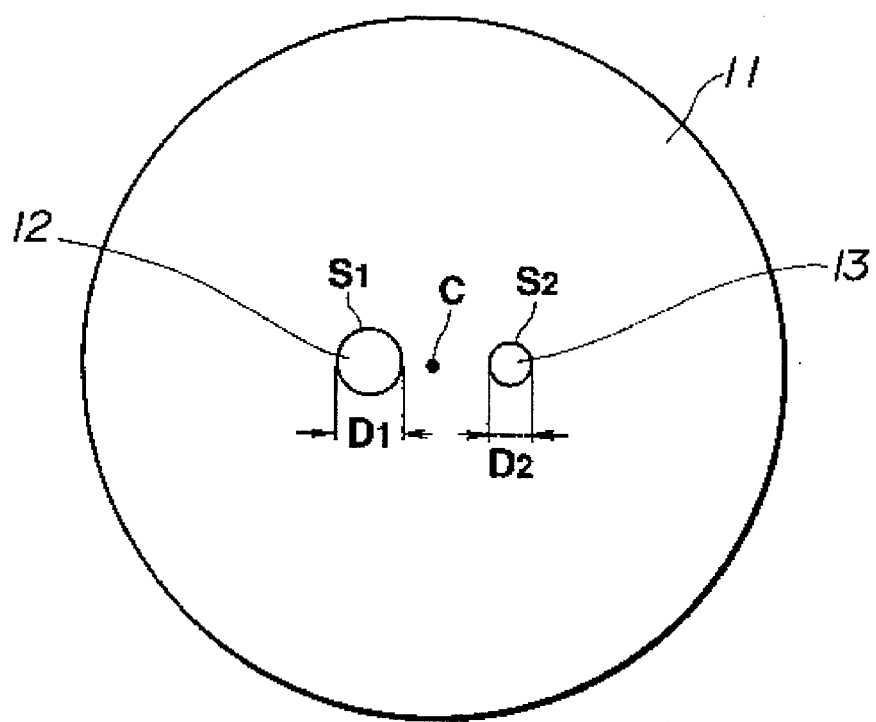
FIG. 3 is an enlarged plan view as viewed from a lower side in FIG. 2.

The valve sheet portion 9 is formed at a tip end portion of the casing 2. A nozzle tip 11 is sealingly connected to an end portion of the valve sheet portion 9 of the casing 2. The nozzle tip 11 has a first nozzle hole 12 and a second nozzle hole 13. As shown in FIGS. 2 and 3, the first nozzle hole 12 is formed straight and circular. An outlet end 12A of the first nozzle hole 12 has a diameter $D_1$ and a cross-sectional area $S_1$. The second nozzle hole 13 is also formed straight and circular. An outlet end 13A of the second nozzle hole 13 has a diameter $D_2$ and a cross-sectional area $S_2$. The diameter $D_1$ is formed larger than the diameter $D_2$. An axis $X_1$ of the first nozzle hole 12 forms an angle $\theta_1$ with an axis C of the valve body 1. On the other hand, an axis $X_2$ of the second nozzle hole 13 forms an angle $\theta_2$ with the axis C. The axes $X_1$ and $X_2$ intersect at a point P on the axis C. The first and second nozzle holes 12 and 13 are formed so that the ratio $\alpha$ between a square root of a cross-sectional area $S_1$ and a square root of a cross-sectional area $S_2$ is in the range of 1.25–3.50. That is, the relationship is defined as follows:

$$1.25 \leq \alpha = (S_1)^{1/2}(S_2)^{1/2} \leq 3.50.$$

In this embodiment, the ratio $\alpha$ is set at 1.50.

The manner of operation of the first embodiment will be discussed hereinafter.

Figure 4:
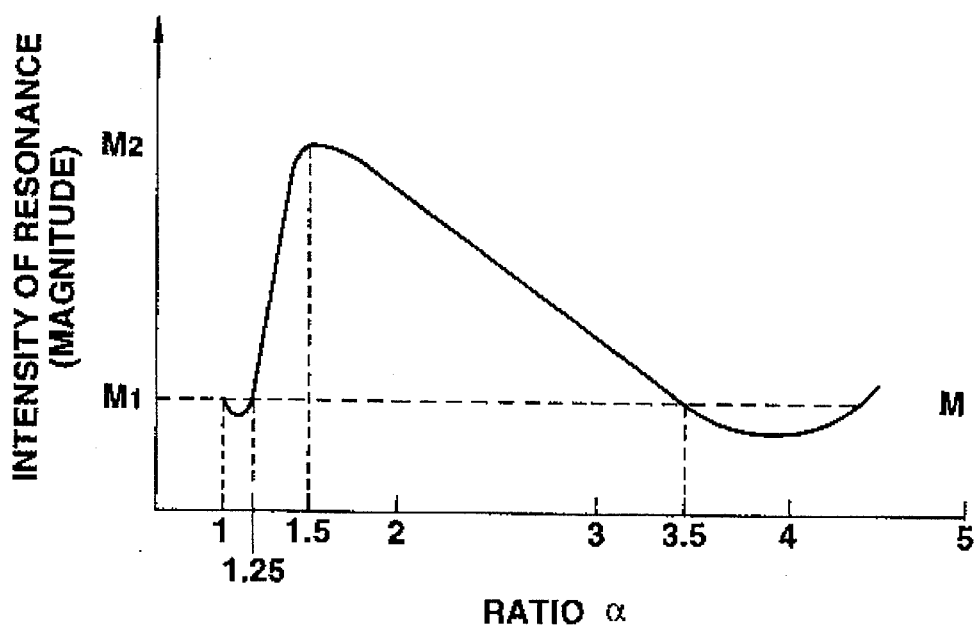
FIG. 4 is a graph showing a relationship between a diametrical ratio and an intensity of resonance.

First, we report a special relationship between a ratio $\alpha$ and an intensity of a resonance with reference to FIG. 4, which relationship was obtained on the basis of many experiments. The ratio $\alpha$ is defined as a ratio between square roots of the cross-sectional areas $S_1$ and $S_2$, and the resonance is generated by a collision between injected fuels through the first and second nozzle holes 12 to 13, respectively. As shown in FIG. 4, when the ratio $\alpha$ was set at 1.25, the intensity of the resonance in 1.25 ratio became the same as that in 1.0 ratio. Further, when the ratio $\alpha$ was set generally at 1.5, the intensity of the resonance took a maximum value. Then, when the ratio $\alpha$ was further increased, the intensity of the reference was gradually decreased. When the ratio $\alpha$ was set at 3.5, the intensity of the resonance became the same as that at 1.0 ratio.

That is, this result shows that, when the ratio $\alpha$ is set in a range 1.25–3.50, the intensity of the resonance thereof becomes larger than that at 1.0 ratio. Further, this phenomenon can be applied to an improvement in the atomization of fuel. As a range where the atomization of the fuel is accelerated, the ratio $\alpha$ is determined in the range 1.25 to 3.50.

Figure 5:
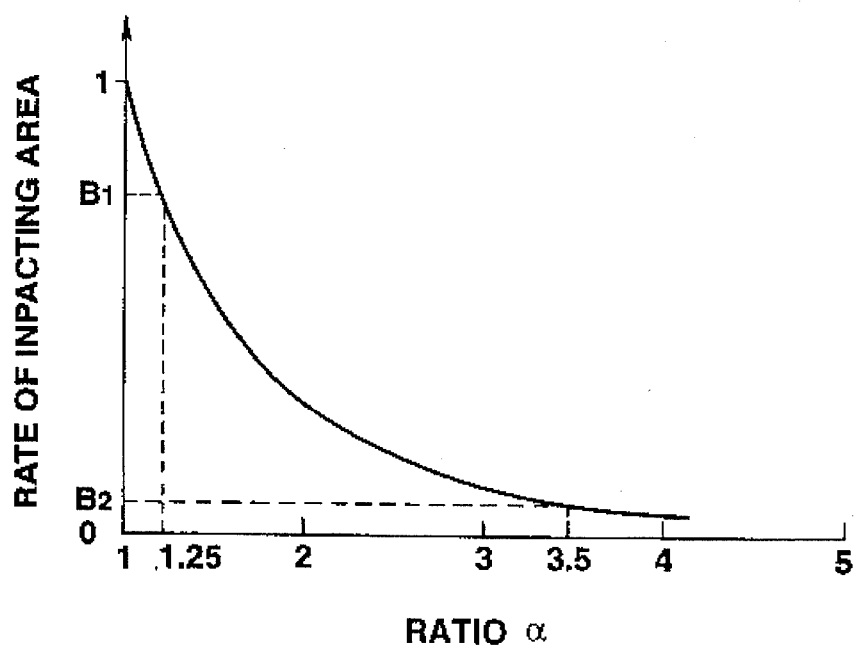
FIG. 5 is a graph showing a relationship between the diametrical ratio and a rate of a collision area.

FIG. 5 shows a graph indicating a relationship between the ratio $\alpha$ and a collision area between first and second injected fuels. As is clear from FIG. 5, the higher the ratio $\alpha$ becomes, the lower the collision area becomes. That is, the collision area is varied inverse-proportionally with respect to the ratio $\alpha$. When the ratio $\alpha$ becomes larger than 3.5, the rate of the collision area becomes lower than 10%, and one fuel jet penetrates the other jet. Accordingly, the atomization is not activated under this condition. This indicates the ratio should be not set over 3.5.

In operation, when the electro-magnetic actuator 3 is energized according to the signal from the controller, the valve plug 6 is pulled by the core 5. Therefore, the fuel in a fuel chamber 10 is flowed into a hole 9a of the valve sheet portion 9, and the fuel supplied to the hole 9a is injected through the first and second nozzle holes 12 and 13 to the outside of the injection valve. The injected fuels through the first and second nozzle holes 12 and 13 are collided with each other at the point P with an angle $\theta_1+\theta_2$. The collided fuel is atomized by the above-mentioned resonance phenomenon and is carried with intake air to the intake port.

With the thus arranged fuel injection valve, the atomization of the injected fuel is improved by the above-mentioned resonance phenomenon.

Figure 6:
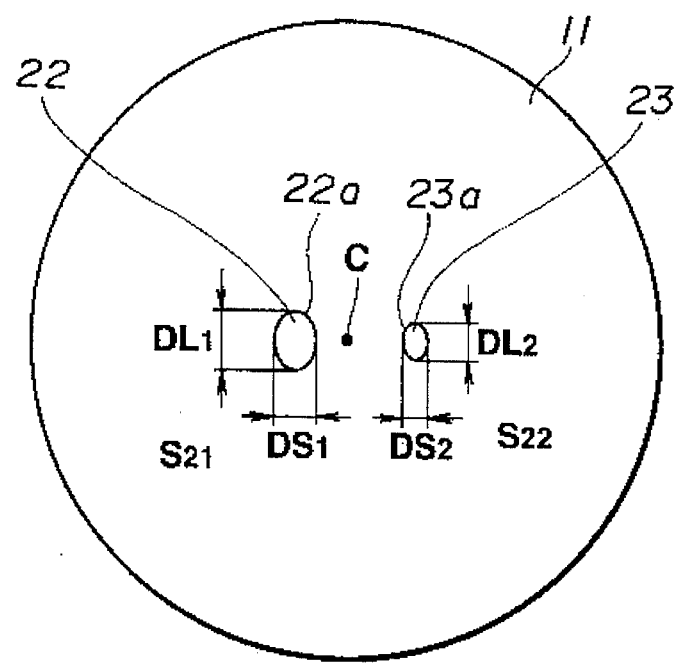
FIG. 6 is a plan view showing an essential part of the fuel injection valve according to a second embodiment of the present invention.

FIG. 6 illustrates a second embodiment of the fuel injection valve according to the present invention. In this embodiment, like parts and elements with the first embodiment are designated by like reference numerals, and explanations thereof are omitted. The second embodiment is generally the same as the first embodiment except that first and second nozzle holes 22 and 23 are formed in a non-circular shape, such as in an elliptical shape.

The first nozzle hole 22 is formed straight and elliptical. An outlet end 22a of the first nozzle hole 22 has a major axis $D_{L1}$, a miner axis $D_{S1}$, and a cross-sectional area $S_{21}$. The second nozzle hole 23 also formed straight and elliptical. An outlet end 23a of the second nozzle hole 23 has a major axis $D_{L2}$, a miner axis $D_{S2}$ and a cross-sectional area $S_{22}$. An axis $X_1$ of the first nozzle hole 22 forms an angle $\theta_1$ with an axis C of the valve body 1. On the other hand, an axis $X_2$ of the first nozzle hole 23 forms an angle $\theta_2$ with the axis C. The axes $X_1$ and $X_2$ intersect at a point P on the axis C. The first and second nozzle holes 22 and 23 are formed so that the ratio $\alpha$ between a square root of the cross-sectional area $S_{21}$ and a square root of the cross-sectional area $S_{22}$ is within the range of 1.25–3.50. That is, the relationship is defined as follows:

$$1.25 \leq \alpha = (S_1)^{1/2}/(S_2)^{1/2} \leq 3.50.$$

With the thus arranged fuel injection valve, advantages gained by the first embodiment are similarly obtained. Further, since the first and second nozzle holes 22 and 23 are formed elliptical, it is possible to inject fuel with a high-directivity. Accordingly, it becomes possible to supply atomized fuel to a desired direction according to a shape of an applied intake port so as to effectively and properly supply the fuel in combustion chambers of an engine.

Although in this embodiment the first and second nozzle holes 22 and 23 have been shown and described to be formed elliptical, it will be understood that the holes 22 and 23 may be formed in other shapes, such as a triangle or rectangle. Furthermore, it is imaginable that directions of the axes $X_1$ and $X_2$ may be set at the other angles.

Figure 7:
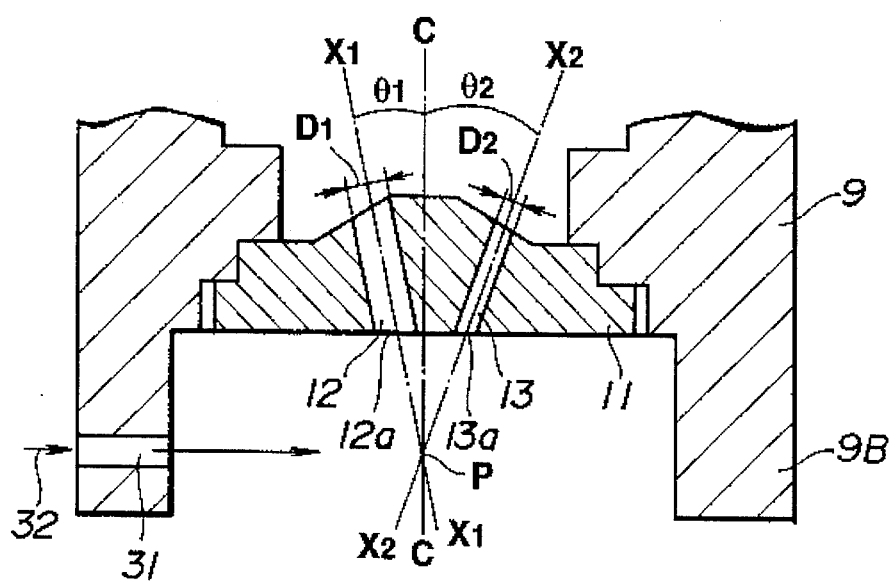
FIG. 7 is a sectional view showing an essential part of the fuel injection valve according to a third embodiment of the present invention.

FIG. 7 illustrates a third embodiment of the fuel injection valve according to the present invention. In this embodiment, like parts and elements with the first embodiment are designated by like reference numerals. The third embodiment is generally the same as the first embodiment except that the valve sheet portion 9 of the casing 2 is extended so as to surround the injected fuel as shown in FIG. 7. The extended valve sheet portion 9 has an air injection hole 31 which is directed to the point P. An inlet side of the air injection hole 31 is connected with an intake passage (not shown) through an air supply passage 32. Accordingly, an assist air for improving the atomization of the fuel is injected toward the collision point P of the injected fuels. Although in this embodiment the air injection hole 31 is formed so that an axis of the air injection hole 31 is generally perpendicular with the axis C of the valve body 1, the air injection hole 31 may be formed so as to obliquely inject the assist air toward the collision point P, and a plurality of air injection holes 31 may be provided in the extended valve sheet portion 9 of the casing 2.

With the thus arranged injection valve, since the assist air is injected toward the injected fuel, the atomization of the fuel is further improved.

Figure 8:
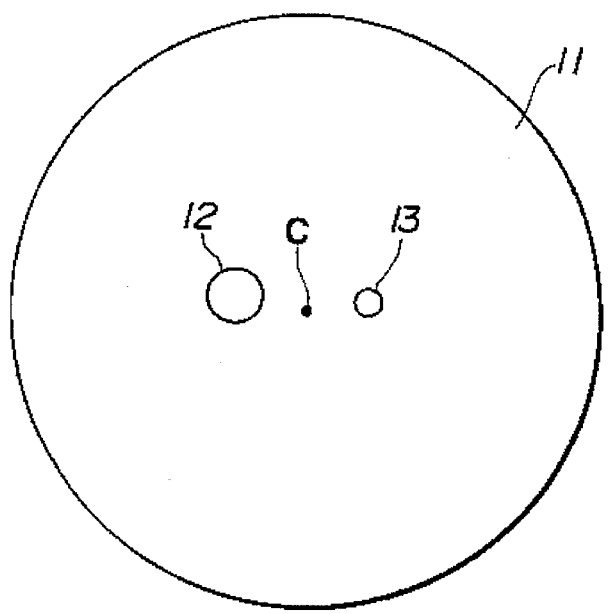
FIG. 8 is a plan view showing a nozzle tip of the fuel injection valve according to a fourth embodiment of the present invention.
Figure 9:
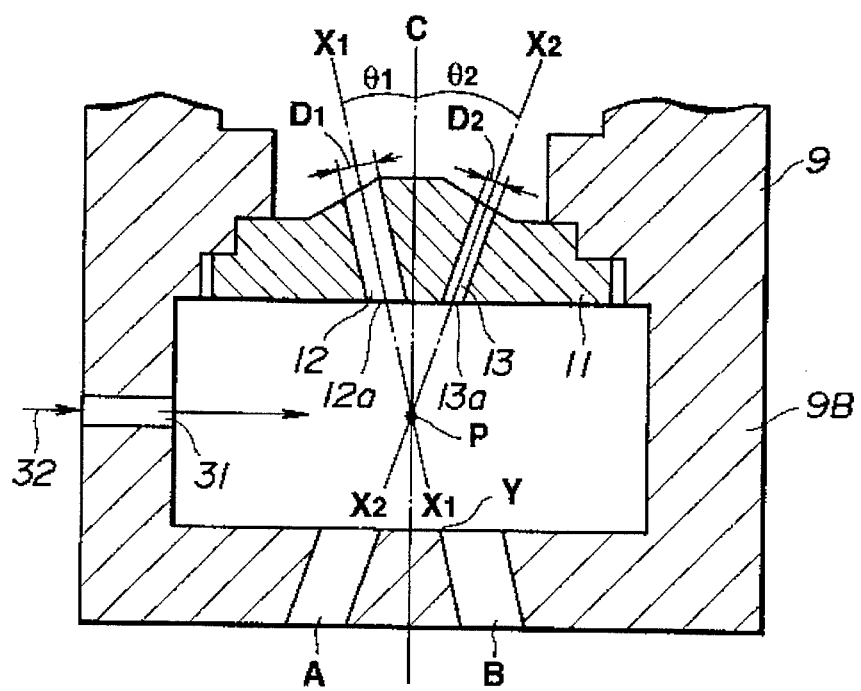
FIG. 9 is a sectional view showing an essential part of the fuel injection valve according to the fourth embodiment of the present invention.

FIGS. 8 and 9 illustrate a fourth embodiment of the fuel injection valve according to the present invention. In this embodiment, like parts and elements with the third embodiment are designated by like reference numerals. The fourth embodiment is generally the same as the first embodiment except that the valve sheet portion 9 of the casing 2 is formed to surround and cover the point P. The valve sheet portion 9 has injection holes A and B through which the injected fuels from the first and second nozzle holes 12 and 13 are injected toward the intake port. The injection holes A and B are formed on imaginary lines of the axes $X_1$ and $X_2$ of the first and second nozzle holes 12 and 13, and have diameters larger than those of the nozzle holes 12 and 13.

With this arrangement, the atomization of the injected fuel is further improved.

Figure 10:
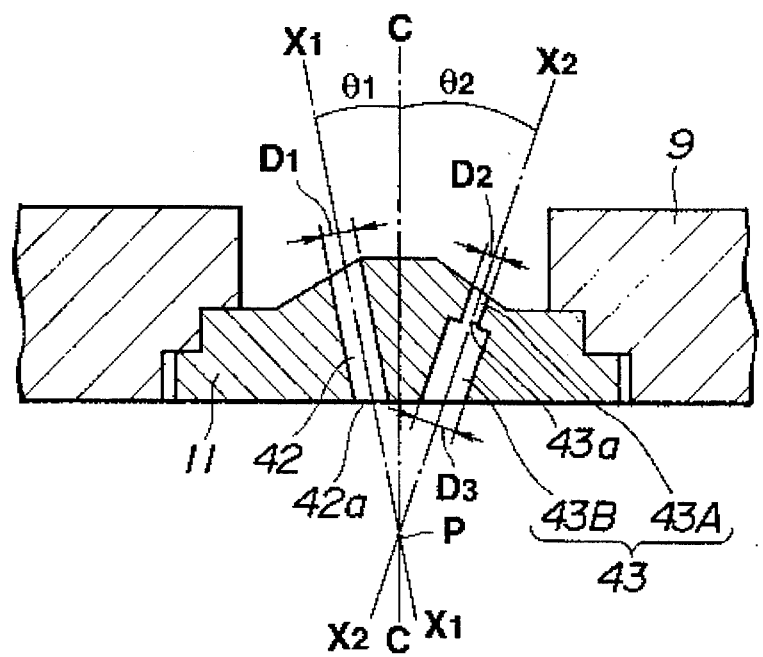
FIG. 10 is a sectional view showing an essential part of the fuel injection valve according to a fifth embodiment of the present invention.

FIG. 10 illustrates a fifth embodiment of the fuel injection valve according to the present invention. In this embodiment, like parts and elements with the first embodiment are designated by like reference numerals, and explanations thereof are omitted. The fifth embodiment is generally the same as the first embodiment except for first and second nozzle holes 42 and 43.

As shown in FIG. 10, the first nozzle hole 42 is formed straight and has a diameter $D_1$ as similar to the hole 12 of the first embodiment. The second nozzle hole 43 is formed in a stepped cylindrical shape. That is, the second nozzle hole 43 has an inlet portion 43A which has a diameter $D_2$ smaller than that of the first nozzle hole 42, and an outlet portion 43B which has a diameter D3 as is generally the same as the diameter $D_1$. An axis $X_1$ of the first nozzle hole 42 forms an angle $\theta_1$ with an axis C of the valve body 1. On the other hand, an axis $X_2$ of the second nozzle hole 43 forms an angle $\theta_2$ with the axis C. The axes $X_1$ and $X_2$ intersect at a point P on the axis C. In this embodiment, the ratio α is defined by a cross-sectional area of an outlet end 42a of the first nozzle hole 42 and a cross-sectional area of the outlet end 43a of the inlet portion 43A. The first and second nozzle holes 42 and 43 are formed so that the ratio α is in the range of 1.25–3.50.

With the thus arranged fuel injection valve, advantages gained by the first embodiment are similarly obtained. Further, since the second hole 43 has the outlet portion 43B which has a diameter D3 as is generally the same as the diameter $D_1$ of the first nozzle hole 32, the flow rate of the fuel passing through the second nozzle hole 43 generally becomes the same as that passing through the first nozzle hole 42. This improves the degrees of freedom concerning the direction of the fuel injection.

Figure 11:
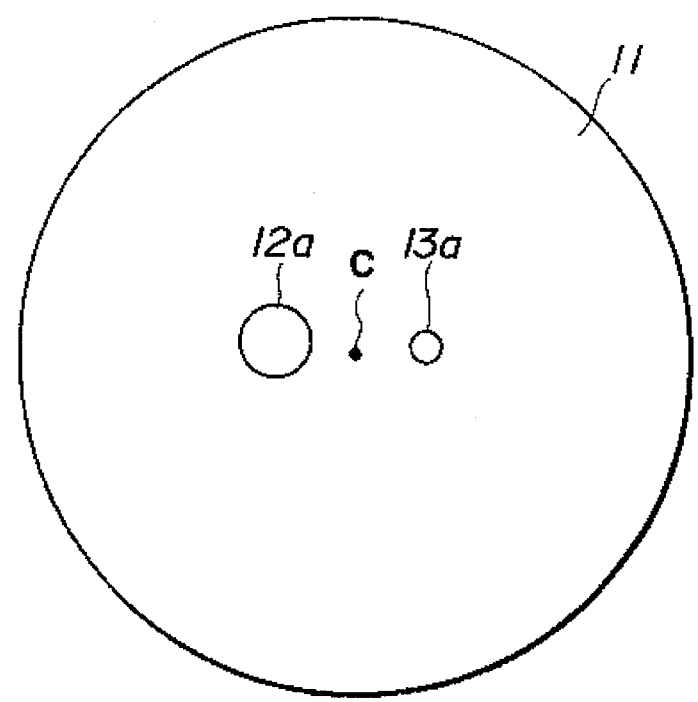
FIG. 11 is a plan view showing a nozzle tip of the fuel injection valve according to a sixth embodiment of the present invention.
Figure 12:
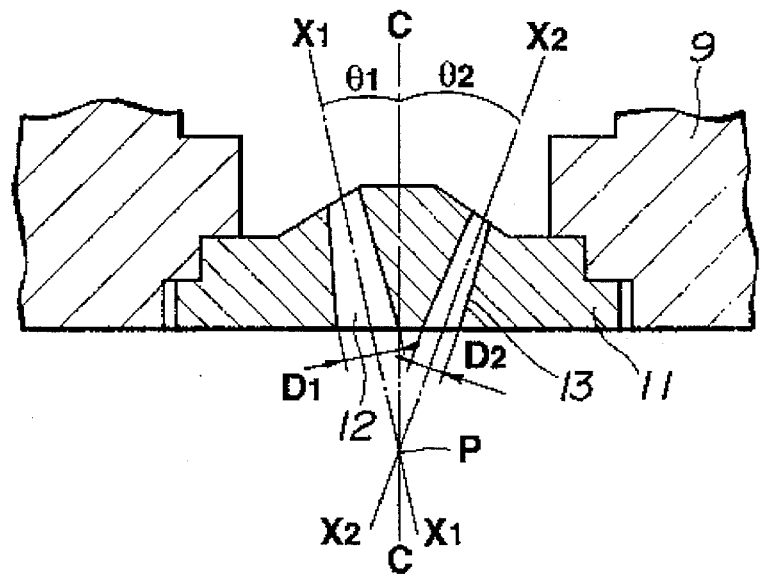
FIG. 12 is a sectional view showing an essential part of the fuel injection valve according to the sixth embodiment of the present invention.

FIGS. 11 and 12 illustrate a sixth embodiment of the fuel injection valve according to the present invention. In this embodiment, like parts and elements with the first embodiment are designated by like reference numerals, and explanations thereof are omitted. The sixth embodiment is generally the same as the first embodiment except that first and second nozzle holes 12 and 13 are formed so as to gradually increase diameters thereof in cross-section from an inlet side to an outlet side. An outlet end of the first nozzle hole 12 has a diameter $D_1$, and an outlet end of the second nozzle hole 13 has a diameter $D_2$. An axis $X_1$ of the first nozzle hole 12 forms an angle $\theta_1$ with the center axis C of the valve body 1. An axis $X_2$ of the second nozzle hole 13 forms an angle $\theta_2$ with the center axis C. The axes $X_1$ and $X_2$ intersect at the point P on the center axis C. In this embodiment, the ratio α is defined by a cross-sectional area at an outlet end 12a of the first nozzle hole 12 and a cross-sectional area at an outlet end 13a of the second nozzle hole 13 so that the ratio is in the range 1.25–3.50 as is the same as in the first embodiment.

With the thus arranged fuel injection valve, in addition to the improvement in the atomization of fuel, the productivity of the holes 12 and 13 are improved.

Figure 13:
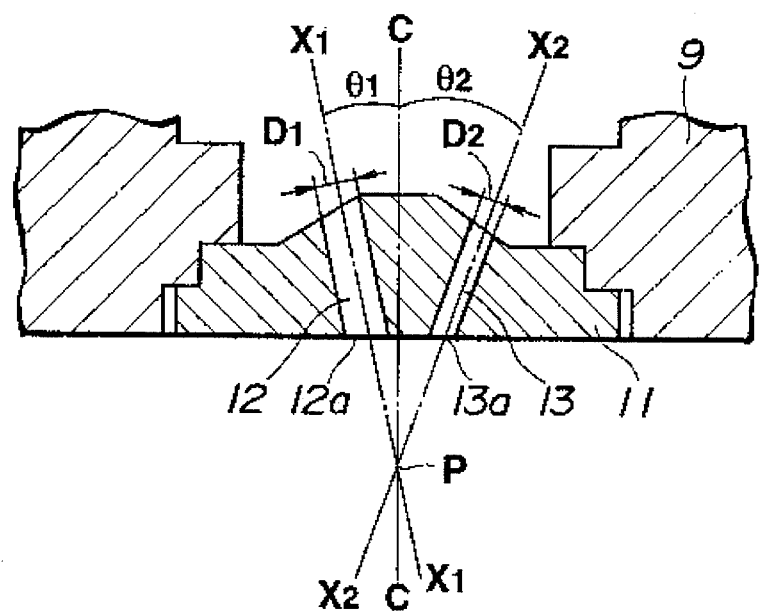
FIG. 13 is a sectional view showing an essential part of the fuel injection valve according to a seventh embodiment of the present invention.
Figure 14:
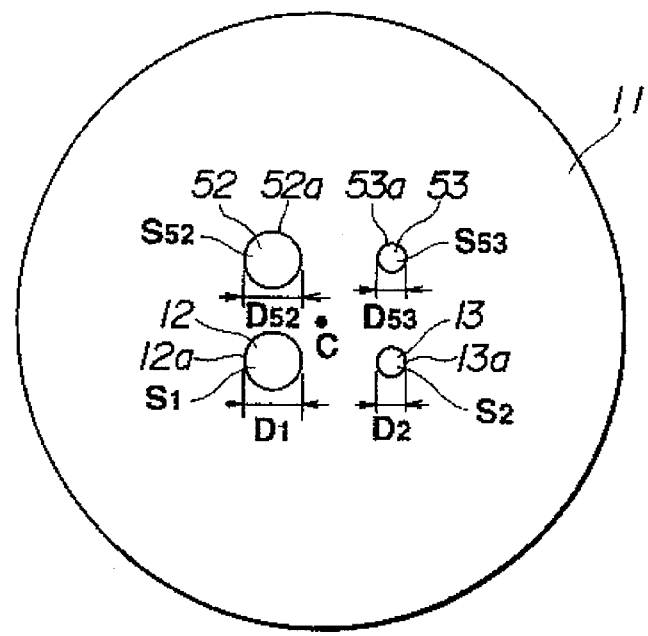
FIG. 14 is a plan view showing a nozzle tip according to the seventh embodiment of the present invention.

FIGS. 13 and 14 illustrate a seventh embodiment of the fuel injection valve according to the present invention. In this embodiment, like parts and elements with the first embodiment are designated by like reference numerals, and explanations thereof are omitted. The seventh embodiment is generally similar to the first embodiment except that third and fourth nozzle holes 52 and 53 are further formed. As shown in FIG. 14, the first and second nozzle holes 12 and 13 are offset toward one side as compared with those in the first embodiment, and are generally axial symmetric with the third and fourth nozzle holes 52 and 53. The first nozzle hole 12 is formed straight and circular. An outlet end 12a of the first nozzle hole 12 has a diameter $D_1$ and a cross-sectional area $S_1$. The second nozzle hole 13 also formed straight and circular. An outlet end 13a of the second nozzle hole 13 has a diameter $D_2$ and a cross-sectional area $S_2$. The diameter $D_1$ is formed larger than the diameter $D_2$. An axis $X_1$ of the first nozzle hole 12 forms an angle $\theta_1$ with an axis C of the valve body 1. On the other hand, an axis $X_2$ of the second nozzle hole 13 forms an angle $\theta_2$ with the axis C. The axes $X_1$ and $X_2$ intersect at a point P on the axis C. The first and second nozzle holes 12 and 13 are formed so that the ratio α between a square root of a cross-sectional area $S_1$ and a square root of a cross-sectional area $S_2$ is in the range of 1.25–3.50. That is, the relationship is defined as follows:

$$1.25 \leq \alpha = (S_1)^{1/2}/(S_2)^{1/2} \leq 3.50.$$

Similarly, the third nozzle hole 52 is formed straight and circular. An outlet end 52a of the third hole 52 has a diameter $D_{52}$ and a cross-sectional area $S_{52}$. The fourth nozzle hole 53 is also formed straight and circular. An outlet end 53a of the fourth nozzle hole 53 has a diameter $D_{53}$ and a cross-sectional area $S_{53}$. The diameter $D_{52}$ is formed larger than the diameter $D_{53}$. An axis $X_{52}$ of the third nozzle hole 52 forms an angle $\theta_1$ with the axis C of the valve body 1. On the other hand, an axis $X_{53}$ of the fourth nozzle hole 53 forms an angle $\theta_2$ with the axis C. The axes $X_{52}$ and $X_{53}$ intersect at a point $P_{52}$ on the axis C. The point $P_{52}$ is different from the point P in distance. The third and fourth nozzle holes 52 and 53 are formed so that the ratio α between a square root of a cross-sectional area $S_{52}$ and a square root of a cross-sectional area $S_{53}$ is in the range of 1.25–3.50.

Figure 15:
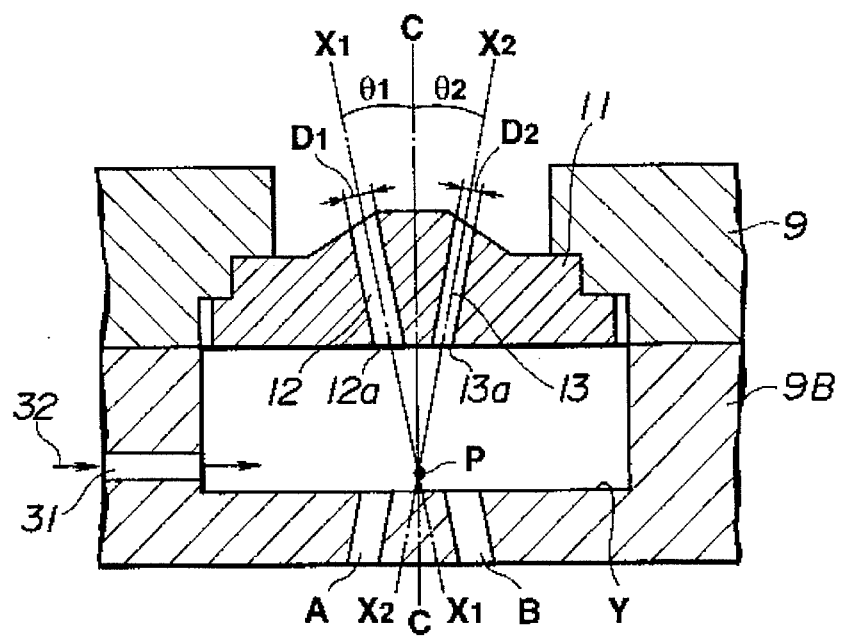
FIG. 15 is a sectional view showing an essential part of the fuel injection valve according to the present invention.
Figure 16:
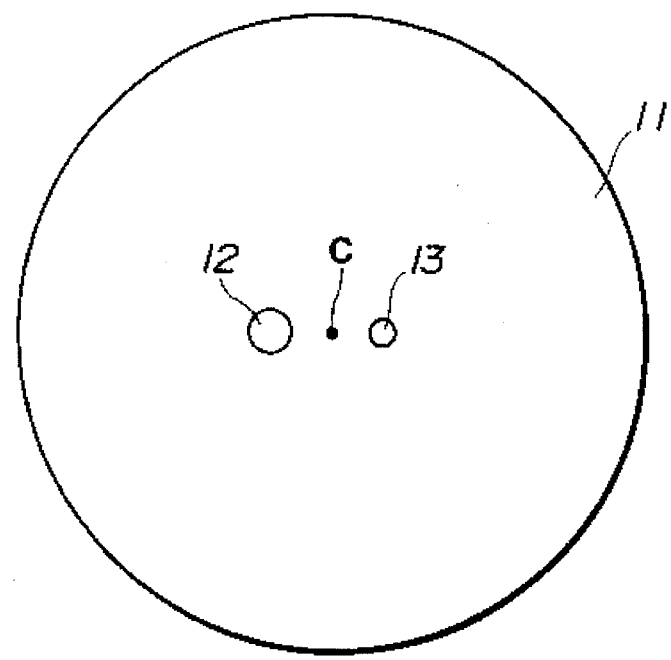
FIG. 16 is a plan view of a nozzle tip according to an eighth embodiment of the present invention.

FIGS. 15 and 16 illustrate an eighth embodiment of the fuel injection valve according to the present invention. In this embodiment, like parts and elements with the fourth embodiment are designated by like reference numerals, and explanations thereof are omitted. The eighth embodiment is generally the same as the fourth embodiment except that the valve sheet portion 9a is formed such that a wall having the holes A and B is disposed in the vicinity of the point P so as to impinge the collided fuel with a surface Y of the valve sheet portion 9B.

Accordingly, the injected fuel from the first and second nozzle holes 12 and 13 are collided at the point P and immediately impinged with the surface F of the valve sheet portion 9A. By these twice collisions, the injected fuel is effectively atomized. Further, assist air injected from the assist air injection hole 31 further improves the atomization of the fuel. The assist air is directed to the point P near the surface Y, even if the fuel is attached on the surface Y the attached fuel is immediately atomized without generating a fuel flow on the surface Y. Therefore, the sufficiently atomized fuel is supplied to the intake port through the holes A and B. In this embodiment, it is not necessary to correspond the axes of the holes A and B with the axes X1 and X2 of the first and second nozzle holes 12 and 13.

With the thus arranged fuel injection valve, advantages gained by the fourth embodiment are ensured. Further, since the collision point P is located near the surface Y of the valve sheet portion 9A of the casing 2, the atomization of the fuel is carried out by an impingement of fuel on the surface Y in addition to the collision of two fuel jets. Additionally, since the collided fuel is atomized by the assist air from the assist air injection hole 31, the atomization is further improved.

Figure 17:
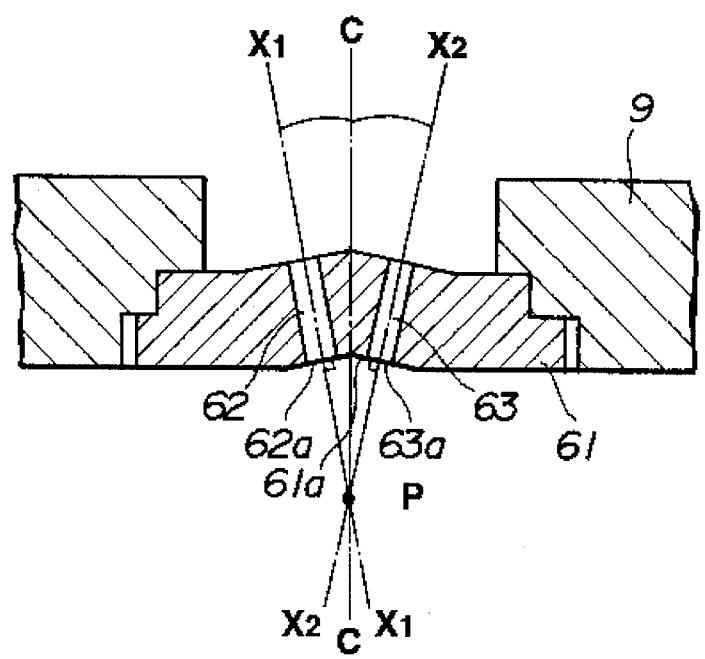
FIG. 17 is a sectional view showing an essential part of the fuel injection valve according to a ninth embodiment of the present invention.
Figure 18:
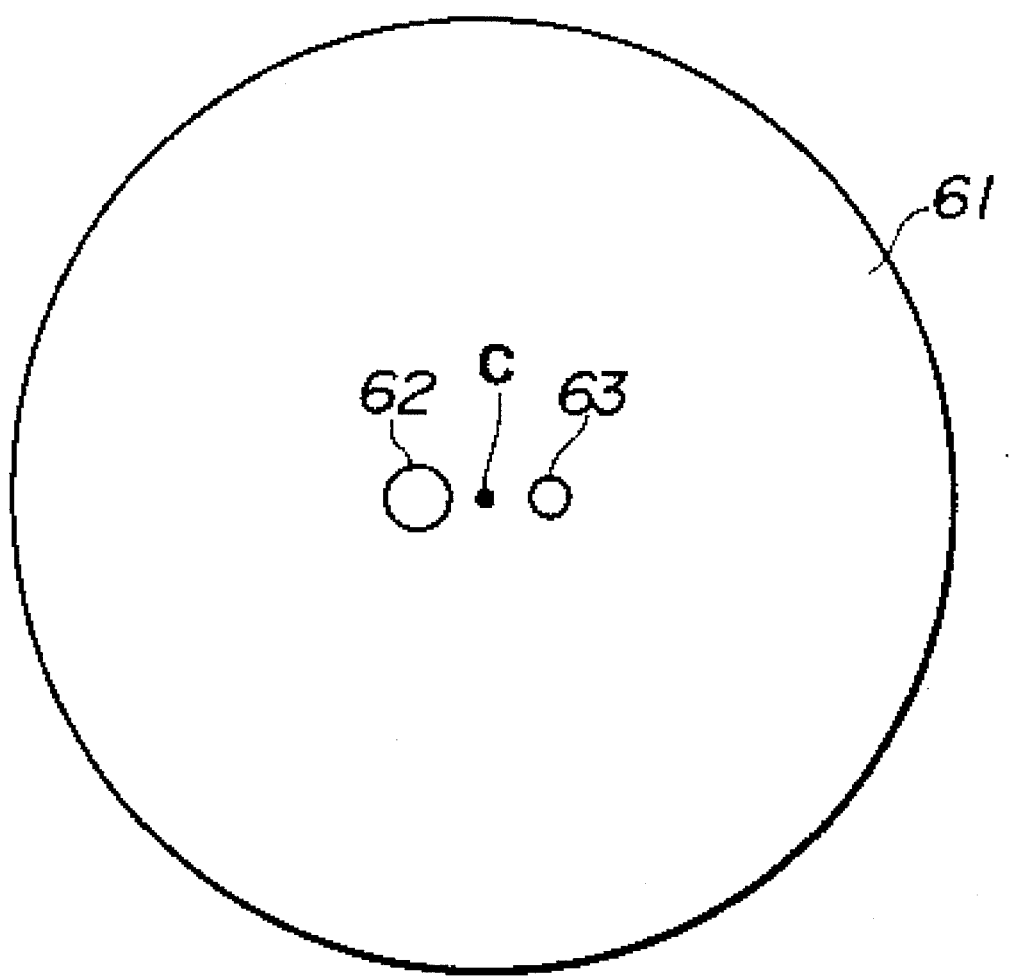
FIG. 18 is a plan view of a nozzle tip of the ninth embodiment.
Figure 19:
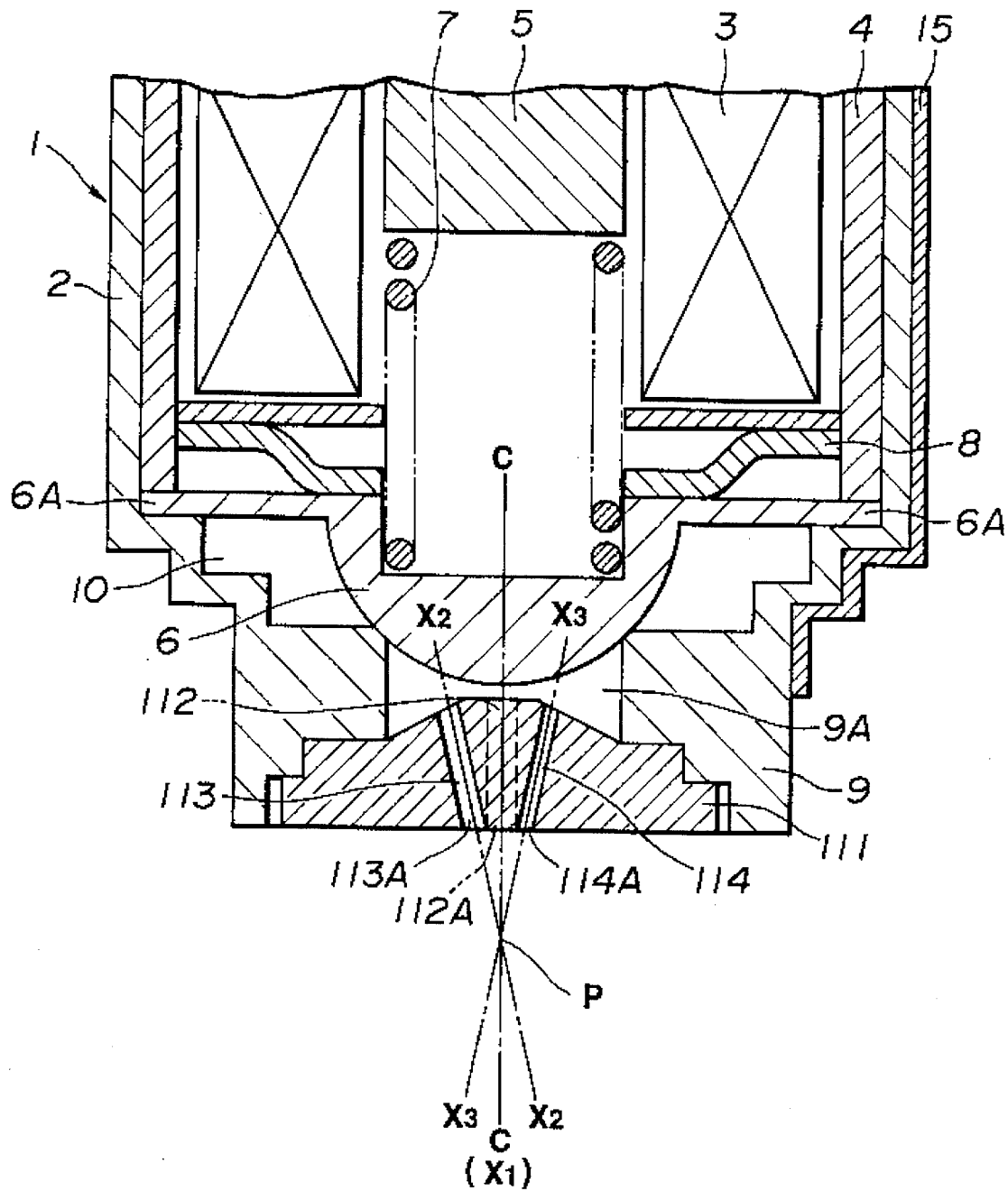
FIG. 19 is a sectional view taken along a line F19—19 of FIG. 20 and shows an essential part in a tenth embodiment of the fuel injection valve according to the present invention.
Figure 20:
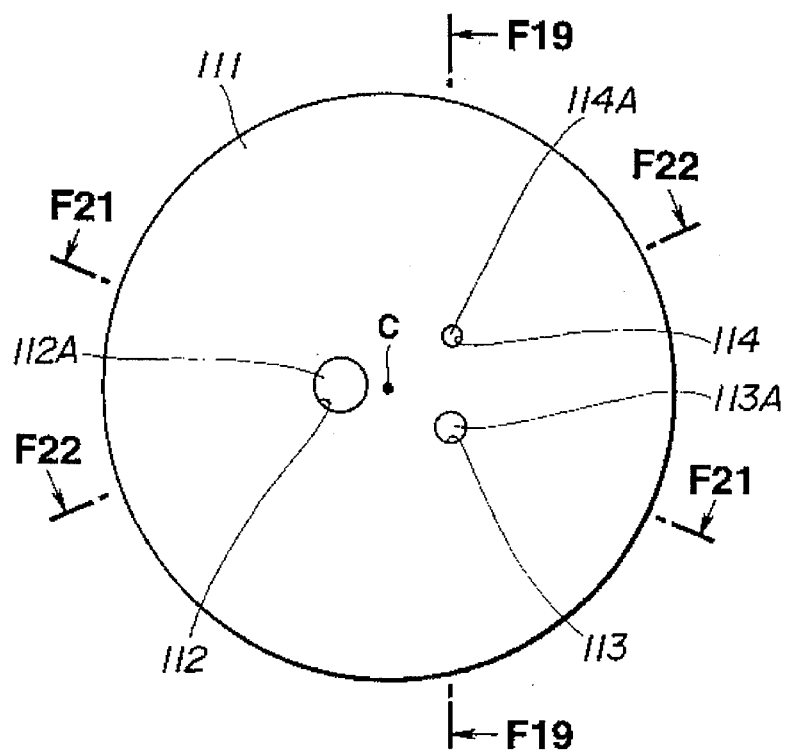
FIG. 20 is an enlarged plan view of a nozzle tip of the tenth embodiment.

FIGS. 17 and 18 illustrate a ninth embodiment of the fuel injection valve according to the present invention. The ninth embodiment is generally the same as the first embodiment except that first and second nozzle holes 62 and 63 have outlet ends 62a and 63a which end surfaces are perpendicular to the respective axes $X_1$ and $X_2$. That is, an outlet surface of a nozzle tip 61 has a recess of a cone-shape to define the outlet ends 62a and 63a to be perpendicular to the axes $X_1$ and $X_2$, as shown in FIG. 17.

With the thus arranged fuel injection valve, the atomized fuel is finely controlled in direction.

FIGS. 19 to 23 illustrate a tenth embodiment of the fuel injection valve according to the present invention. As is similar to the first embodiment, a valve body 1 is disposed in an intake passage (not shown) to face to an intake port (not shown). The valve body 1 comprises a casing 2 of a stepped cylinder. A magnetic actuator 3 including a coil is installed in the casing 2 through a yoke 4. The casing 2 is fixedly supported by a stay 15 to be installed in the intake passage. The magnetic actuator 3 is provided with a space thereinside, and a columnar core 5 made of a magnetic material is disposed in the space. A generally semi-spherical valve plug 6 made of a magnetic material is disposed in the space of the casing 2. The valve plug 6 is integrally connected at its peripheral end with a supporting member 6A. An outer peripheral end of the supporting member 6A is fixedly put between the yoke 4 and the casing 2. The valve body 6 is biased by a coil spring 7 and a plate spring 8 so as to put the valve into a normal closed position. When the magnetic actuator 6 is energized upon receipt of a signal from a controller (not shown), the valve plug 6 is moved by the core 5 to be separated from a valve sheet portion 9. The valve plug 6 moves generally along an axis C of the valve body 1.

Figure 21:
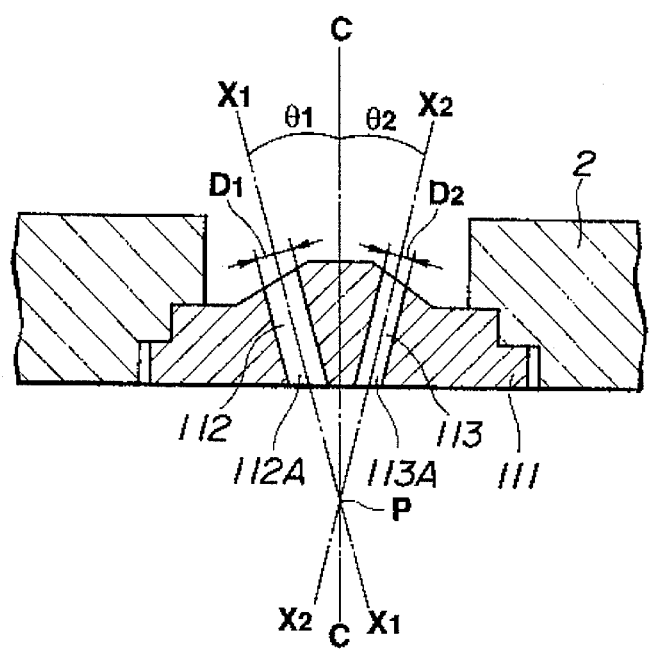
FIG. 21 is a sectional view taken along a line F21—F21 of FIG. 20.
Figure 22:
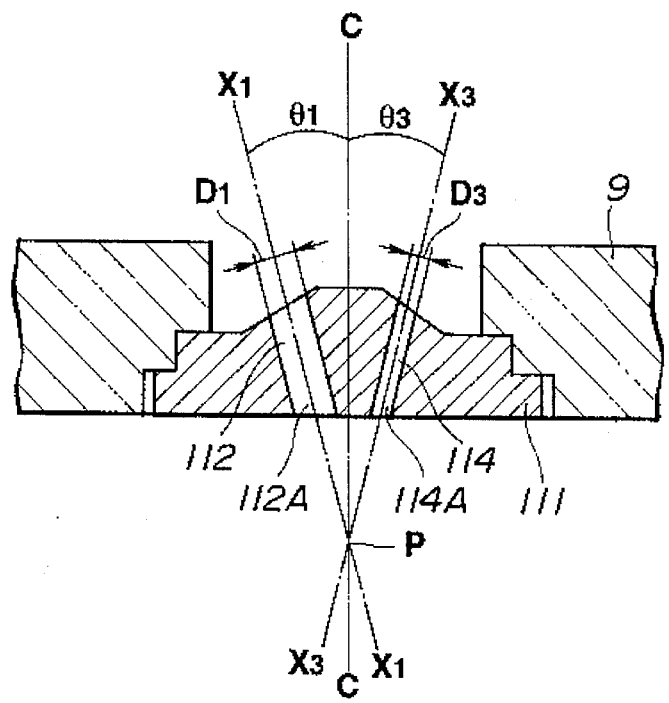
FIG. 22 is a sectional view taken along a line F2–F22 of FIG. 20.

The valve sheet portion 9 is formed at a tip end portion of the casing 2. A nozzle tip 111 is sealingly connected to an outer end of the valve sheet portion 9 of the casing 2. The nozzle tip 111 has a first nozzle hole 112, a second nozzle hole 113 and a third nozzle hole 114. As shown in FIGS. 21 and 22, the first nozzle hole 112 is formed straight and circular. An outlet end 112A of the first nozzle hole 112 has a diameter $D_1$ and a cross-sectional area $S_1$. The second nozzle hole 113 is formed straight and circular. An outlet end 113A of the second nozzle hole 113 has a diameter $D_2$ and a cross-sectional area $S_2$. The third nozzle hole 114 is formed straight and circular. An outlet end 114A of the third nozzle hole 114 has a diameter $D_3$ and a cross-sectional area $S_3$. The diameter $D_1$ is formed larger than the diameter $D_2$. The diameter $D_2$ is larger than the diameter $D_3$. An axis $X_1$ of the first nozzle hole 112 forms an angle $\theta_1$ with an axis c of the valve body 1. An axis $X_2$ of the second nozzle hole 13 forms an angle $\theta_2$ with the axis C of the valve body 1. An axis $X_3$ of the third nozzle hole 114 forms an angle $\theta_3$ with the axis C. The axes $X_1$, $X_2$ and $X_3$ intersect at a point P on the axis C. The first and third nozzle holes 112 and 114 are formed so that the ratio $\alpha$ between a square root of a cross-sectional area $S_1$ and a square root of a cross-sectional area $S_3$ is larger than 1.2. That is, the relationship is defined as follows:

$$1.2 \leq \alpha = (S_1)^{1/2}/(S_3)^{1/2}.$$

The manner of operation of the tenth embodiment will be discussed hereinafter.

Figure 23:
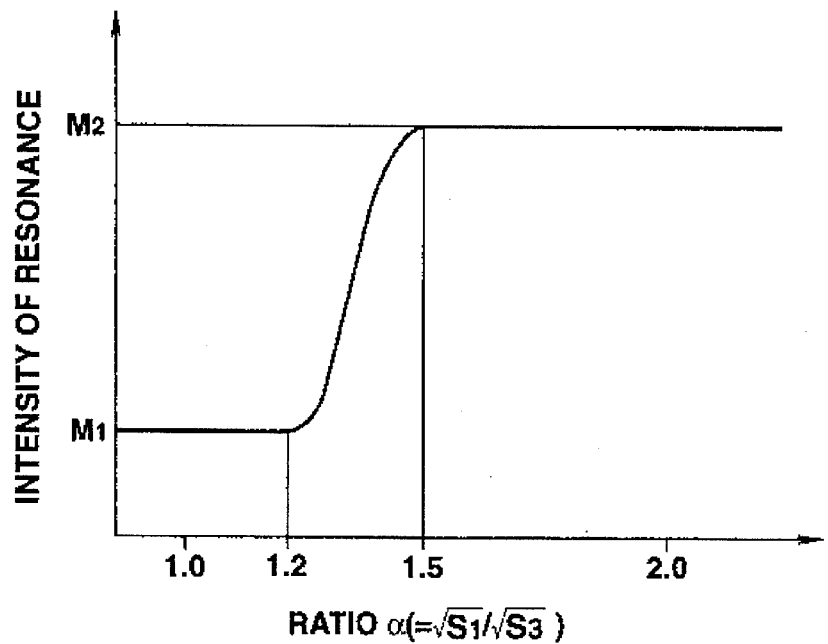
FIG. 23 is a graph which shows a relationship between the diametrical ratio and an intensity of resonance.

We report a relationship between the ratio $\alpha$ between square roots of the cross-sectional areas $S_1$ and $S_3$ and a resonance therebetween with reference to FIG. 23. As shown in FIG. 23, an intensity of the resonance, which resonance is generated by a collision among injected fuels through the first, second and third nozzle holes 112, 113 and 114, is changed nonlinearly with respect to the ratio $\alpha$ when the ratio $\alpha$ is changed from 1. In particular, when the ratio $\alpha$ was set at 1.2, the intensity of the resonance at 1.2 ratio became increasing. Further, when the ratio $\alpha$ was set generally at 1.5, the intensity of the resonance took a maximum value. This phenomenon can be applied to an improvement in the atomization of fuel. To improve the atomization of the fuel, the ratio $\alpha$ is determined so as to be larger than in 1.2.

When the electro-magnetic actuator 3 is energized according to the signal from the controller, the valve body 5 is pulled by the core 5. Therefore, the fuel in a fuel chamber 10 is flowed into a hole 9A of the valve sheet portion 9, and the fuel supplied to the hole 9a is injected through the first, second and third nozzle holes 112, 113 and 114 to the outside of the injection valve. The injected fuels through the first, second and third nozzle holes 112, 113 and 114 are collided with each other at the point P. The collided fuel is atomized by the above-mentioned resonance phenomenon and is carried with intake air to the intake portion.

With the thus arranged fuel injection valve, the nozzle tip 111 has the first, second and third nozzle holes 112, 113 and 114. The first and third nozzle holes 112 and 114 are formed so that the ratio $\alpha$ $(=(S_1)^{1/2}/(S_3)^{1/2})$. Accordingly, injected fuels through the first, second and third nozzle holes 112, 113 and 114 are collided with each other and generates a vibration for improving the atomization as shown in FIG. 23. Further, this arrangement is improved in a directivity of the injected fuel and a degree of freedom of design. Additionally, since fuel is simultaneously supplied to the first, second and third nozzle holes 112, 113 and 114, the injected fuels are securely collided with each other. Therefore, this structure is improved in a reliability.

Figure 24:
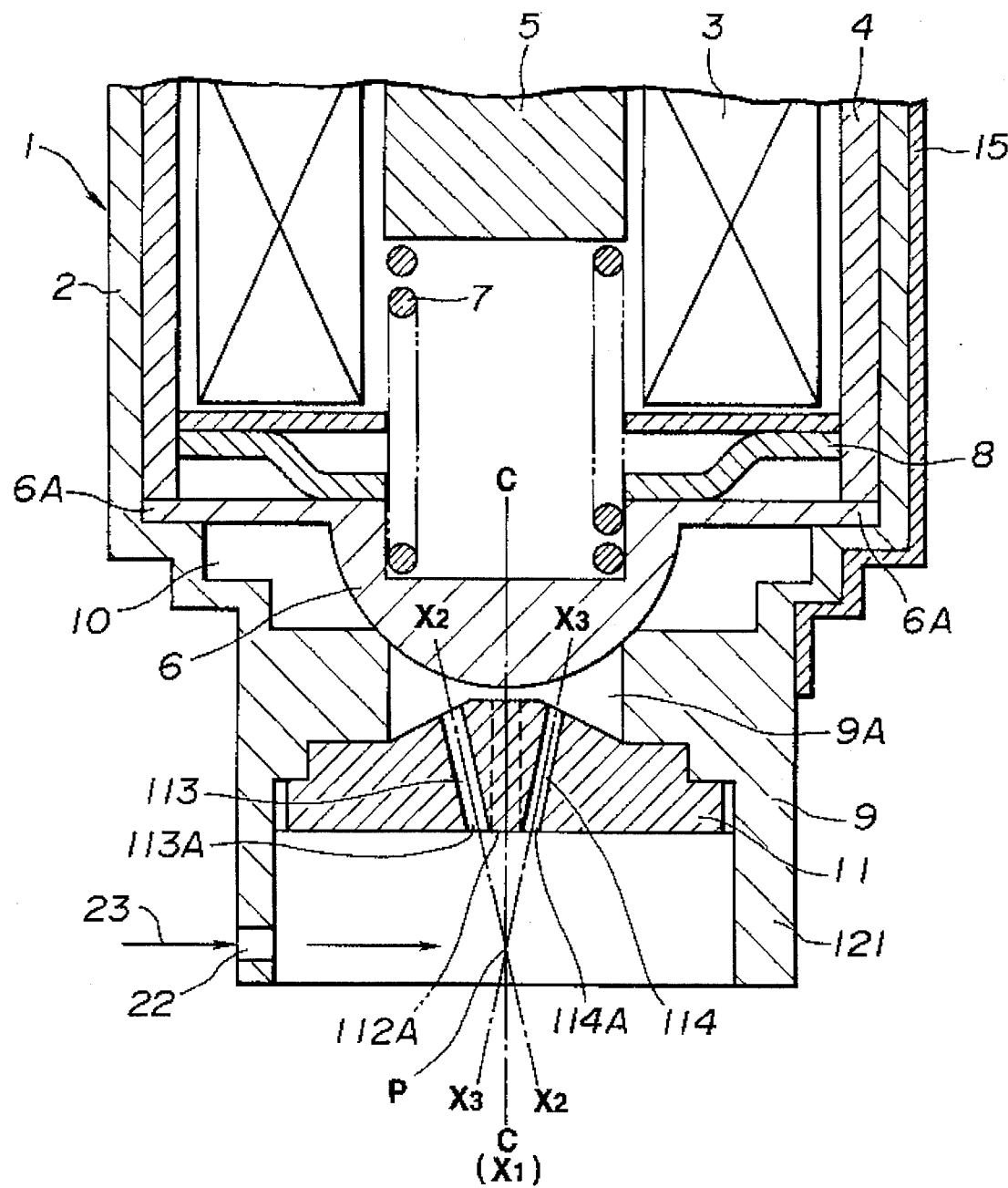
FIG. 24 is a sectional view taken along a line F24—F24 of FIG. 25 and shows an essential part in an eleventh embodiment of the fuel injection valve according to the present invention.
Figure 25:
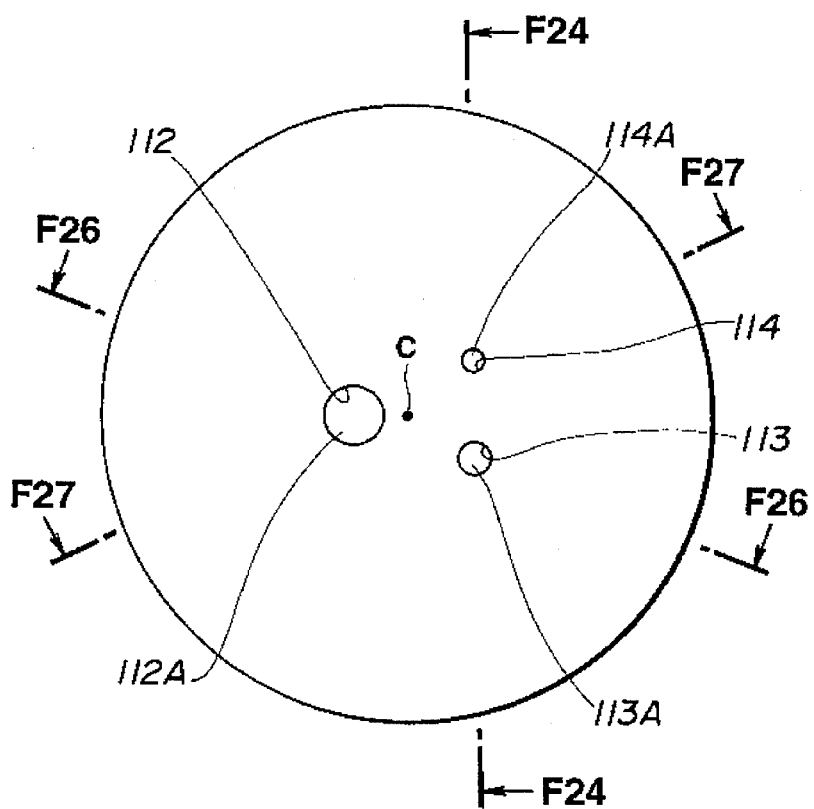
FIG. 25 is an enlarged plan view of a nozzle tip of the eleventh embodiment.
Figure 26:
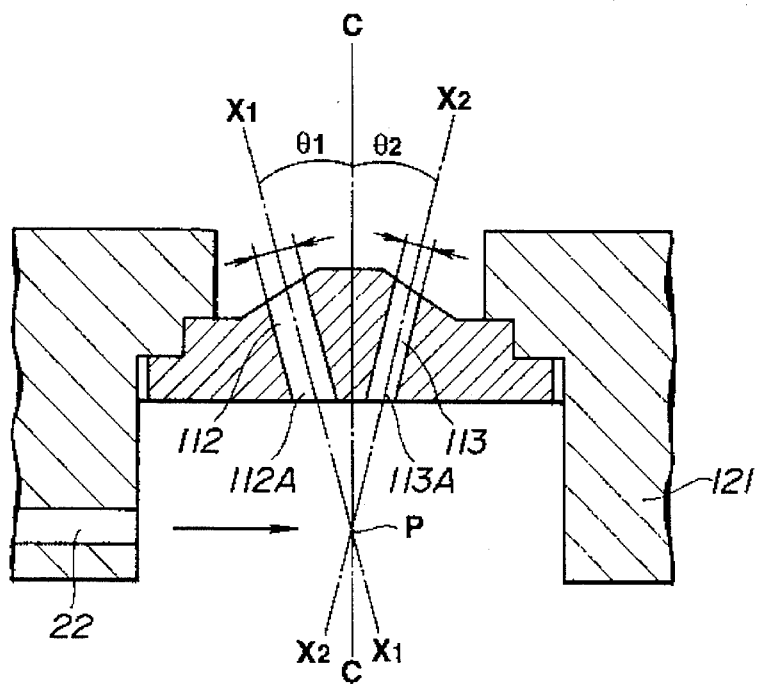
FIG. 26 is a sectional view taken along a line F26—F26 of FIG. 25.
Figure 27:
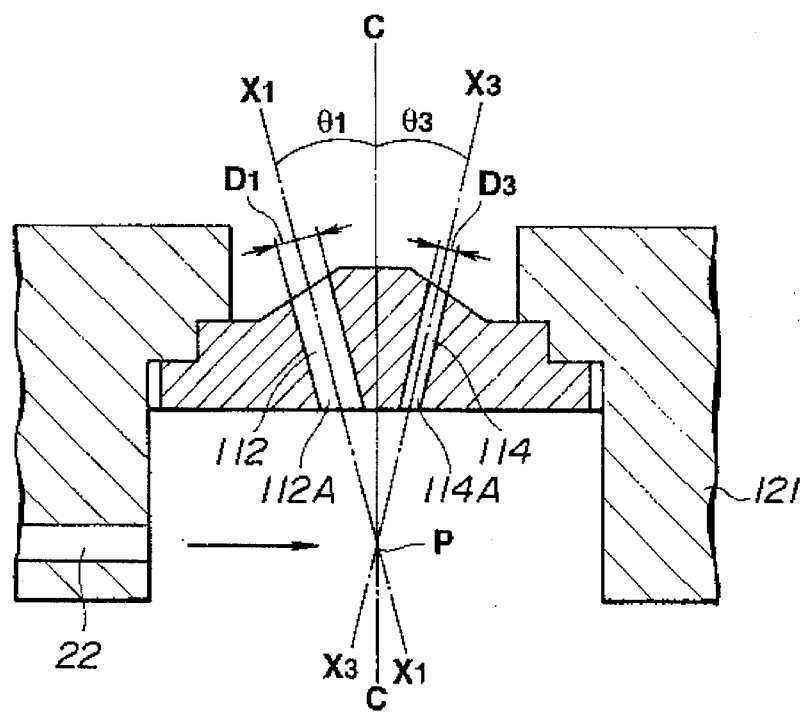
FIG. 27 is a sectional view taken along a line F27—F27 of FIG. 25.

FIGS. 24 to 27 illustrate an eleventh embodiment of the fuel injection valve according to the present invention. In this embodiment, like parts and elements with the tenth embodiment are designated by like reference numerals, and explanations thereof are omitted. The eleventh embodiment is generally the same as the tenth embodiment except that the valve sheet portion 9 of the casing 2 is extended so as to surround the injected fuel as shown in FIG. 24 and forms cylindrical portion 121. The cylindrical portion 121 has a air injection hole 22 which is directed to the point P. An inlet side of the air injection hole 22 is connected with an intake passage (not shown) through an air supply passage 23. Accordingly, an assist air for improving the atomization of the fuel is injected toward the collision point P of the injected fuels. Although in this embodiment the air injection hole 22 is formed so that an axis of the air injection hole 22 is generally perpendicular with the axis C of the valve body 1, the air injection hole 22 may be formed so as to obliquely inject the assist air toward the collision point P, and a plurality of air injection holes 22 may be formed.

With the thus arranged injection valve, since the assist air is injected toward the injected fuel, the atomization of the fuel is further improved.

Figure 28:
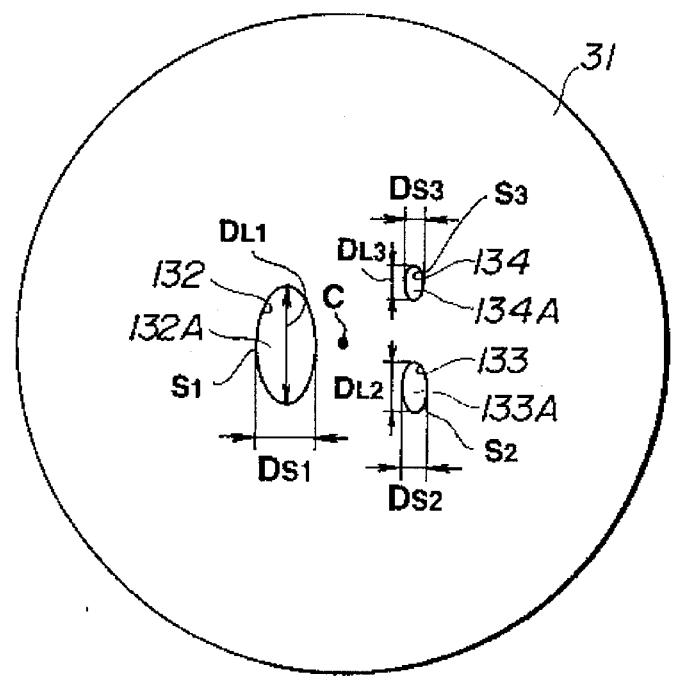
FIG. 28 is a plan view of a nozzle tip of the fuel injection valve according to a twelfth embodiment of the present invention.

FIG. 28 illustrates a twelfth embodiment of the fuel injection valve according to the present invention. In this embodiment, like parts and elements with the tenth embodiment are designated by like reference numerals, and explanations thereof are omitted. The twelfth embodiment is generally the same as the tenth embodiment except that first, second and third nozzle holes 132, 133 and 134 are formed in a non-circular shape, such as in an elliptical shape. The first nozzle hole 132 is formed straight and elliptical. An outlet end 132A of the first nozzle hole 132 has a major axis $D_{L1}$, a minor axis $D_{S1}$, and a cross-sectional area $S_1$. The second nozzle hole 133 is formed straight and elliptical. An outlet end 133A of the second nozzle hole 133 has a major axis $D_{L2}$, a minor axis $D_{S2}$ and a cross-sectional area $S_2$. The third nozzle hole 134 is formed straight and elliptical. An outlet end 134A of the third nozzle hole 134 has a major axis $D_{L3}$, a minor axis $D_{S3}$ and a cross-sectional area $S_3$. The first, second and third nozzle holes 132, 133 and 134 are formed so that the fuels injected therefrom are collided at the point P of the center axis C. As is similar to the tenth embodiment, the first and third nozzle holes 132 and 134 are formed so that the ratio $\alpha$ between a square root of the cross-sectional area $S_{21}$ and a square root of the cross-sectional area $S_{23}$ is larger than 1.2. That is, the relationship is defined as follows:

$$1.2 \leq \alpha = (S_1)^{1/2}/(S_3)^{1/2}.$$

With the thus arranged fuel injection valve, advantages gained by the first embodiment are similarly obtained. Further, since the first second and third holes 132, 133 and 134 are formed elliptical, it is possible to inject fuel with a high-directivity. Accordingly, it becomes possible to supply atomized fuel to a proper direction according to a shape of an applied intake port so as to effectively and properly supply the fuel in combustion chambers of an engine. Although in this embodiment the first, second and third nozzle holes 132, 133 and 134 are formed elliptical, it will be understood that the holes 132, 133 and 134 may be formed in other shapes, such as a triangle or rectangle. Further, although in this embodiment the first, second and third nozzle holes 132, 133 and 134 are arranged so that major axes $D_{L1}$, $D_{L2}$ and $D_{L3}$ are directed to the up-and-down direction in FIG. 28, the directions of major axes may be directed in the right-and-left direction in FIG. 28 or may be directed to the center axis C.

Figure 29:
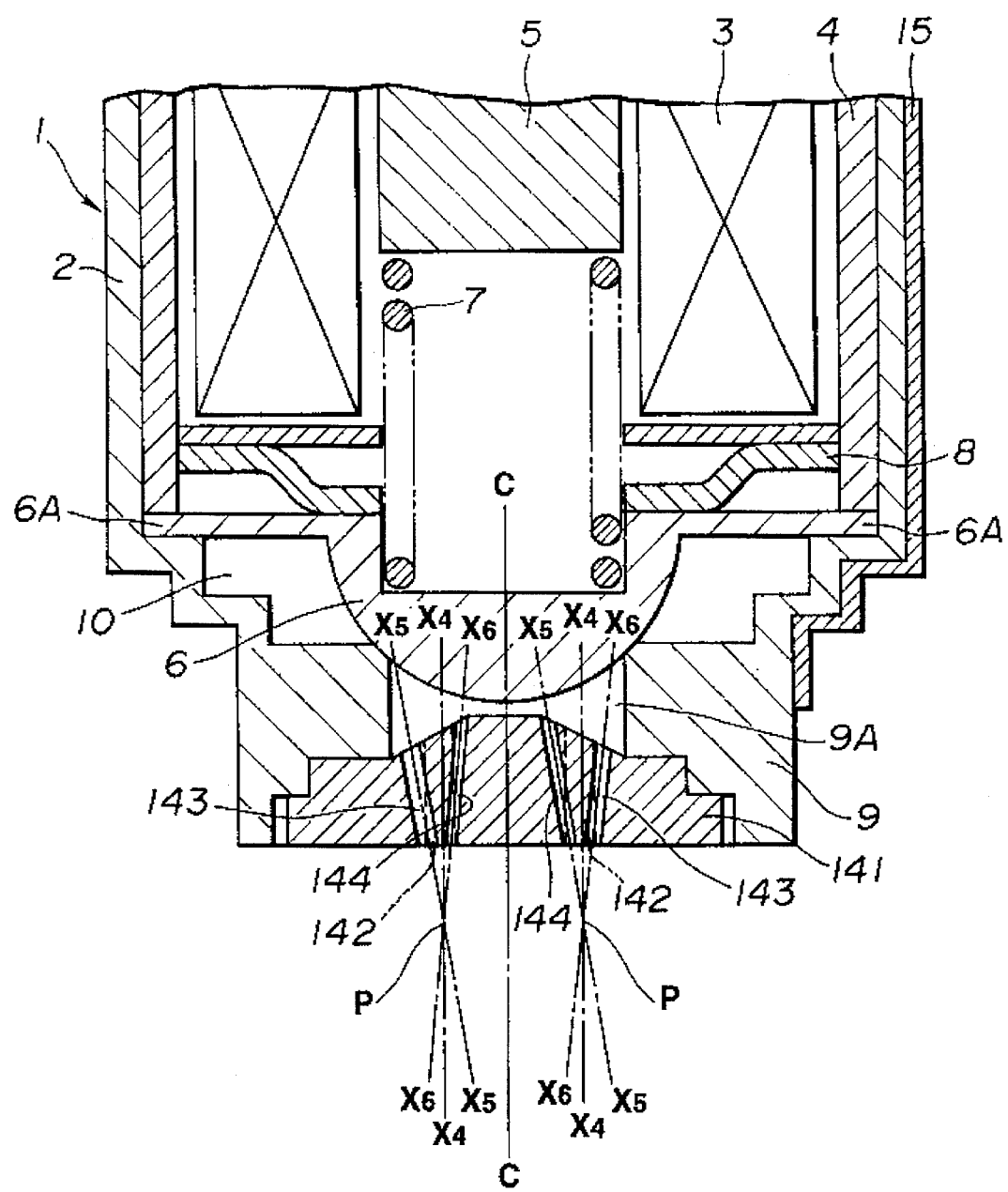
FIG. 29 is a sectional view taken along a line F29—F29 of FIG. 30 and shows an essential part in a twelfth embodiment of the fuel injection valve according to the present invention.
Figure 30:
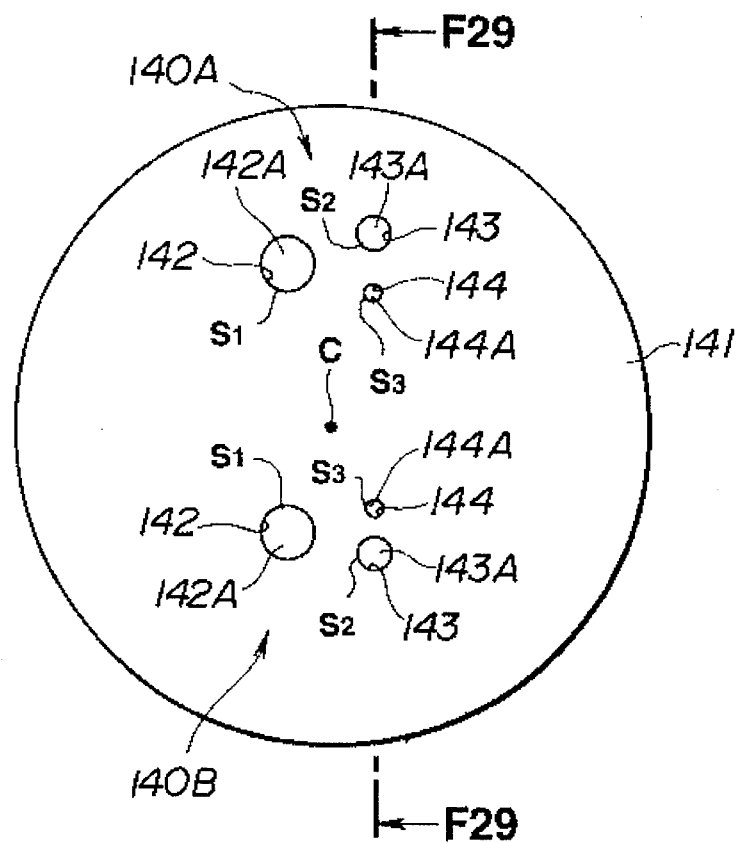
FIG. 30 is an enlarged plan view of a nozzle tip of the twelfth embodiment.
Figure 31:
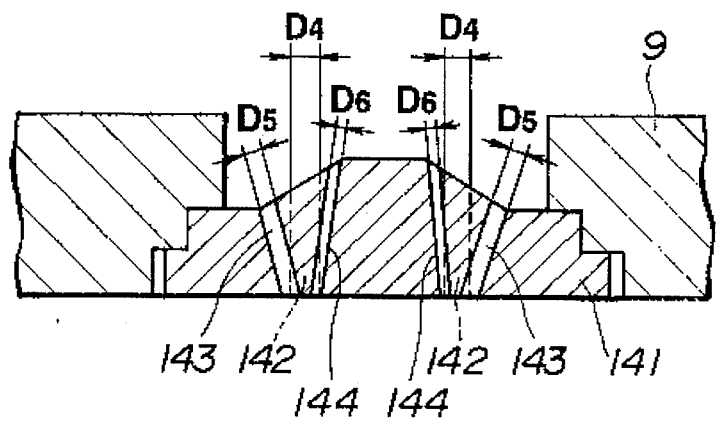
FIG. 31 is an enlarged sectional view of the nozzle tip of the twelfth embodiment.

FIGS. 29 to 31 illustrate a thirteenth embodiment of the fuel injection valve according to the present invention. A pair of nozzle hole units 140A and 140B are formed in the nozzle tip 141. A first nozzle hole unit 140A is constituted by first, second and third nozzle holes 142, 143 and 144 which are arranged as similar to those in the eleventh embodiment while these positions are offset from the center axis C of the valve body 1. The second nozzle hole unit 140B has the same nozzle holes as those of the one nozzle hole unit 140A. That is, the pair of nozzle hole units 140A and 140B are in axial symmetry. The first, second and third nozzle holes 142, 143 and 144 of each nozzle hole unit 140A, 140B are formed straight and circular. Outlet ends 142A, 143A and 144A have diameters $D_4$, $D_5$ and $D_6$, cross-sectional areas $S_1$, $S_2$ and $S_3$ and axes $X_4$, $X_5$ and $X_6$, respectively. The diameter $D_4$ is larger than the diameter $D_5$. The diameter $D_5$ is larger than the diameter $D_6$. The axes $X_4$, $X_5$ and $X_6$ of the respective nozzle holes 142, 143 and 144 intersect with each other at a predetermined point. The first and third nozzle holes 142 and 144 are formed so that the ratio $\alpha$ between a square root of a cross-sectional area $S_1$ and a square root of a cross-sectional area $S_3$ is larger than 1.2. That is, the relationship is defined as follows:

$$1.25 \leq \alpha = (S_1)^{1/2}/(S_3)^{1/2}.$$

With the thus arranged fuel injection valve, advantages gained by the first embodiment are similarly obtained. Further, since a pair of nozzle hole units 140A and 140B include the first, second and third nozzle holes 142, 143 and 144 respectively, it is possible to inject fuel toward to directions. Accordingly, it becomes possible to supply atomized fuel to the respective directions even if each cylinder of an engine is provided with two intake port.

Although in this embodiment the pair of nozzle hole units have been shown and described so that each of them has the first, second and third nozzle holes 142, 143 and 144, it will be understood that the pair of the nozzle hole units may be formed to be different from each other in diameters or direction. For example, the one nozzle hole unit is constituted by a fist nozzle hole of 200 mm diameter, a second nozzle hole of 150 mm diameter and a third nozzle hole of 100 mm diameter. The other nozzle hole unit is constituted by a first nozzle hole of 240 mm diameter, a second nozzle hole of 180 mm diameter and a third nozzle hole of 160 mm diameter. Also, it will be imaginable that the number of the nozzle hole units is not limited to 2 and may be 3 or more.

Figure 32:
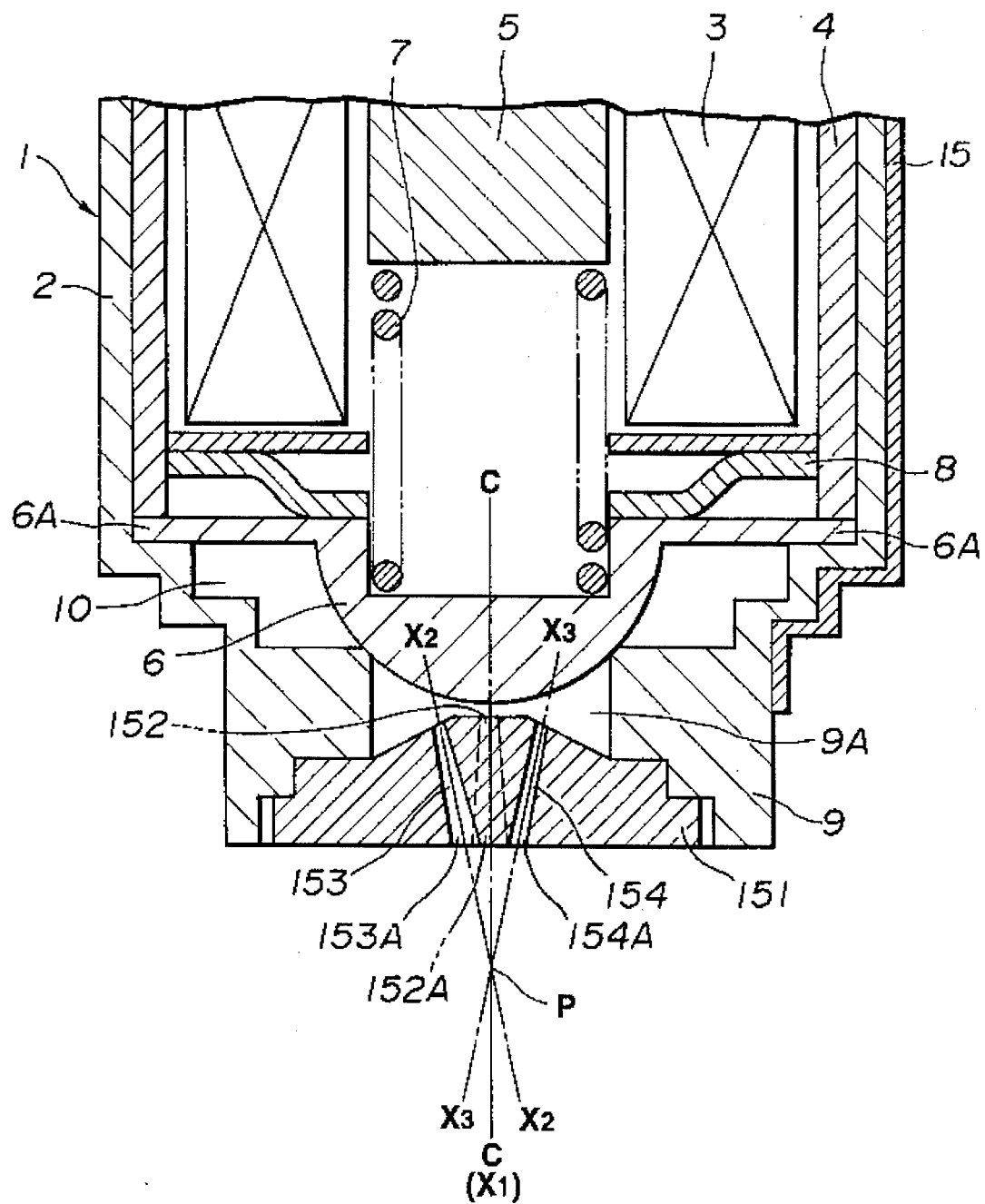
FIG. 32 is a sectional view taken along a line F32—F32 of FIG. 33 and shows an essential part of the fuel injection valve according to the thirteenth embodiment.
Figure 33:
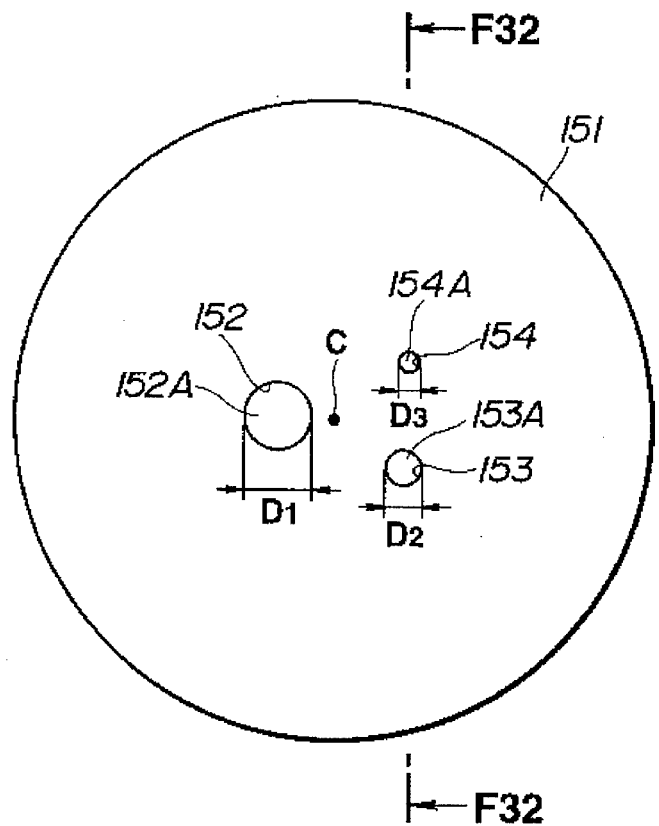
FIG. 33 is a plan view of a nozzle tip of the fuel injection valve according to the thirteenth embodiment of the present invention.

FIGS. 32 and 33 illustrate a fourteenth embodiment of the fuel injection valve according to the present invention. In this embodiment, like parts and elements with the tenth embodiment are designated by like reference numerals, and explanations thereof are omitted. The fourteenth embodiment is generally the same as the tenth embodiment except that the first, second and third nozzle holes 152, 153 and 154 are tapered from outlet to inlet. The first, second and third nozzle holes 152, 153 and 154 are formed in a nozzle tip 151. The first nozzle hole 152 has an axis $X_1$ and a diameter $D_1$ at its outlet end 152A. The second nozzle hole 153 has an axis $X_2$ and a diameter $D_2$ at its outlet end 153A. The third nozzle hole 154 has an axis $X_3$ and a diameter $D_3$ at its outlet end 154A. The diameter $D_1$ is larger than the diameter $D_2$. The diameter $D_2$ is larger than the diameter $D_3$. The first and third nozzle holes 152 and 154 are formed to satisfy the relationship mentioned in the tenth embodiment. That is, the ratio $\alpha$ between a square root of a cross-sectional area at the outlet end 152A and a square root of a cross-sectional area at the outlet end 154A is larger than 1.2.

With the thus arranged fuel injection valve, advantages gained by the first embodiment are similarly obtained. Further, the productivity of the nozzle tip 151 is improved since the nozzle holes 152, 153 and 154 are formed tapered from outlet to inlet.

Figure 35:
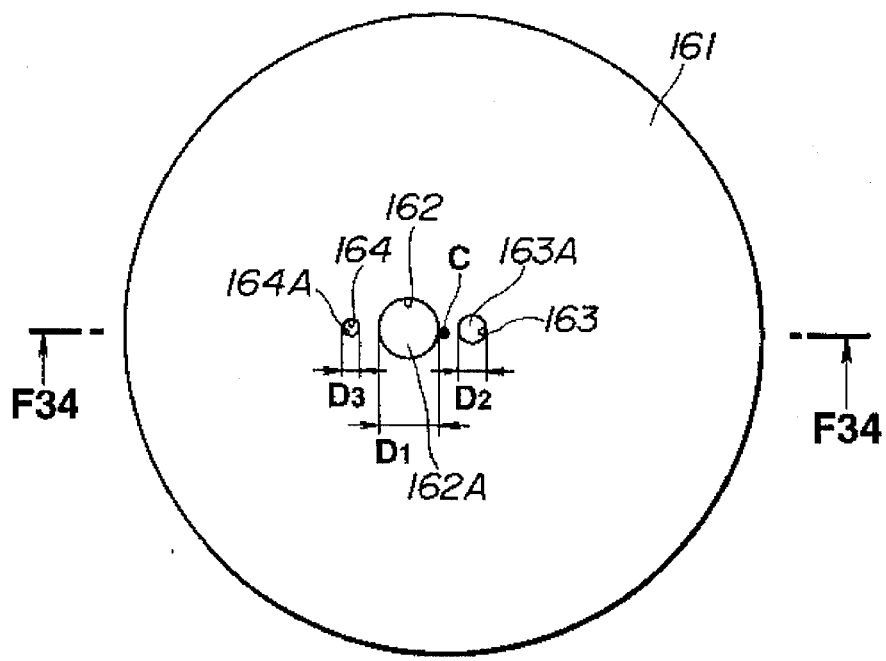
FIG. 35 is a plan view of a nozzle tip of the fuel injection valve according to the fourteenth embodiment.
Figure 34:
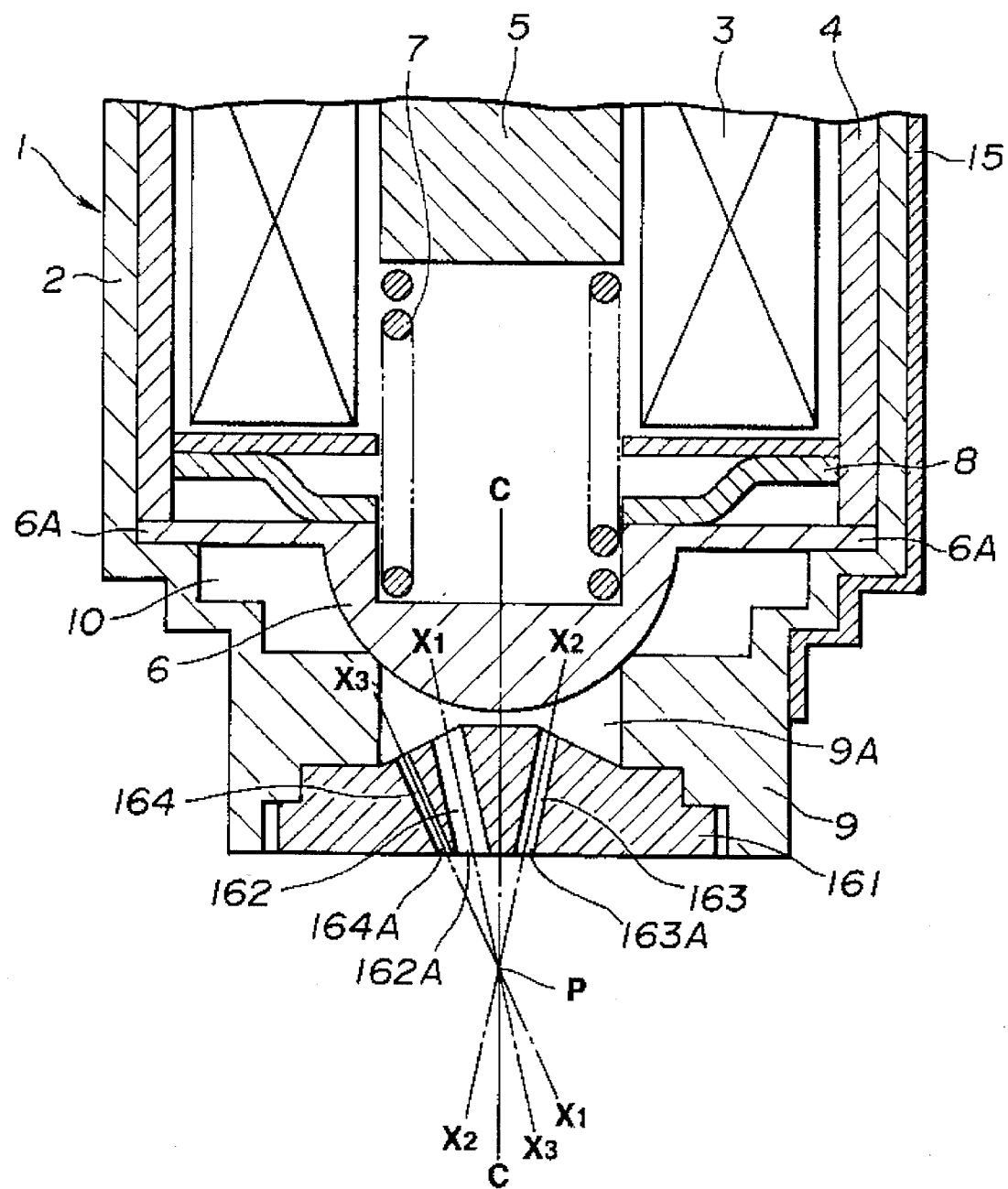
FIG. 34 is a sectional view taken along a line F34—F34 of FIG. 35 and shows an essential part of the fuel injection valve according to a fourteenth embodiment according to the present invention.
Figure 36:
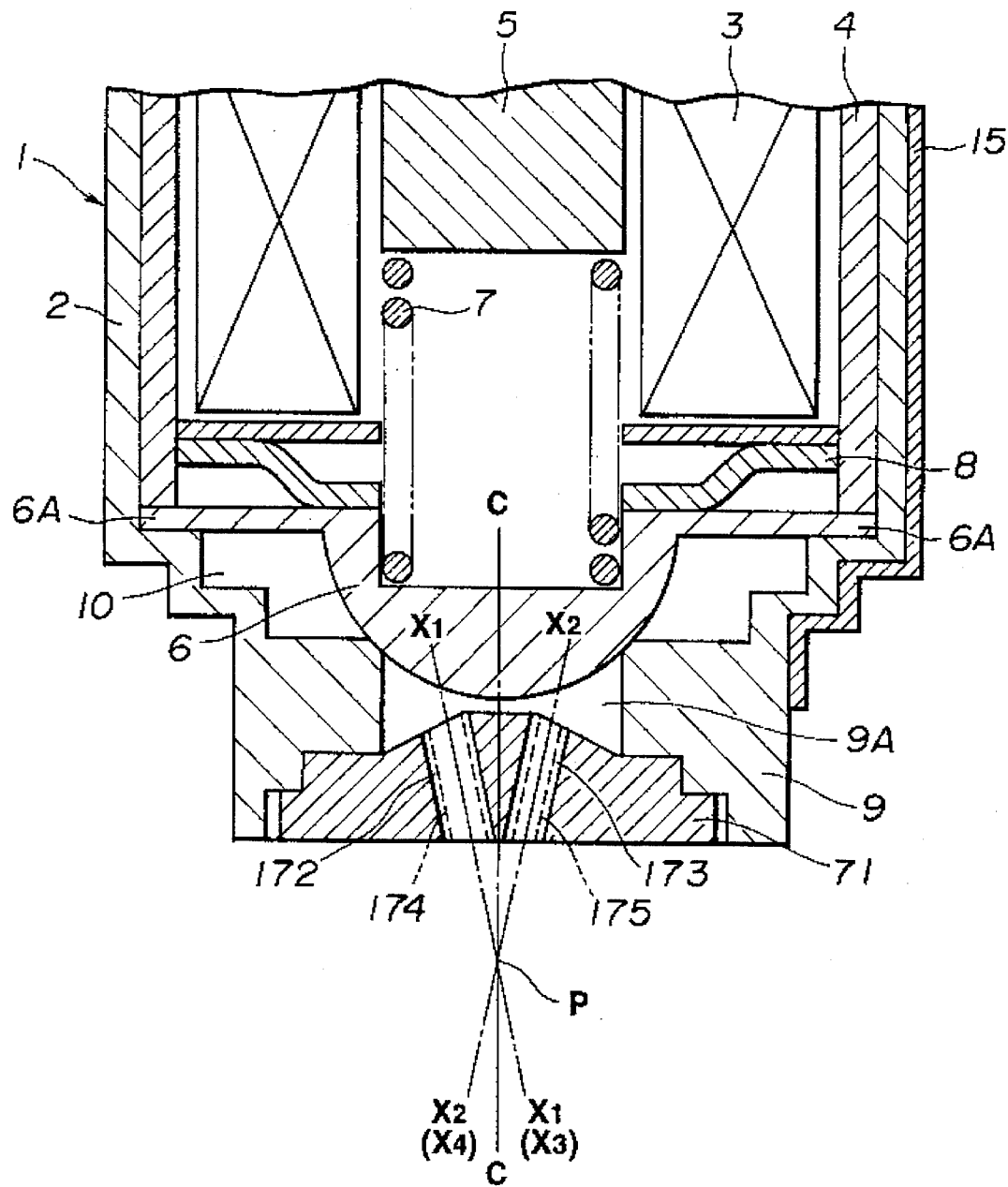
FIG. 36 is a sectional view which shows an essential part of the fuel injection valve according to a fifteenth embodiment of the present invention.

FIGS. 34 and 35 illustrate a fifteenth embodiment of the fuel injection valve according to the present invention. In this embodiment, like parts and elements with the tenth embodiment are designated by like reference numerals, and explanations thereof are omitted. First, second and third nozzle holes 162, 163 and 164 are formed in-line in a nozzle tip 161 as shown in FIG. 35. The first nozzle hole 162 is located between the second and third nozzle holes 163 and 164. The first nozzle hole 162 is formed straight and circular. An outlet end 162A of the first nozzle hole 162 has a diameter $D_1$ and an axis $X_1$. The first nozzle hole 163 is formed straight and circular. An outlet end 163A of the second nozzle hole 163 has a diameter $D_2$ and an axis $X_2$. The third nozzle hole 164 is formed straight and circular. An outlet end 164A of the first nozzle hole 164 has a diameter $D_3$ and an axis $X_3$. The diameter $D_1$ is larger than the diameter $D_2$. The diameter $D_2$ is larger than the diameter $D_3$. The axes $X_1$, $X_2$ and $X_3$ intersect at a point P on the center axis C of the valve body 1, and lie in an imaginary plane. The first and third nozzle holes 162 and 164 are formed so that the ratio $\alpha$ between a square root of a cross-sectional area at the outlet end 162A and a square root of a cross-sectional area at the outlet end 164A is larger than 1.2.

With the thus arranged fuel injection valve, advantages gained by the tenth embodiment are similarly obtained. Further, a spray pattern of the injected fuel becomes a largely flatted shape which is not a cone shape but a sector shape.

FIGS. 36 to 40 illustrate a sixteenth embodiment of the fuel injection valve according to the present invention. In this embodiment, like parts and elements with the tenth embodiment are designated by like reference numerals, and explanations thereof are omitted. Four nozzle holes are formed in a nozzle tip so as to intersect at the point P of the center axis C.

Figure 37:
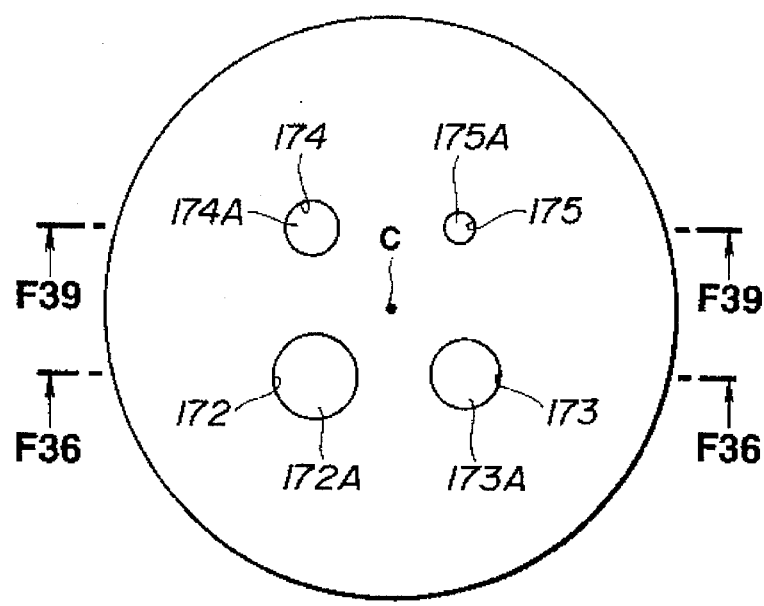
FIG. 37 is a plan view of a nozzle tip of the fifteenth embodiment.
Figure 38:
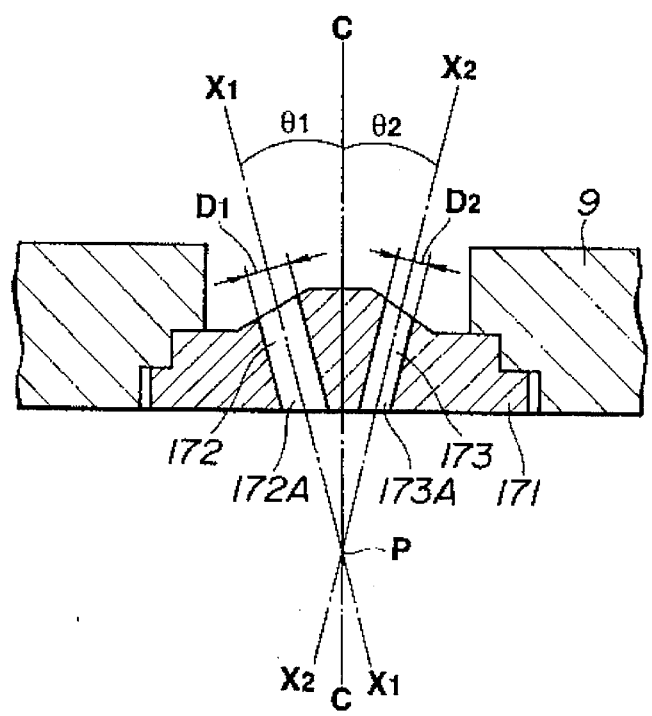
FIG. 38 is an enlarged sectional view of the nozzle tip of the fifteenth embodiment.
Figure 39:
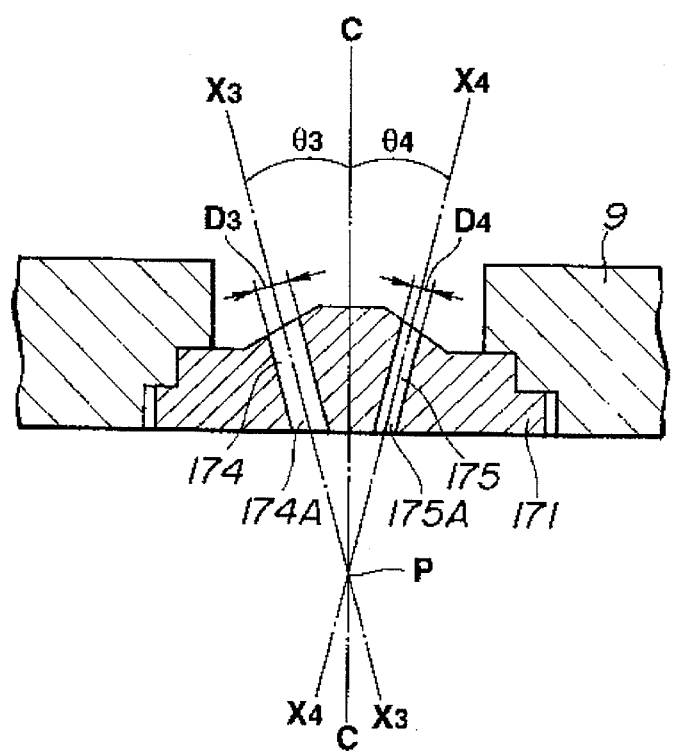
FIG. 39 is another enlarged sectional view of the nozzle tip of the fifteenth embodiment.

As shown in FIGS. 37 to 39, the first nozzle hole 172 is formed straight and circular. An outlet end 172A of the first nozzle hole 172 has a diameter $D_1$ and a cross-sectional area $S_1$. The second nozzle hole 173 is formed straight and circular. An outlet end 173A of the second nozzle hole 173 has a diameter $D_2$ and a cross-sectional area $S_2$. The third nozzle hole 174 is formed straight and circular. An outlet end 174A of the third nozzle hole 174 has a diameter $D_3$ and a cross-sectional area $S_3$. The fourth nozzle hole 175 is formed straight and circular. An outlet end 175A of the fourth nozzle hole 175 has a diameter $D_4$ and a cross-sectional area $S_4$. The diameter $D_1$ is formed larger than the diameter $D_2$. The diameter $D_2$ is larger than the diameter $D_3$. The diameter $D_3$ is larger than the diameter $D_4$. An axis $X_1$ of the first nozzle hole 172 forms an angle $\theta_1$ with an axis C of the valve body 1. An axis $X_2$ of the second nozzle hole 173 forms an angle $\theta_2$ with the axis C. An axis $X_3$ of the third nozzle hole 174 forms an angle $\theta_3$ with the axis C. An axis $X_4$ of the fourth nozzle hole 175 forms an angle $\theta_4$ with the axis C. The axes $X_1$, $X_2$, $X_3$ and $X_4$ intersect at the point P on the axis C.

Figure 40:
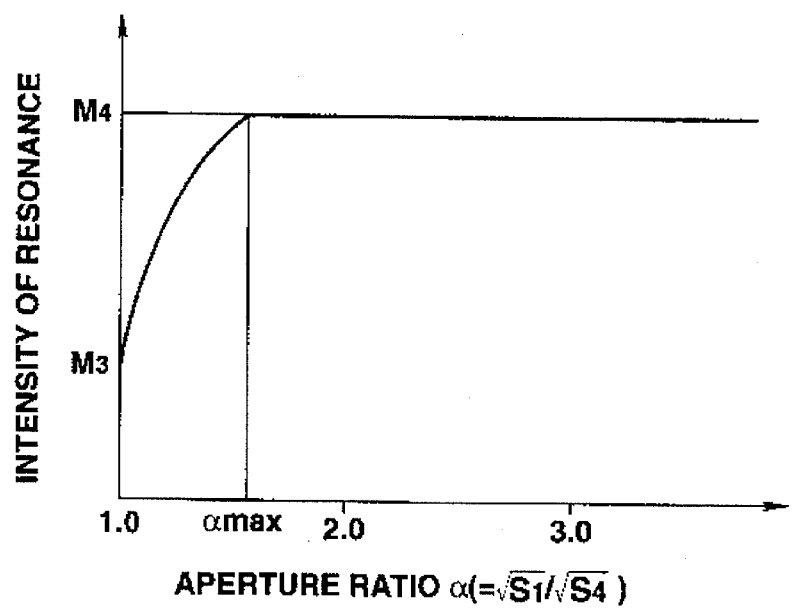
FIG. 40 is a graph which shows a relationship between a diametrical ratio and an intensity of resonance in case that four nozzle holes are formed in one unit.

Herein, we report a relationship between a ratio $\alpha$ and an intensity of a resonance with reference to FIG. 40. The ratio a is defined as a ratio between square roots of the cross-sectional areas $S_1$ and $S_4$, and the resonance is generated by a impact between injected fuels through the first, second, third and fourth nozzle holes 172 to 175. As shown in FIG. 40, the intensity of the resonance takes a value $M_3$ when all diameters of the nozzle holes 172 to 175 are equal with each other ($\alpha=1$). When at least one of the nozzle holes is different from others in diameter, the intensity of the resonance is radially increased and takes a value $M_4$. That is, as is clear from FIG. 40 it is possible to obtain a high intensity of the resonance by differentiating at least one nozzle hole from others in diameter. Further, if the ratio $\alpha$ is set within a range from 1.3 to 1.7, the intensity of the resonance take a maximum value $M_4$. Accordingly, it is preferable to set the ratio $\alpha$ at a value more than 1.3. Furthermore, it is more preferable to set at 1.5 or more.

With the thus arranged fuel injection valve, since at least one nozzle hole may be formed to be different from other nozzle holes in diameter to improve the atomization, the degree of freedom in design and the utility of the valve are improved in spite of a provision of many nozzle holes.

Figure 41:
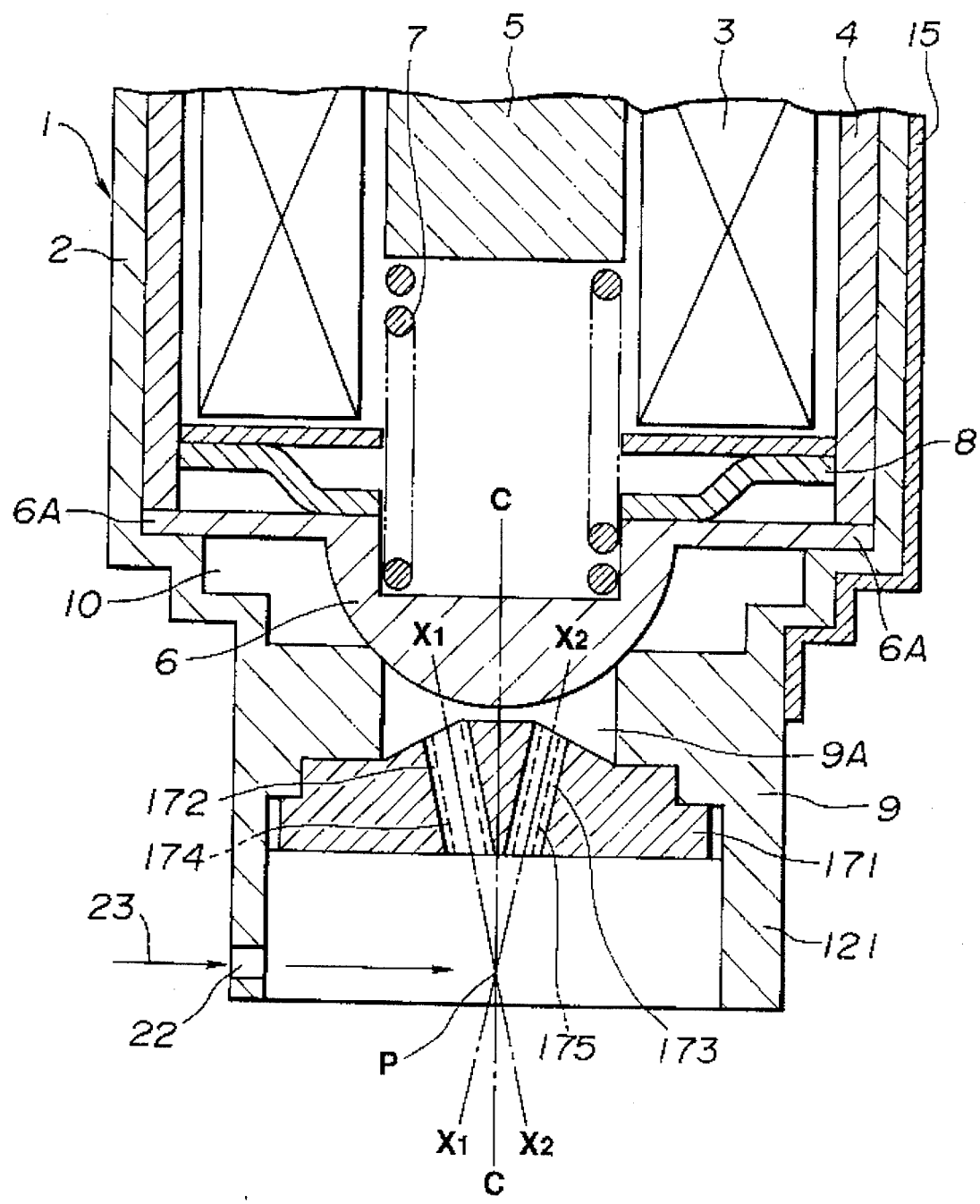
FIG. 41 is a sectional view which shows an essential part of the fuel injection valve according to a seventeenth embodiment of the present invention.
Figure 42:
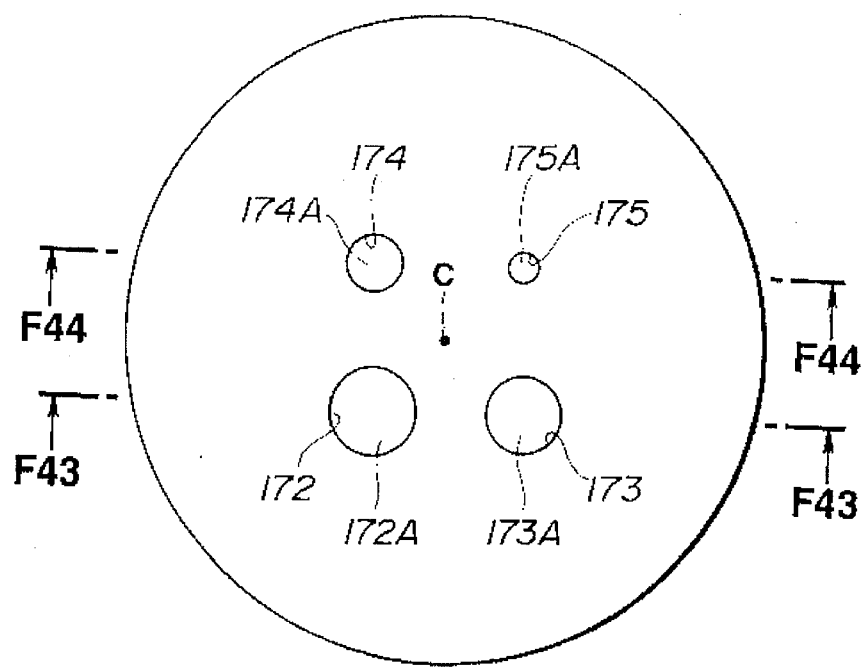
FIG. 42 is a plan view of a nozzle tip of the seventeenth embodiment.
Figure 43:
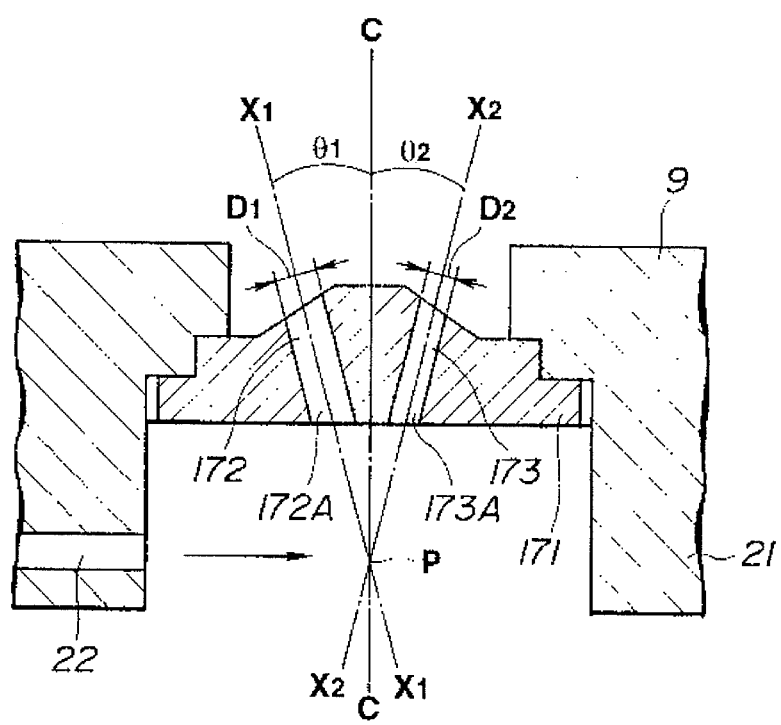
FIG. 43 is a sectional view taken along a line F43—F43 of FIG. 42.
Figure 44:
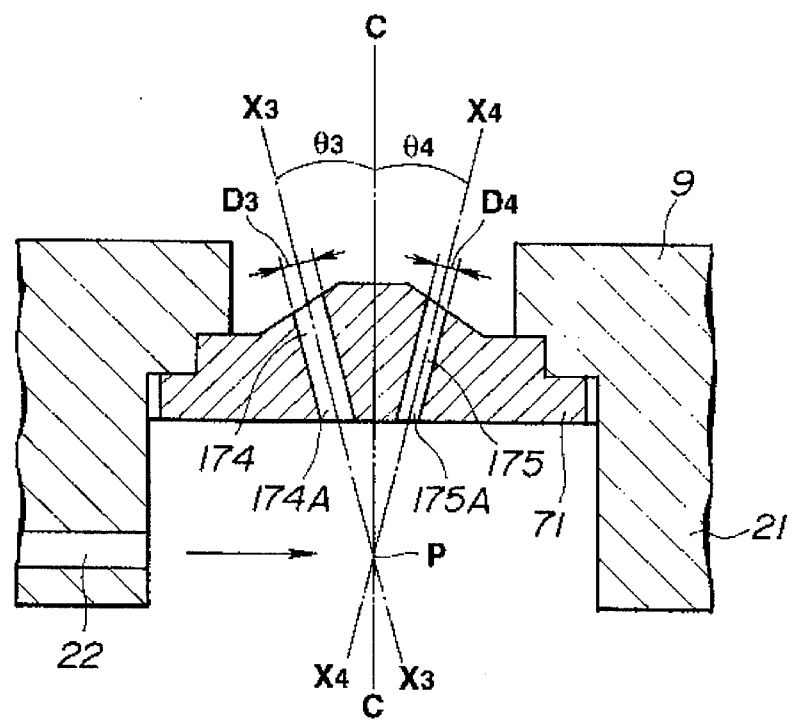
FIG. 44 is a sectional view taken along a line F44—F44 of FIG. 42.

FIGS. 41 to 44 illustrate a seventeenth embodiment of the fuel injection valve according to the present invention. In this embodiment, like parts and elements with the sixteenth embodiment are designated by like reference numerals. The seventeenth embodiment is generally the same as the sixteenth embodiment except that the valve sheet portion 9 of the casing 2 is extended so as to surround the injected fuel as shown in FIG. 41. An extended portion 21 of the valve sheet portion 9 has an air injection hole 22 which is directed toward the point P. An inlet side of the air injection hole 22 is connected with an intake passage (not shown) through an air supply passage 23. Accordingly, an assist air for accelerating the atomization of the fuel is injected toward the collision point P of the injected fuels. Although in this embodiment the air injection hole 22 is formed so that an axis of the air injection hole 22 is generally perpendicular with the axis C of the valve body 1, the air injection hole 22 may be formed so as to obliquely inject the assist air toward the collision point P, and a plurality of air injection holes 22 may be formed.

With the thus arranged injection valve, since assist air is injected toward the injected fuel, the atomization of fuel is further improved.

Figure 46:
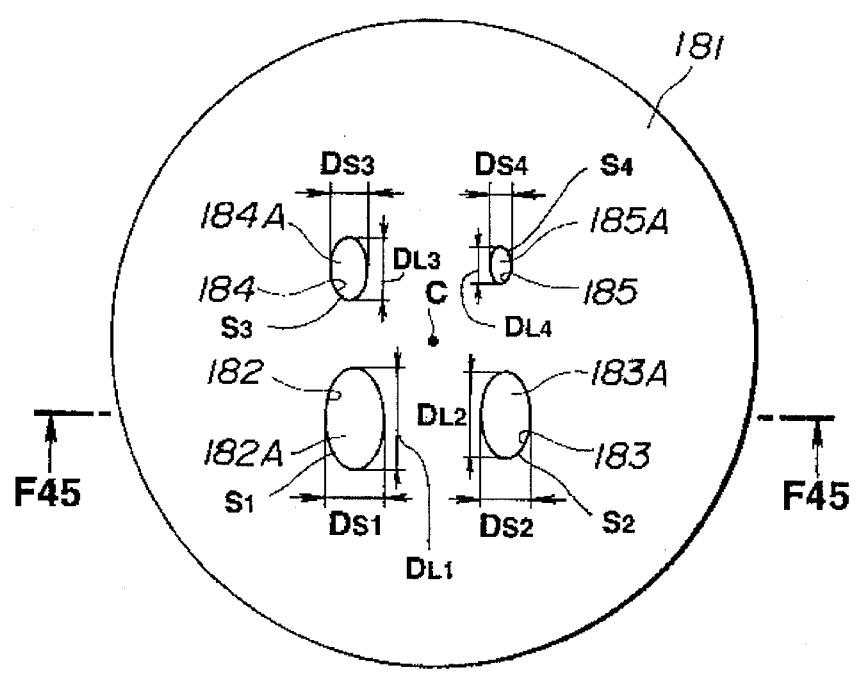
FIG. 46 is a plan view of a nozzle tip of the eighteenth embodiment.
Figure 45:
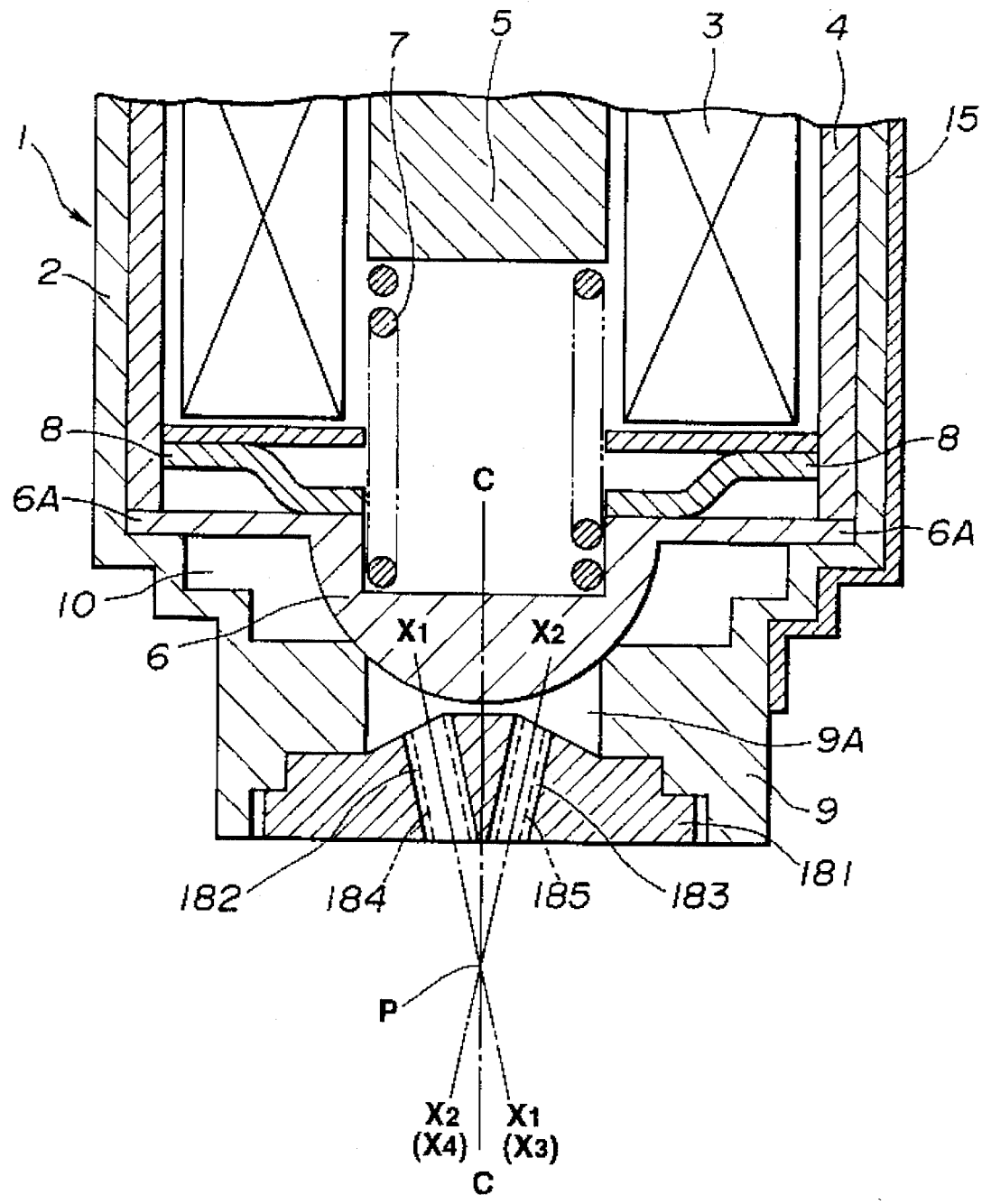
FIG. 45 is a sectional view which shows an essential part of the fuel injection valve according to an eighteenth embodiment of the present invention.

FIGS. 45 and 46 illustrate an eighteenth embodiment of the fuel injection valve according to the present invention. In this embodiment, like parts and elements with the sixteenth embodiment are designated by like reference numerals, and explanations thereof are omitted. The eighteenth embodiment is generally the same as the sixteenth embodiment except that first, second, third and fourth nozzle holes 182 to 185 are formed in a non-circular shape, such as in an elliptical shape.

The first nozzle hole 182 is formed straight and elliptical. An outlet end 182A of the first nozzle hole 182 has a major axis $D_{L1}$, a minor axis $D_{S1}$, and a cross-sectional area $S_1$. The second nozzle hole 183 also formed straight and has a major axis $D_{L2}$, a minor axis $D_{S2}$ and a cross-sectional area $S_2$. The third nozzle hole 184 is formed straight and has a major axis $D_{L3}$, a minor axis $D_{S3}$, and a cross-sectional area $S_3$. The third nozzle hole 185 is formed straight and has a major axis $D_{L4}$, a minor axis $D_{S4}$, and a cross-sectional area $S_4$. Axes $X_1$, $X_2$, $X_3$ and $X_4$ of the nozzle holes 182 to 185 intersect at a point P on the axis C. The first and second nozzle holes 22 and 23 are formed so that the ratio $\alpha$ between a square root of the cross-sectional area $S_1$ and a square root of the cross-sectional area $S_4$ is larger than 1.2.

With the thus arranged fuel injection valve, advantages gained by the first embodiment are similarly obtained. Further, since the first, second third and fourth holes 182 and 185 are formed elliptical, it is possible to inject fuel with a directivity. Accordingly, it becomes possible to supply atomized fuel to a proper direction according to a shape of an applied intake port so as to effectively and properly supply the fuel in combustion chambers of an engine.

Figure 47:
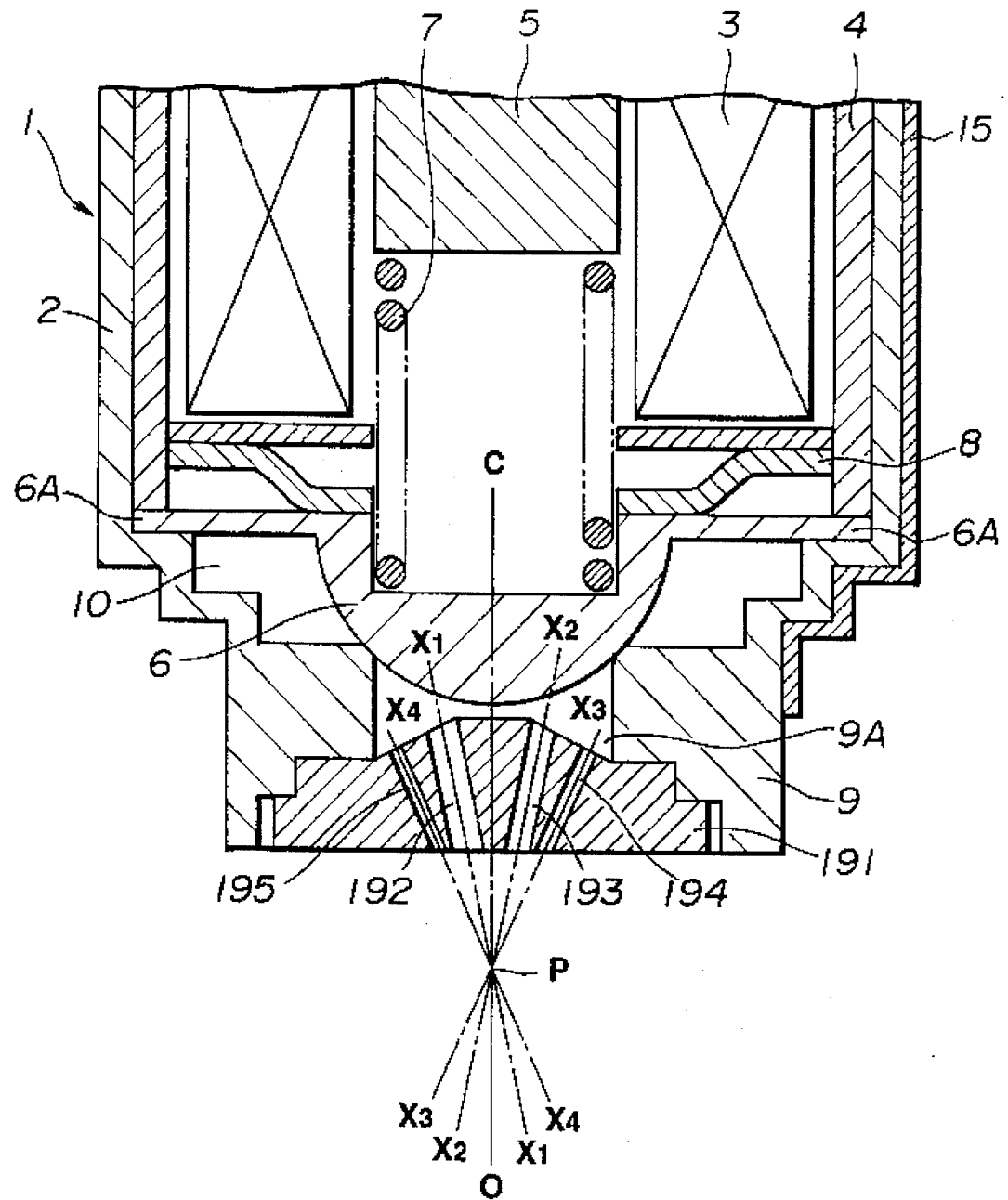
FIG. 47 is a sectional view which shows an essential part of the fuel injection valve according to a nineteenth embodiment of the present invention.
Figure 48:
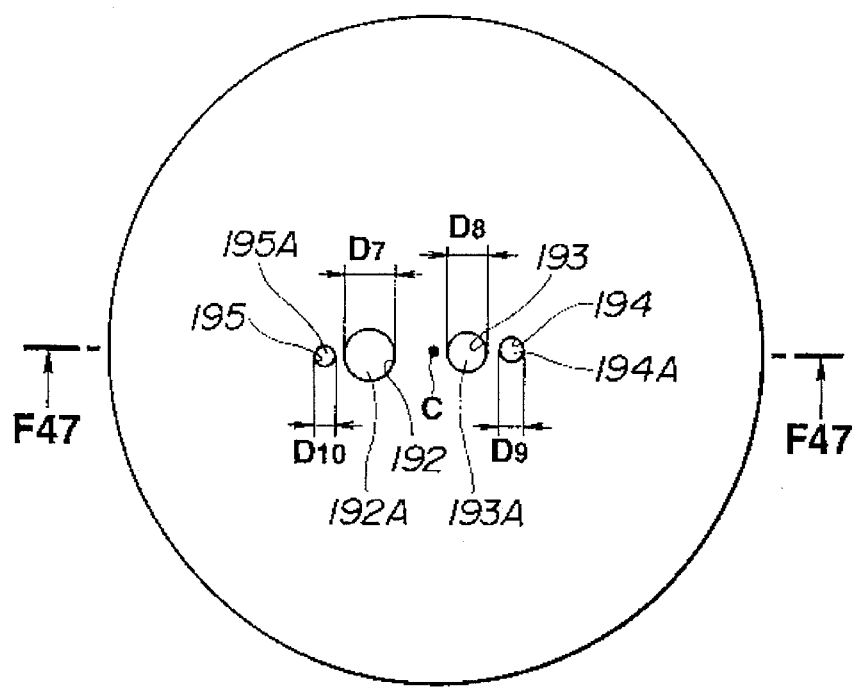
FIG. 48 is a plan view of a nozzle tip of the nineteenth embodiment.

FIGS. 47 and 48 illustrate a nineteenth embodiment of the fuel injection valve according to the present invention. In this embodiment, first, second, third and fourth nozzle holes 192, 193, 194 and 195 are formed in-line in a nozzle tip 191 as shown in FIG. 47. The first nozzle hole 192 is located between the second and fourth nozzle holes 193 and 195. The second nozzle hole 192 is located between the first and third nozzle holes 192 and 194. The first nozzle hole 192 is formed straight and has a diameter $D_1$ and an axis $X_1$. The second nozzle hole 193 is formed straight and has a diameter D2 and an axis $X_2$. The third nozzle hole 194 is formed straight and has a diameter $D_3$ and an axis $X_3$. The fourth nozzle hole 195 is formed straight and has a diameter $D_4$ and an axis $X_4$. The diameter $D_1$ is larger than the diameter $D_2$. The diameter $D_2$ is larger than the diameter $D_3$. The diameter $D_3$ is larger than $D_4$. The axes $X_1$, $X_2$, $X_3$ and $X_4$ intersect at a point P on the center axis C of the valve body 1.

With the thus arranged fuel injection valve, advantages gained by the tenth embodiment are similarly obtained. Further, a spray pattern of the injected fuel becomes a largely flatted shape which is not a cone shape but a sector shape.

Figure 50:
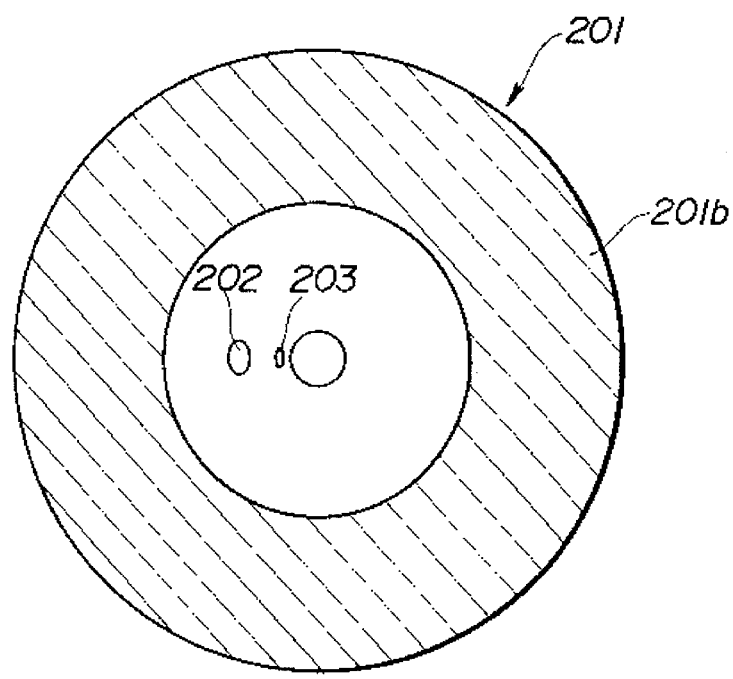
FIG. 50 is a sectional view taken along a line F50—F50 of FIG. 49.
Figure 49:
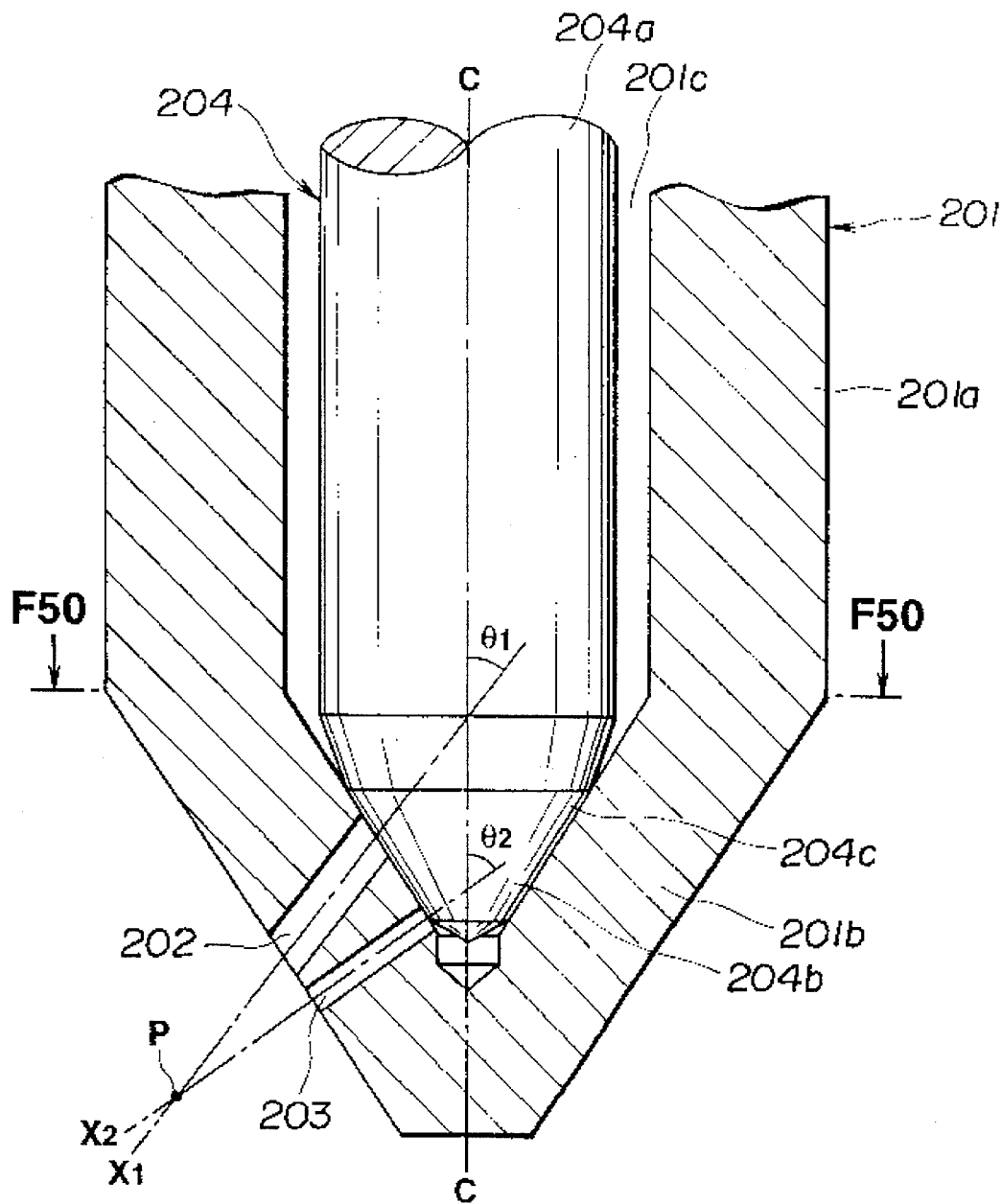
FIG. 49 is a sectional view which shows an essential part of the fuel injection valve according to a twentieth embodiment of the present invention.

Referring to FIGS. 49 and 50, there is shown a twentieth embodiment of a suck-less type fuel injection valve according to the present invention. A nozzle body 201 is fixedly installed at a tip end portion of a casing (not shown) including an electromagnetic actuator by means of a caulking and the like. The fuel injection valve is disposed to directly inject fuel into a combustion chamber of an engine. The nozzle body 201 includes a cylinder portion 201a and a cone portion 201b integral with the cylinder portion 201a. A fuel passage 201c communicated with a fuel tank (not shown) through a fuel supply system is formed in the nozzle body 201. The cone portion 201b is provided with first and second nozzle holes 202 and 203. The first nozzle hole 202 is larger in diameter that the second nozzle hole 203. As shown in FIG. 49, the first nozzle 202 is formed on an axis $X_1$ having an angle $\theta_1$ with the center axis C of the nozzle body 201. The second nozzle hole 203 is formed on an axis $X_2$ having an angle $\theta_2$ with the center axis C. The axes $X_1$ and $X_2$ intersect at a point P so that injected fuels through the nozzle holes 202 and 203 are collided.

The first and second nozzle holes 202 and 203 are formed so that the ratio $\alpha$ between a square root of a cross-sectional area $S_1$ and a square root of a cross-sectional area $S_2$ is in the range of 1.25–3.50. That is, the relationship is defined as follows:

$$1.25 \leq \alpha = (S_1)^{1/2}/(S_2)^{1/2} \leq 3.50.$$

A valve stem 204 is disposed in a space defined by the nozzle body 201. The valve stem 204 is reciprocatingly movable in the direction of the axis C. The valve stem 204 includes a stem portion 204a and a cone portion 204b integral with the stem portion 204c. A sheet portion 204c integral with the cone portion 204b is arranged to set the valve in a closed condition by contacting with the cone portion 201b of the nozzle body 201. The first and second nozzle holes 202 and 203 are disposed on or downstream side of the seal portion the sheet portion 204c and the cone portion 301c.

The manner of operation of the thus arranged suck-less type injection valve according to the present invention will be discussed hereinafter.

The nozzle stem 204 is moved to cut a contact between the sheet portion 204c and the cone portion 301c when the fuel injection valve receives an injection signal from a controller (not shown). The sheet portion 204c is released from the cone portion 201b, and therefore fuel flows into the first and second nozzle holes 202 and 203. Then, the fuel is injected through the first and second nozzle holes 202 and 203 and collided at the point P. This collision accomplishes atomization of the fuel.

With the thus arranged fuel injection valve, since fuel to be injected is supplied first to the larger nozzle hole and supplied second to the smaller nozzle hole, the size of fuel drops injected through the nozzle holes 202 and 203 becomes generally similar to each other. This enables to obtain a further strong resonance. That is, although a pressure P applied to fuel at the second nozzle hole 203 is smaller than a pressure $P_1$ applied to fuel at the first nozzle hole 202, both speeds of fuel jets become generally the same since the second nozzle hole 203 is formed small. Accordingly, the sizes of drops of both injected fuels become generally the same. This improves the atomization of fuels. As a result, the injected fuel is prevented from being attached on walls of the combustion chamber, and therefore the amount of HC in exhaust gases is largely-reduced. Further, this improvement in atomization generates an advantage that a temperature in a combustion chamber is lowered due to the vaporization of the injected fuel.

Figure 51:
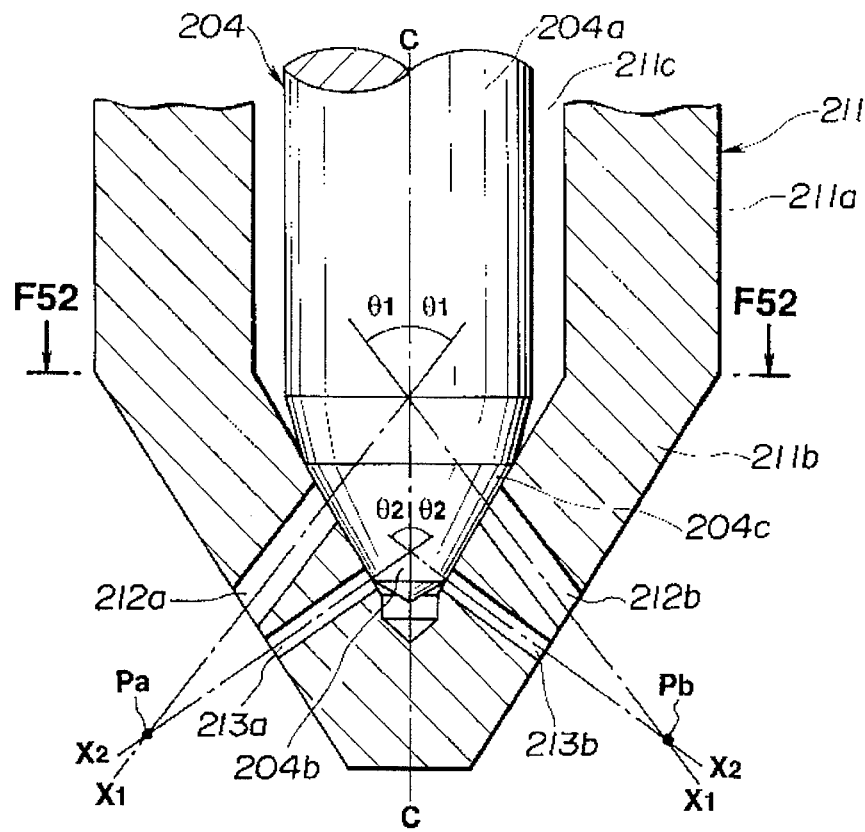
FIG. 51 is a sectional view which shows an essential part of the fuel injection valve according to a twenty-first embodiment of the present invention.
Figure 52:
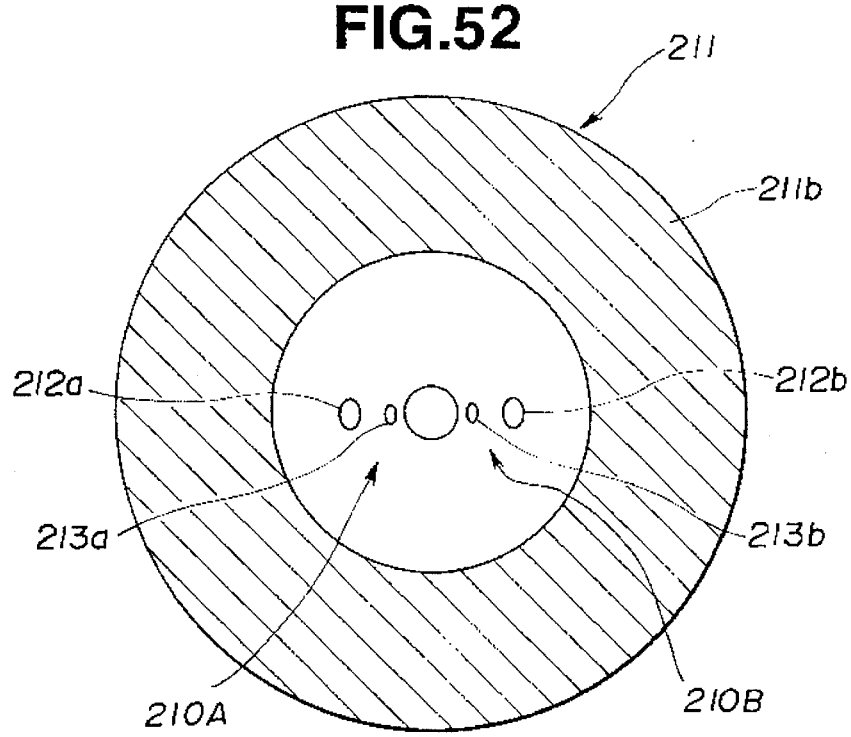
FIG. 52 is a sectional view taken in the direction of allows substantially along the line F52—F52 of FIG. 51.

FIGS. 51 and 52 illustrate a twenty-first embodiment of the suck-less type fuel injection valve according to the present invention. In this embodiment, like parts and elements with the twentieth embodiment are designated by like reference numerals, and explanations thereof are omitted. A nozzle body 211 includes a cylinder portion 211a and a cone portion 211b integral with the cylinder portion 211a. A fuel passage 211c communicated with a fuel tank (not shown) through a fuel supply system is formed in the nozzle body 211. The cone portion 211b is provided with a pair of nozzle hole units 210A and 210B. The pair of nozzle hole units 210A and 210B are an axial symmetry. Each of nozzle hole units 210A and 210B is constituted by first and second nozzle holes 212 and 213. The four nozzle holes are disposed in-line as shown in FIG. 52. The first nozzle hole 212 of each nozzle hole unit 210A, 210B is formed larger in diameter than the second nozzle hole 213 of each unit 210A, 210B, respectively. As shown in FIG. 51, the first nozzle 212 is formed on an axis $X_1$ to form an angle $\theta_1$ with the center axis C of the nozzle body 201. The second nozzle hole 213 is formed on an axis $X_2$ to form an angle $\theta_2$ with the center axis C. The axes $X_1$ and $X_2$ of the first nozzle hole unit 210A intersect with each other at a point Pa. The axes $X_1$ and $X_2$ of the first nozzle hole unit 210A intersect with each other at a point Pb. The first and second nozzle holes 212 and 213 of each nozzle hole unit 210A, 210B are formed so that the ratio $\alpha$ between a square root of a cross-sectional area of the first nozzle hole 212 and a square root of a cross-sectional area of the second nozzle hole 213 is within the range 1.25 to 3.5. That is, the relationship is defined as follows:

$$1.25 = \alpha \leq (S_1)^{1/2}/(S_2)^{1/2} \leq 3.5.$$

With the thus arranged fuel injection valve, advantages gained by the twentieth embodiment are similarly obtained. Further, since each of nozzle hole units 210A and 210B includes the first and nozzle holes 212 and 213, it is possible to inject fuel toward two directions. Accordingly, it becomes possible to supply atomized fuel to the respective directions in a combustion chamber.

Figure 53:
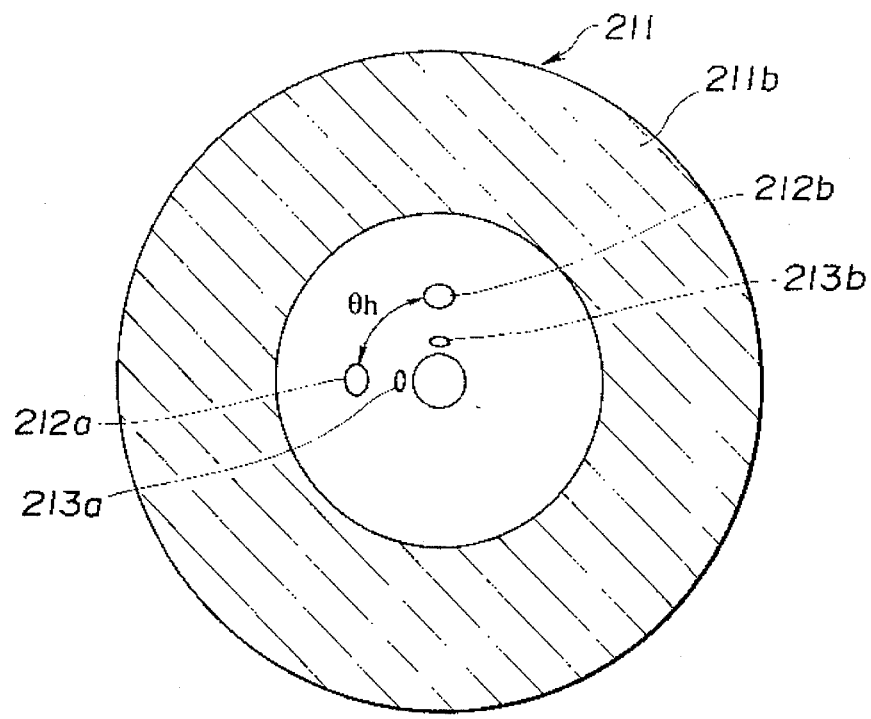
FIG. 53 is a sectional view which shows a modification of the twenty-first embodiment.
Figure 54:
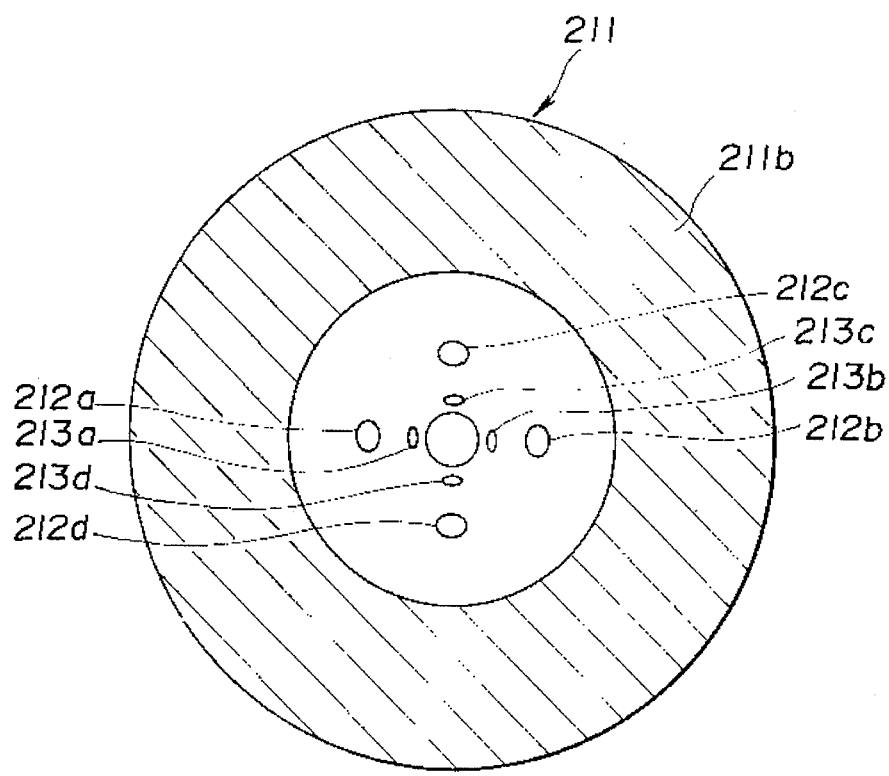
FIG. 54 is a sectional view which shows another modification of the twenty-first embodiment.

Although in this embodiment the pair of nozzle hole units have been shown and described to includes the same first nozzle holes 212 and the same second nozzle hole 213, it will be understood that the pair of the nozzle hole units are formed to be different in size. Furthermore, it will be understood that the disposition of the pair of nozzle hole units 210A and 210B is not limited to be in-line. For example, as shown in FIG. 53, the nozzle hole units 210A and 210B may be arranged to have an angle 90° around the axis C. Also, the nozzle hole units are not limited to be two sets, and may be arranged by four unit as shown in FIG. 54.

Figure 55:
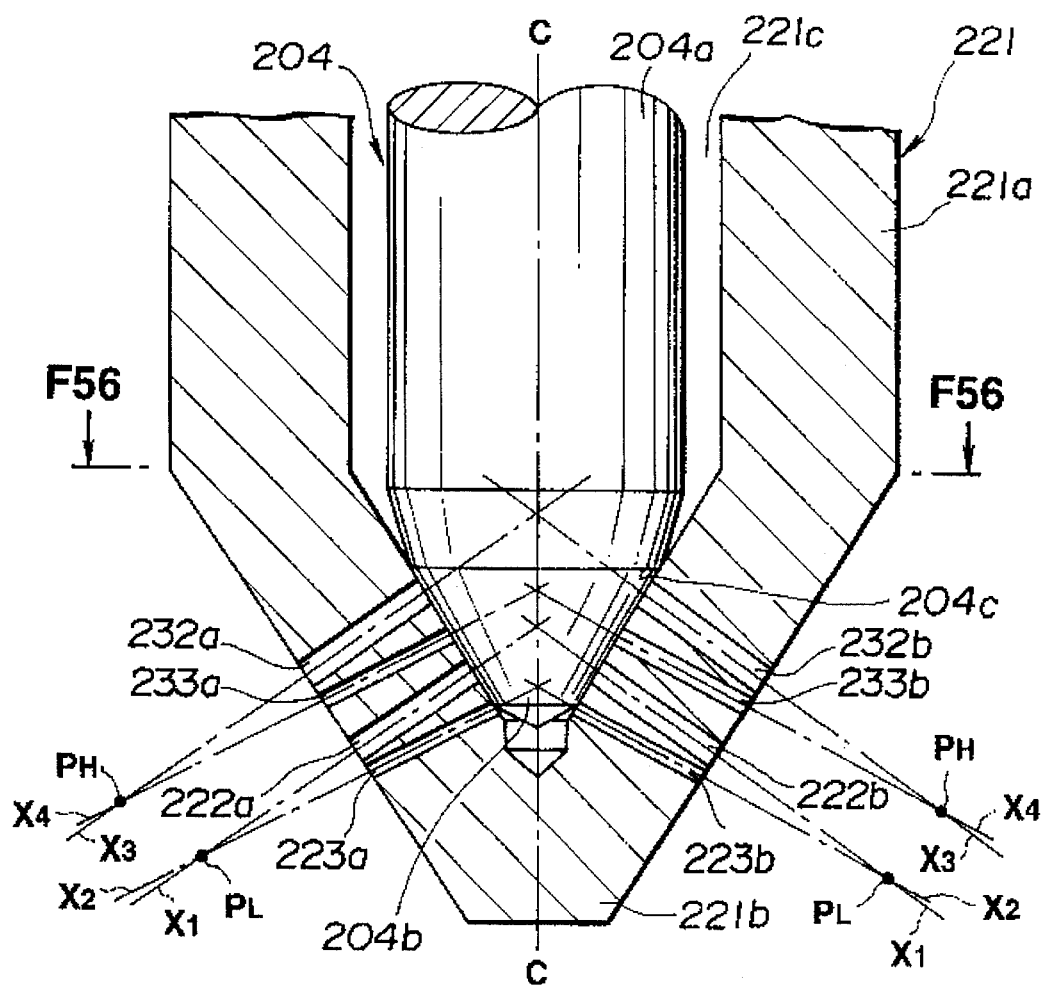
FIG. 55 is a sectional view which shows an essential part of the fuel injection valve according to a twenty-second embodiment of the present invention.
Figure 56:
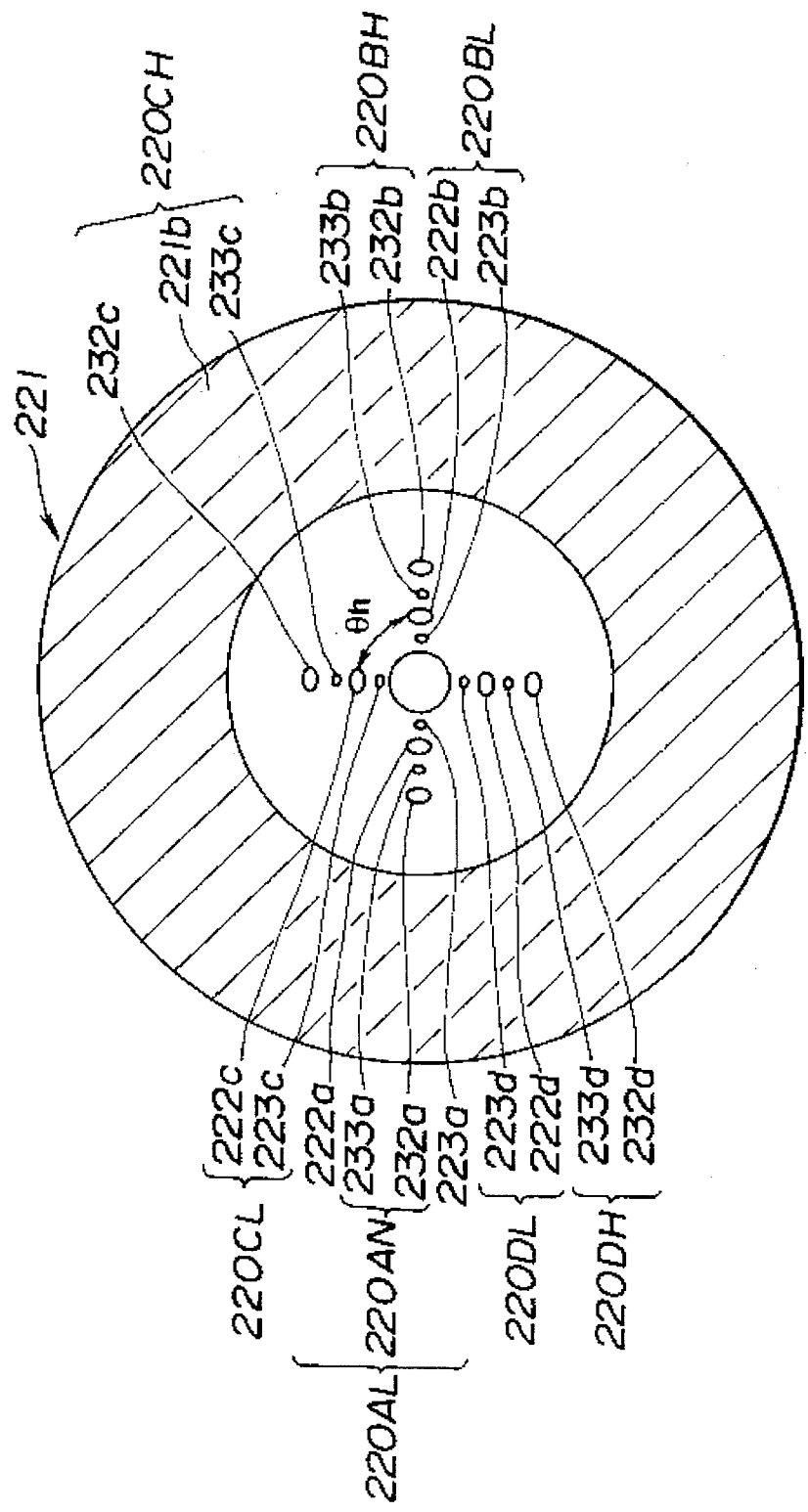
FIG. 56 is a sectional view taken in the direction of arrows substantially along the line F56—F56 of FIG. 55.

FIGS. 55 and 56 illustrate a twenty-second embodiment of the suck-less fuel injection valve according to the present invention. In this embodiment, like parts and elements with the twentieth embodiment are designated by like reference numerals, and explanations thereof are omitted. A nozzle body 221 includes a cylinder portion 221a and a cone portion 221b integral with the cylinder portion 211a. A fuel passage 221c communicated with a fuel tank (not shown) through a fuel supply system is formed in the nozzle body 221. The cone portion 221b is provided with eight nozzle hole units 220AH, 220AL, 220BH, 220BL, 220CH, 220CL, 220DH and 220DL, as shown in FIG. 56. That is, they are disposed around the axis C by two nozzle hole units at 90° degrees intervals. The each pair of nozzle hole units is constituted by a high side unit and a low side unit. Each of the high side units is constituted by a first nozzle hole 232 and a second nozzle hole 233. A first nozzle hole 232a (232b, 232c, 232d) of each high side unit 220AH (220BH, 220CH, 220DH) is formed larger in diameter than a second nozzle hole 233a (233b, 233c, 233d) of each high side unit 220AH (220BH, 220CH, 220DH). Similarly, a first nozzle hole 222a (222b, 222c, 222d) of each low side unit 220AL (220BL, 220CL, 220DL) is formed larger in diameter than a second nozzle hole 223a (223b, 223c, 223d) of each low side unit 220AL (220BL, 220CL, 220DL). As shown in FIG. 55, an axis $X_3$ of the first nozzle hole 232a (232b, 232c, 232d) of each high side unit 220AH (220BH, 220CH, 220DH) is crossed with an axis $X_4$ of the second nozzle hole 233a (233b, 233c, 233d) of each high side unit 220AH (220BH, 220CH, 220DH) at a point $P_H$. Similarly, an axis $X_1$ of the first nozzle hole 222a (222b, 222c, 222d) of each low side unit 220AL (220BL, 220CL, 220DL) is crossed with an axis $X_2$ of a second nozzle hole 223a (223b, 223c, 223d) of each low side unit 220AL (220BL, 220CL, 220DL) at a point $P_L$. Each first nozzle hole 222a (222b, 222c, 222d, 232a, 232b, 232c, 232d) and each second nozzle hole 223a (223b, 223c, 223d, 233a, 233b, 233c, 233d) are formed so that the ratio α between a square root of a cross-sectional area of the first nozzle hole and a square root of a cross-sectional area of the second nozzle hole is within the range 1.25 to 3.5. That is, the relationship is defined as follows:

$$1.25 \leq \alpha = (S_1)^{1/2}/(S_2)^{1/2} \leq 3.5.$$

With the thus arranged fuel injection valve, advantages gained by the twentieth embodiment are similarly obtained. Further, since a plurality of nozzle hole units are provided in the cone portion 221b so as to be disposed around the axis C, it is possible to easily form a proper pattern of injected fuel according to a shape of the combustion chamber.

Figure 57:
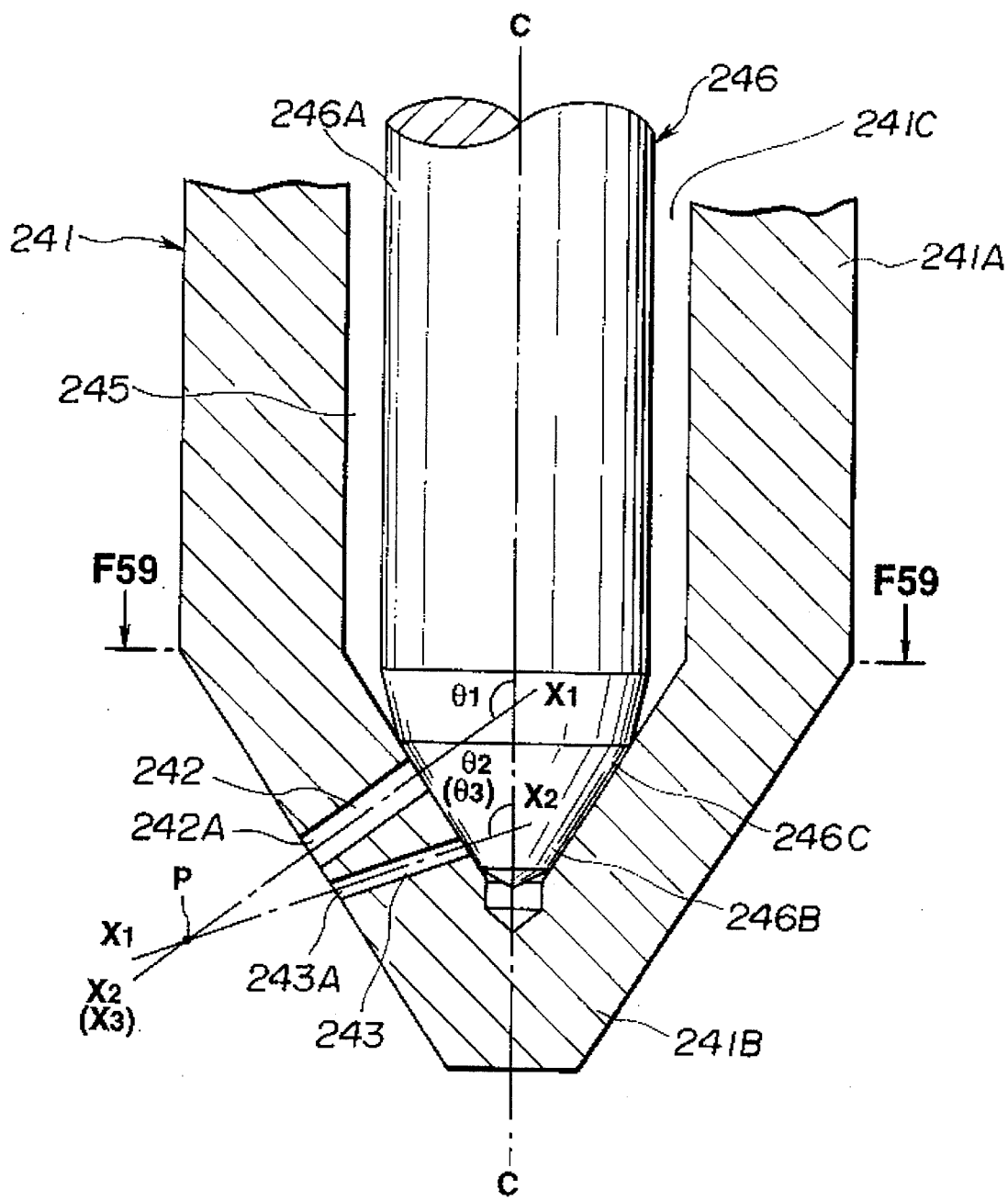
FIG. 57 is a sectional view which shows an essential part of the fuel injection valve of a twenty-third embodiment of the present invention.
Figure 58:
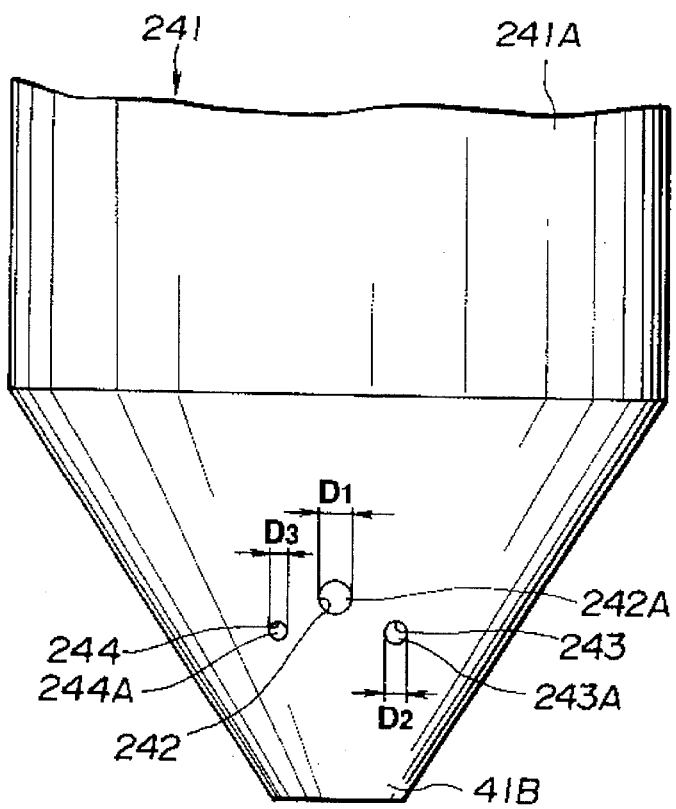
FIG. 58 is a side view of the essential part in the twenty-third embodiment.
Figure 59:
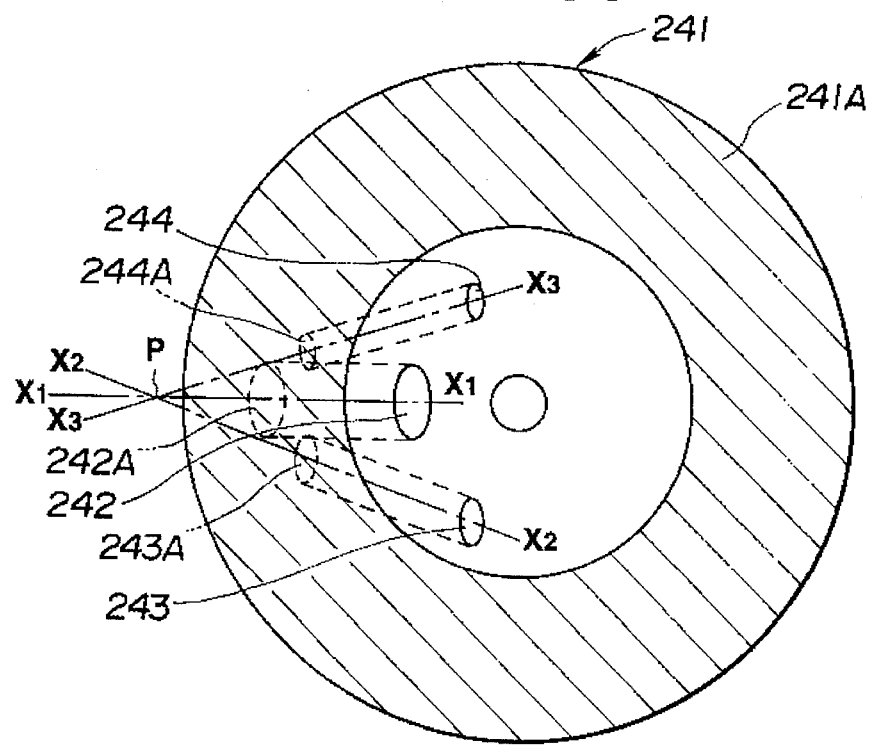
FIG. 59 is a sectional view taken in the direction of arrows substantially along the line F59—F59 of FIG. 57.

FIGS. 57 and 59 illustrate a twenty-third embodiment of the suck-less type fuel injection valve according to the present invention. In this embodiment, like parts and elements with the twentieth embodiment are designated by like reference numerals, and explanations thereof are omitted. A nozzle body 241 includes a cylinder portion 241A and a cone portion 241B integral with the cylinder portion 241A. A fuel passage 241C is formed in the nozzle body 241 and is communicated with a fuel tank (not shown) through a fuel supply system. The cone portion 241B is provided with first, second and third nozzle holes 242, 243 and 244. The first nozzle hole 242 is formed straight and circular. An outlet end 242A of the first nozzle hole 242 has a diameter $D_1$ and a cross-sectional area $S_1$. The second nozzle hole 243 is formed straight and circular. An outlet end 243A of the second nozzle hole 243 has a diameter $D_2$ and a cross-sectional area $S_2$. The third nozzle hole 244 is formed straight and circular. An outlet end 244A of the third nozzle hole 244 has a diameter $D_3$ and a cross-sectional area $S_3$. The diameter $D_1$ is formed larger than the diameter $D_2$. The diameter $D_2$ is larger than the diameter $D_3$. An axis $X_1$ of the first nozzle hole 112 forms an angle $\theta_1$ with an axis C of the valve body 241. An axis $X_2$ of the second nozzle hole 243 forms an angle $\theta_2$ with the axis C of the valve body 241. An axis X3 of the third nozzle hole 244 forms an angle $\theta_3$ with the axis C. The axes $X_1$, $X_2$ and X3 intersect at a point P as shown in FIG. 57. The first and third nozzle holes 242 and 244 are formed so that the ratio α between a square root of a cross-sectional area $S_1$ and a square root of a cross-sectional area $S_3$ is larger than 1.2. That is, the relationship is defined as follows:

$$1.2 \leq \alpha = (S_1)^{1/2}/(S_3)^{1/2}.$$

With the thus arranged fuel injection valve, advantages gained by the tenth embodiment are similarly obtained. Further, since a larger nozzle hole is disposed upstream side as compared with a medium nozzle hole and a smaller nozzle hole, the sizes of fuel drops injected through the nozzle holes 242, 343 and 344 become generally similar to each other. This enables to obtain a further strong resonance. Accordingly, the sizes of drops of both injected fuels become generally the same. This improves the atomization of fuels.

Figure 60:
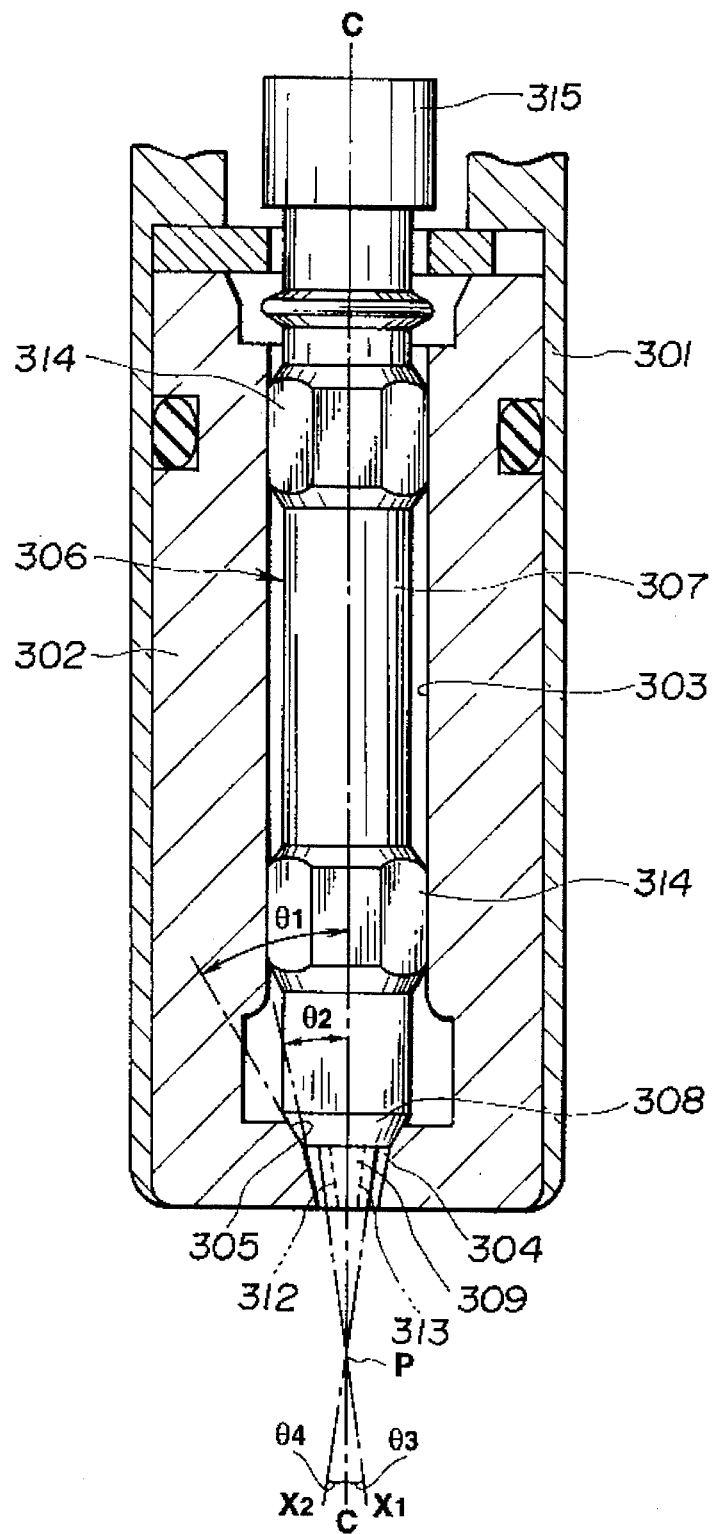
FIG. 60 is a sectional view which shows an essential part of the fuel injection valve according to a twenty-fourth embodiment of the present invention.
Figure 61:
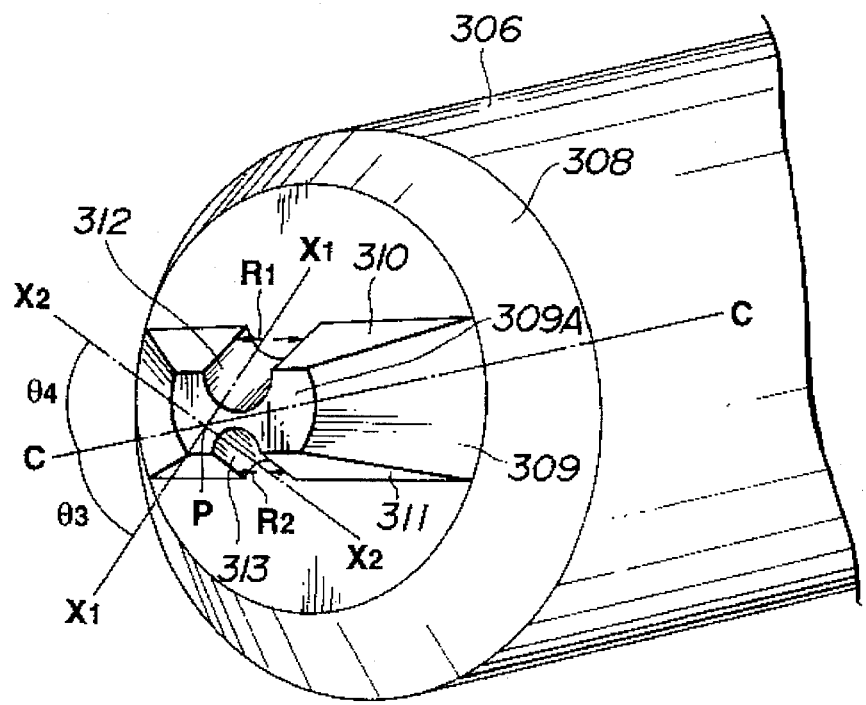
FIG. 61 is a perspective view of a needle valve of the twenty-fourth embodiment.

Referring to FIGS. 60 to 63, there is shown a twenty-fourth embodiment of a direct injection type fuel injection valve according to the present invention. FIG. 60 shows an essential part of this fuel injection valve. The fuel injection valve comprises a nozzle body 302 installed in an end portion of a casing 301. An electro-magnetic coil, a core, a valve spring and a fuel inlet are disposed in the other side of the casing 301 although not shown in Figures. The nozzle body 302 has an axial hole 303 functions as a fuel passage. An end of the axial hole 303 has a nozzle hole 304 which is directed to a combustion chamber of an engine. The nozzle hole 304 is provided with a valve sheet portion 305 of a cone shape. The valve sheet portion 305 forms an angle $\theta_1$ with an axis C of the nozzle body 302. A needle valve 306 is installed in the axial hole 303. The needle valve 306 is integral with a valve shaft 307 including protruding portions 314, 314 which apply a spiral flow to fuel. An anchor 315 made of magnetic material is connected to the axial shaft 317 and biased by a spring so as to close the nozzle hole 304 by the needle valve 306. The needle valve 306 is reciprocatingly movable in the axial direction of the nozzle body 302. The needle valve 306 is provided with a first taper portion 308 which forms an angle $\theta_1$ with the axis C. A second taper portion 309 is integrally formed at an end of the first taper portion 308, and forms an angle $\theta_2$ with the axis C. As shown in FIG. 61, the second taper portion 309 is defined by a first oblique portion 310, a second oblique portion 311 and a tip end surface 309A. The second taper portion 309 is cut away to form the first and second oblique portions 310 and 311. The first oblique portion 310 is along with an axis $X_1$ which forms an angle $\theta_3$ with the center axis C. A first semi-cylindrical groove 312 is formed at a center portion of the first oblique portion 310 to form a semi-cylindrical groove 312 of a diameter $R_1$ along the axis $X_1$. The second oblique portion 311 is along with an axis $X_2$ which forms an angle $\theta_4$ with the center axis C. A second semi-cylindrical groove 313 is formed at a center portion of the first oblique portion 311 to form a semi-cylindrical groove of a diameter $R_1$ along the axis $X_1$. The axes $X_1$ and $X_2$ intersect at a point P on the axis C. The diameters $R_1$ and $R_2$ are defined so that a ratio between a first cross-sectional area of a first fuel jet passage defined by the first semi-cylindrical groove 311 and a second cross-sectional area of a second fuel jet passage defined by the second semi-cylindrical groove 312 is in the range 1.56 to 12.3. This corresponds to the ratio a mentioned in the first embodiment which is defined in the range 1.25 to 3.5. That is, if the ratio in this embodiment is represented as a ratio of square roots. The range is $\sqrt{1.56}$ to $\sqrt{12.3}$ which corresponds to the range 1.25 to 3.5.

The manner of operation of the thus arranged fuel injection valve will be discussed hereinafter.

Figure 62:
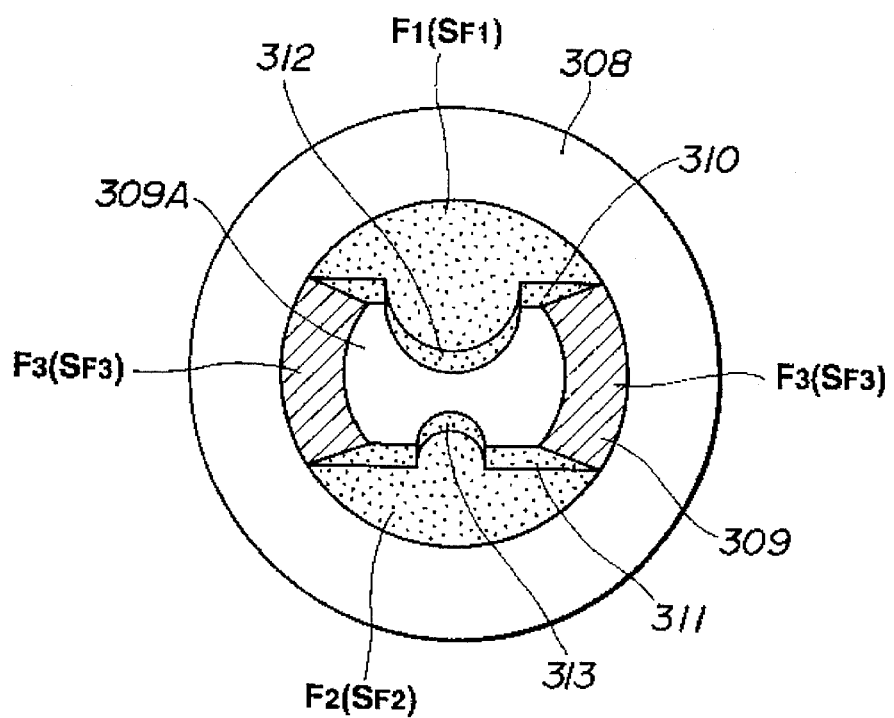
FIG. 62 is a plan view of the needle valve of FIG. 61.

FIG. 62 shows a fuel injecting condition as view from an fuel injected side to the tip end of the valve. When the sheet portion 8 is released from the valve sheet 5, the fuel supplied to the injection hole 303 is injected from first and second dotted portions $F_1$ and $F_2$ and a third portion $F_3$. The first dotted portion $F_1$ is a space defined by the first oblique portion 310, the first groove portion 312 and the nozzle hole 304. The second dotted portion $F_2$ is a space defined by the second oblique portion 311, the second groove portion 313 and the nozzle hole 304. The third portion $F_3$ is a space defined by both second taper portions 309 and the nozzle hole 304.

More finely, projected areas $S_{F1}$, $S_{F2}$ and $S_{F3}$ of the first, second and third portions $F_1$, $F_2$ and $F_3$ on a plane perpendicular to the axis are indicated in FIG. 62.

Although the area of the third portion $F_3$ is looked as if ensuring a big space, the third portion $F_3$ has a large fluid resistance. Almost all amount of the fuel, such as about 88% is injected from the first and second portions $F_1$ and $F_2$. The first oblique portion 310 and the first semi-cylindrical portions 312 are inclined to form an angle $\theta_3$ with the center axis C. The first oblique portion 311 and the first semi-cylindrical portions 313 are inclined to form an angle $\theta_4$ with the center axis C. Further, the representative lines $X_3$ and $X_4$ intersect at the point P on the axis C.

Figure 63:
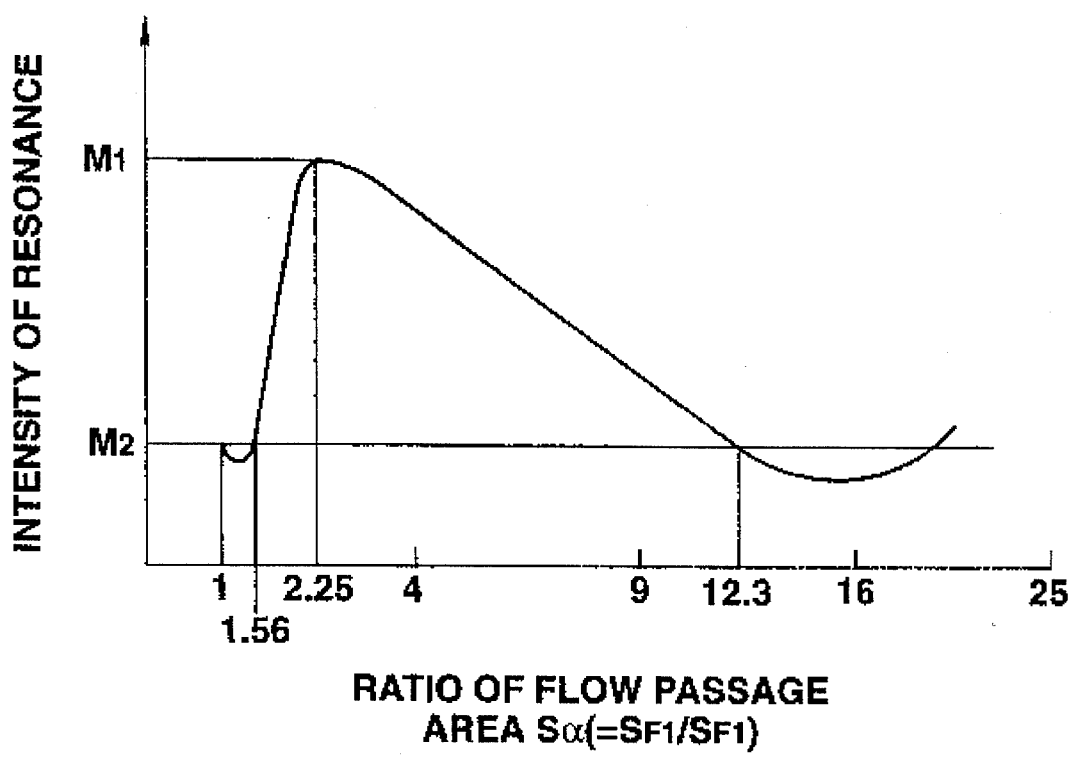
FIG. 63 is a graph which shows a relationship between a ratio of passage cross-sectional areas and an intensity of resonance in the twenty-fourth embodiment.

FIG. 63 shows a relationship between a ratio $S\alpha$ of cross-sectional areas $S_{F1}$ and $S_{F2}$ of the first and second portions $F_1$ and $F_2$ and an intensity of resonance between jets. When the ratio $S\alpha$ was varied within the range 1 to 25, the intensity of the resonance was non-linearly varied. More particularly, when the area ratio $S\alpha$ is set at 1.56, the intensity of the resonance becomes the same as that at 1.0 ratio. The intensity of the resonance takes a maximum M1 when the area ratio $S\alpha$ is set at about 2.25. Then, the intensity is gradually decreased and takes value generally the same as at 1.0 ratio when the area ratio $S\alpha$ is set at 12.3.

This change is the same as the change in the first embodiment. That is, in this embodiment, the ratio is represented as a ratio of the cross-sectional area, and in the first embodiment the ratio is represented as a ratio of a square root of the cross-sectional area. If FIG. 63 is represented relative to the ratio as mentioned in the first embodiment, the same relationship as mentioned in the first embodiment is obtained.

Table 1 shows a comparison of the atomization by this invention and by a conventional feature.

TABLE 1

|  | Fuel Pressure = 20 MPa | Fuel Pressure = 40 MPa |
| --- | --- | --- |
| Conventional direct injection to cylinder | 30–50 μm | 20–30 μm |

TABLE 1-continued

|  | Fuel Pressure = 20 MPa | Fuel Pressure = 40 MPa |
| --- | --- | --- |
| (no fuel collision) Direct injection to cylinder of the present invention $S\alpha = 1$ | 20–35 μm | 14–25 μm |
| Direct injection to cylinder of the present invention $S\alpha = 2.25$ | 15–25 μm | 10–20 μm |

As evident from Table 1, even if the area ratio $S\alpha$ is 1, the atomization of the fuel is improved as compared with a conventional feature. Furthermore, when the area ratio $S\alpha$ is 2.25, the atomization of the fuel is further improved, and an average radius of the atomized fuel drops becomes generally half in diameter as compared with that of the convention method.

With the thus arranged fuel injection valve, since almost all amount of fuel is injected through the passages $F_1$ and $F_2$ to collide the injected fuels with each other for the atomization, a combustion condition becomes stable. This improves fuel consumption, characteristics of exhaust gases and output characteristics. Also, since the needle valve is set to be axially rotatable in the nozzle body, fuel is injected from the passage defined by the nozzle body and the needle valve without clogging.

Figure 64:
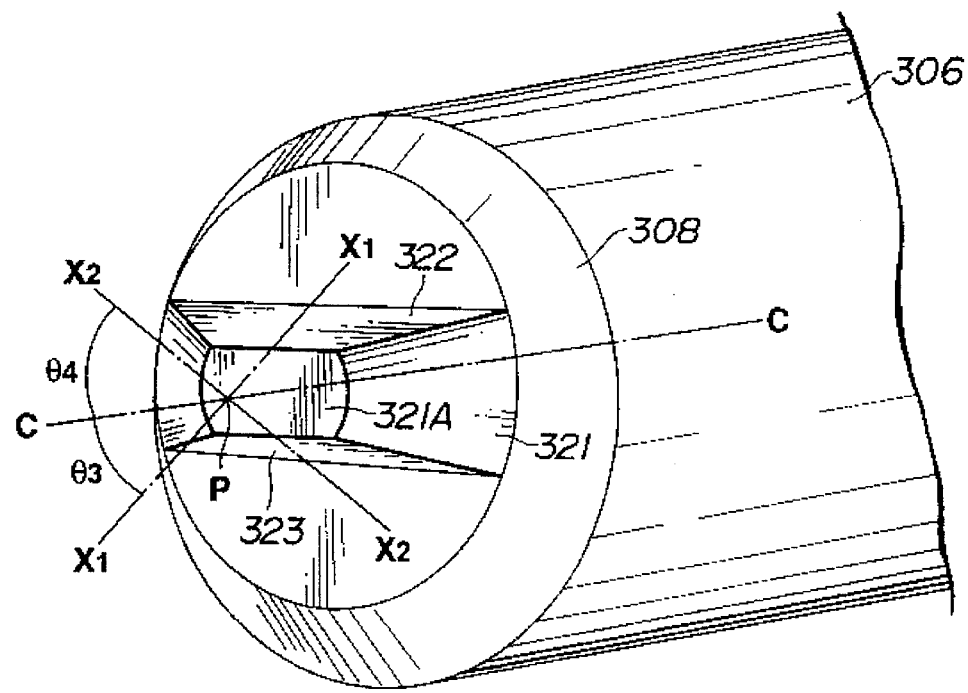
FIG. 64 is a perspective view of a needle valve in the fuel injection valve according to a twenty-fifth embodiment of the present invention.
Figure 65:
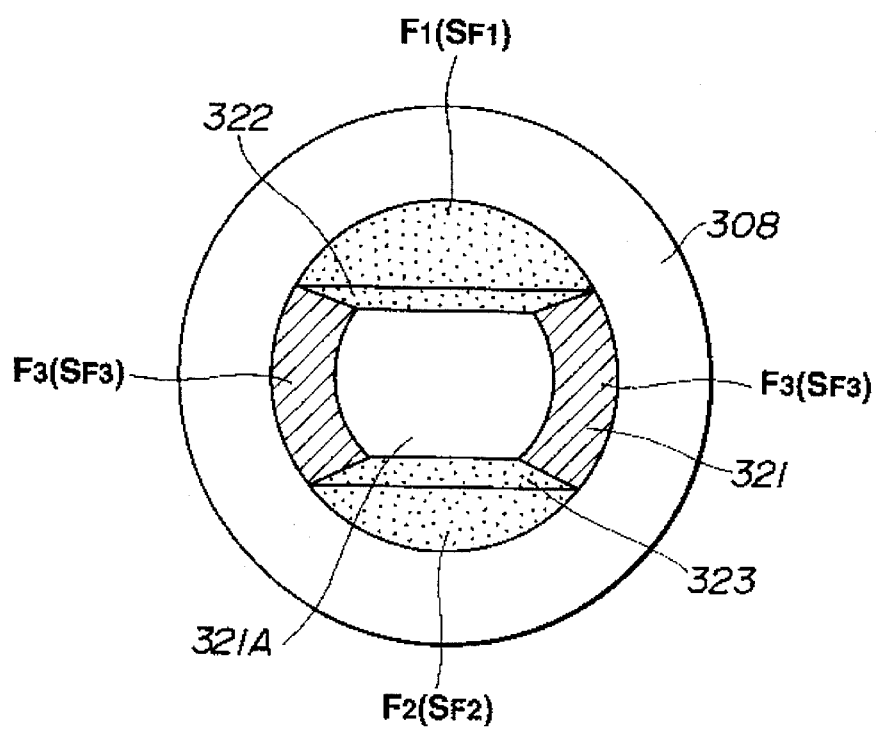
FIG. 65 is a plan view which shows the needle valve of FIG. 64 in an opening condition.

FIGS. 64 and 65 illustrate a twenty-fifth embodiment of the fuel injection valve according to the present invention. In this embodiment, like reference numerals in the twenty-fourth embodiment designate like parts and elements, and explanations thereof are omitted. A second taper portion 321 is arranged to form an angle $\theta_2$ with the center axis C as is the same as the taper portion 309 in the twenty-fourth embodiment. A tip end surface 321A of the second taper portion 321 is perpendicular to the axis C. A first oblique portion 322 and a second oblique portion 323 are integral with the first taper portion 308 and oppositely disposed. The first oblique portion 322 is disposed along an axis $X_1$ which forms an angle $\theta_3$ with the axis C. The second oblique portion 323 is disposed along an axis $X_2$ which forms an angle $\theta_4$ with the axis C. As shown in FIG. 65, a first area $F_1$ is defined by the first oblique portion and the nozzle hole 4, and a second area $F_2$ is defined by the second oblique portion 323 and the nozzle hole 304. In this embodiment, to adjust the ratio $S\alpha$ within the range 1.56–12.3, the angle 4 is set to be larger than the angle $\theta_3$.

With the thus arranged fuel injection valve, advantages gained by the twenty-fourth embodiment are similarly obtained. Although the amount of collided fuel is about 70% since the flow passage areas $S_{F1}$ and $S_{F2}$ are lowered, the productivity of this valve is improved due to its simple structure.

Figure 66:
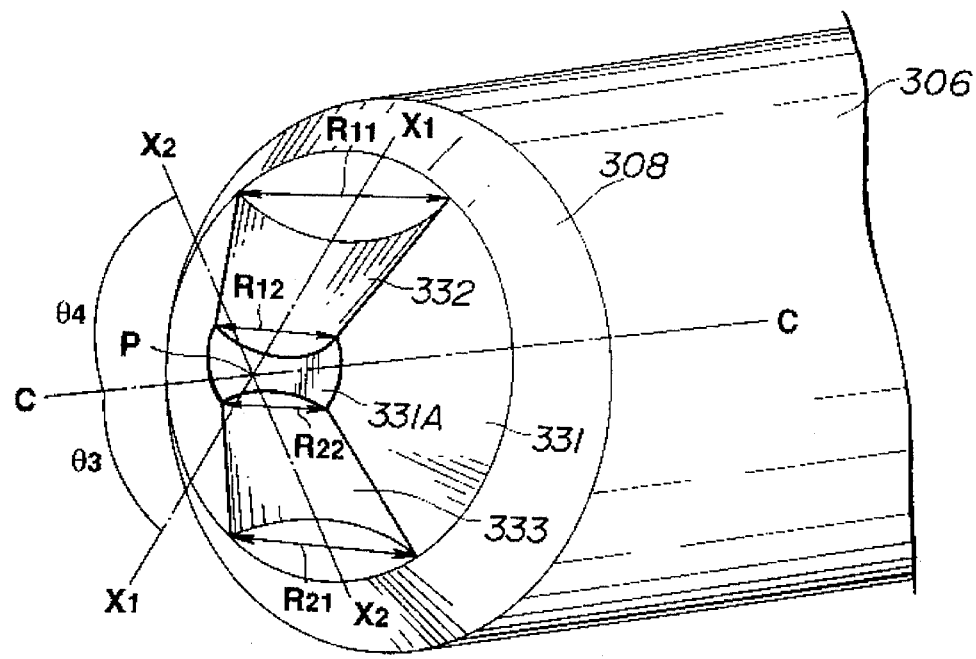
FIG. 66 is a perspective view of a needle valve of the fuel injection valve according to a twenty-sixth embodiment of the present invention.
Figure 67:
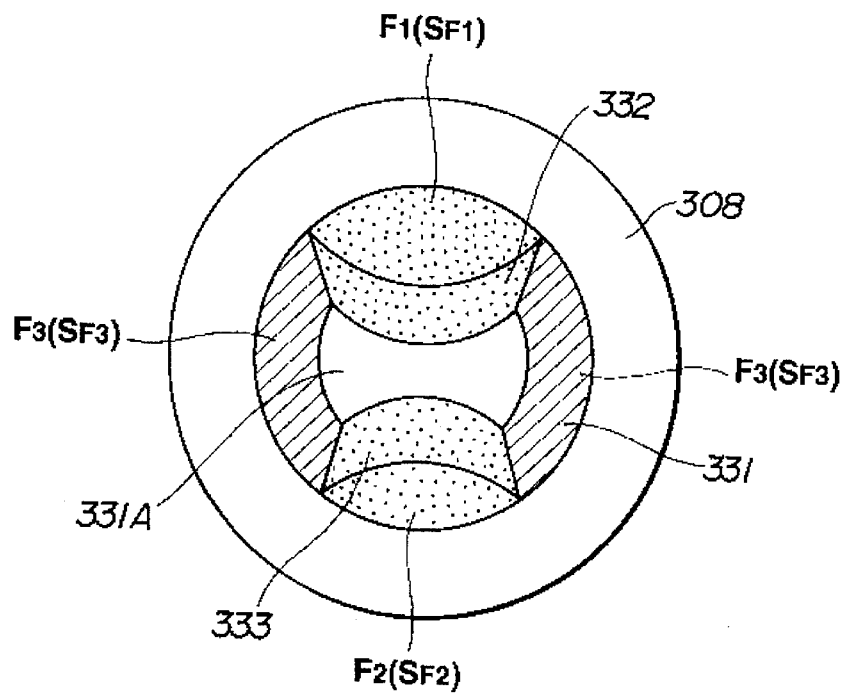
FIG. 67 is a plan view which shows the needle valve of FIG. 66 in an opening condition.

FIGS. 66 and 67 illustrate a twenty-sixth embodiment of the fuel injection valve according to the present invention. As is similar to the twenty-fourth embodiment, a second taper portion 331 is formed integral with the first taper portion 308. A tip end surface 331A is formed to be perpendicular to the center axis C. First and second oblique portions 332 and 333 of a semi-circular groove are formed instead of the flat surfaces in the twenty-fifth embodiment. The first oblique portion 332 is formed so that circular arc thereof gradually becomes small from $R_{11}$ to $R_{12}$ as shown in FIG. 66. Similarly, the second oblique portion 333 is formed so that circular arc thereof gradually becomes small from $R_{21}$ to $R_{22}$. As shown in FIG. 67, a first area $S_{F1}$ and a second area $S_{F2}$ are defined so that a ratio $S\alpha$ between the first and second areas is set within the range 1.56–12.3.

With the thus arranged embodiment, the advantaged gained by the twenty-fourth embodiment are obtained. Although the amount of collided fuel is about 80% since the flow passage areas $S_{F1}$ and $S_{F2}$ are lowered, the productivity of this valve is improved.

FIGS. 68 to 73 illustrate a twenty-seventh embodiment of the fuel injection valve according to the present invention. The fuel injection valve of this embodiment is the same as that of the second embodiment except that this fuel injection valve 410 is arranged to directly inject fuel into a combustion chamber of an engine.

Figure 68:
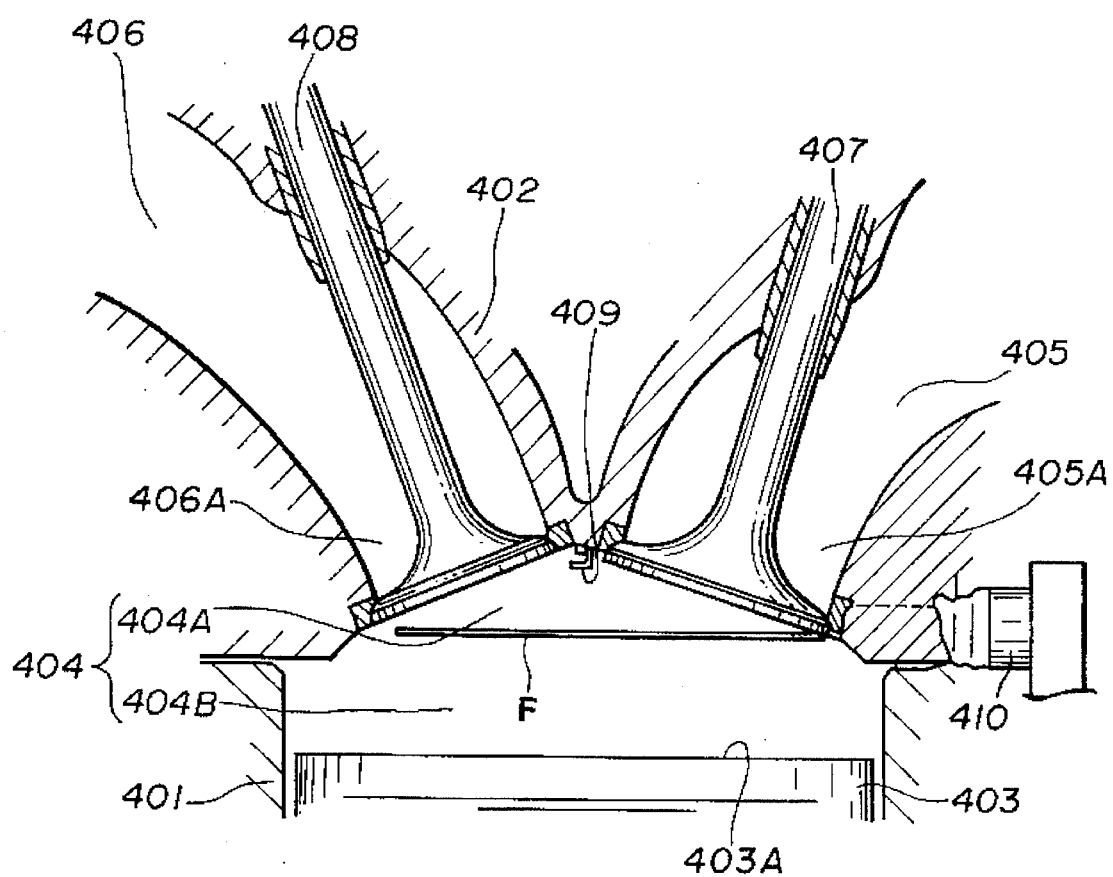
FIG. 68 is a sectional view which shows an essential part of an internal combustion engine to which a fuel injection valve according to a twenty-seventh embodiment of the present invention is applied.
Figure 69:
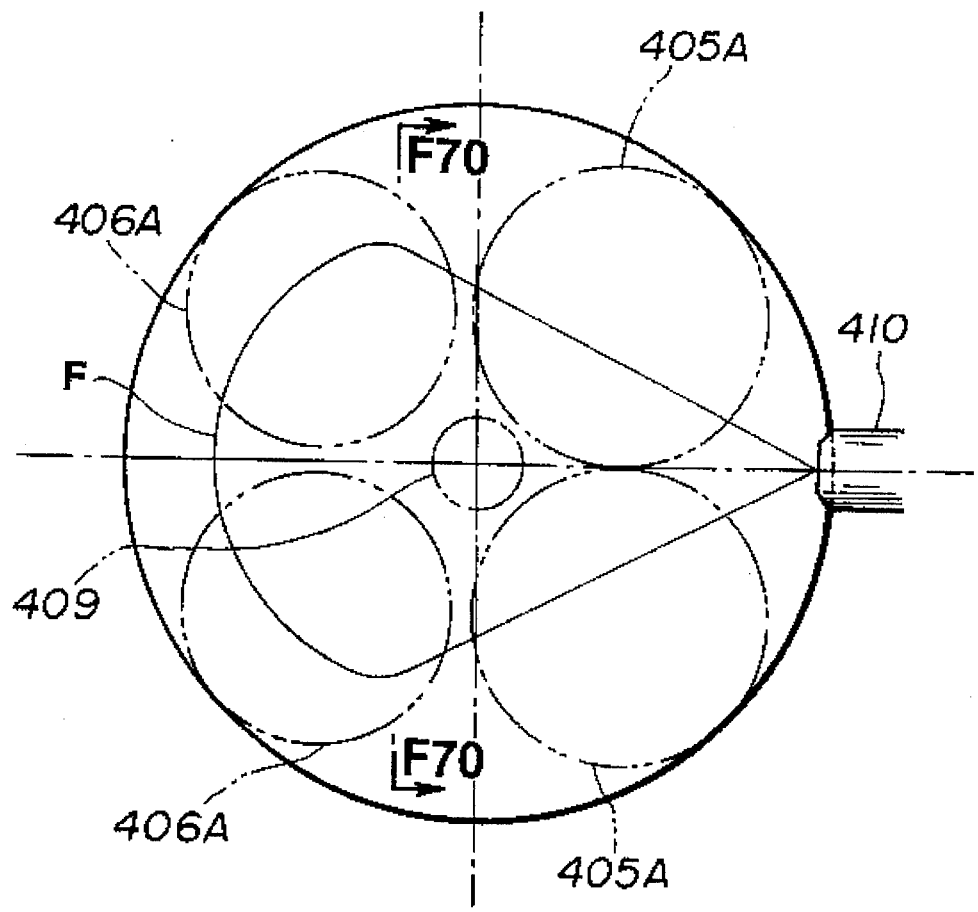
FIG. 69 is a plan view which shows a shape of an injected fuel from the fuel injection valve according to the present invention.
Figure 70:
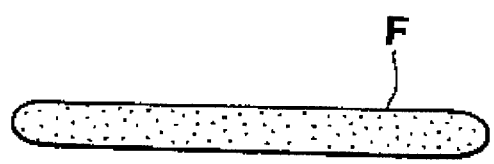
FIG. 70 is a vertical cross-sectional view of the injected fuel in FIG. 69.

As shown in FIG. 68, the fuel injection valve 410 is disposed at a lower portion of a cylinder head 402 and arranged to directly inject fuel into a combustion chamber 404. The combustion chamber 404 is defined by a cylinder 401, a cylinder head 402 including a pent-roof type head, and a top surface 403A of a piston 403. The cylinder head 402 includes a pair of intake ports 405 and a pair of exhaust ports 406 which are communicated with the combustion chamber 404. A pair of intake valves 407 and a pair of exhaust valves 408 are disposed to close and open the intake and exhaust ports 405 and 406, respectively. A spark plug 409 is imbedded in the cylinder head 402 to ignite fuel in the combustion chamber 404. The fuel injection valve 410 is arranged to inject fuel in the direction generally parallel with the head surface 403A. The injected fuel F is flatly splayed and forms generally in a sector shape, as shown in FIGS. 69 and 70.

Figure 71:
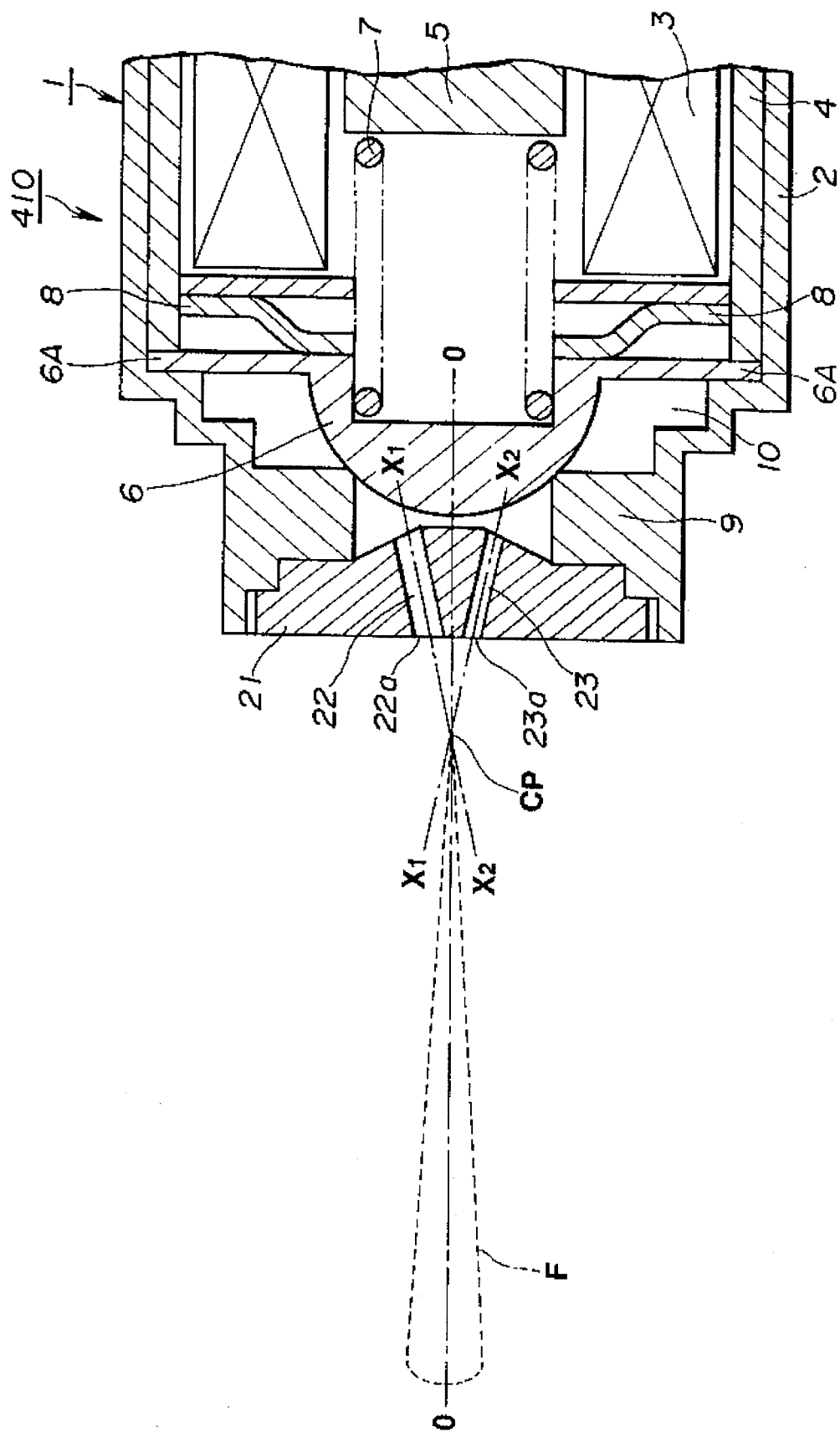
FIG. 71 a sectional view which shows an essential part of the fuel injection valve of FIG. 68.

As shown in FIG. 71, the value body 1 comprises a casing 2 of a stepped cylindrical shape. A magnetic actuator 3 including a coil is installed in the casing 2 through a yoke 4. The magnetic actuator 3 is provided with a space thereinside, and a columnar core 5 made of a magnetic material and a generally semi-spherical valve plug 6 made of a magnetic material are disposed in the space of the casing 2. The valve plug 6 is integrally connected at its peripheral end with a supporting member 6A. An outer peripheral end of the supporting member 6A is fixedly put between the yoke 4 and the casing 2. The valve body 6 is biased by a coil spring 7 and a plate spring 8 so as to put the value into a normal closed position. When the magnetic actuator 6 is energized upon receipt of a signal from a controller (not shown), the valve plug 6 is moved by the core 5 to be separated from a value sheet portion 9. The valve plug 6 moves generally along an axis C of the valve body 1.

The valve sheet portion 9 is formed at a tip end portion of the casing 2. A nozzle tip 21 is sealingly connected to an outer end of the valve sheet portion 9 of the casing 2. The nozzle tip 21 has a first nozzle hole 22 and a second nozzle hole 23. The first nozzle hole 22 is formed straight and elliptical in cross-section, and has a major axis $D_{L1}$, a miner axis $D_{S1}$, and a cross-sectional area $S_{21}$. The second nozzle hole 23 also formed straight and elliptical in cross-section, and has a major axis $D_{L2}$, a miner axis $D_{S2}$ and a cross-sectional area S22. An axis $X_1$ of the first nozzle hole 22 forms an angle $\theta_1$ with an axis C of the valve body 1. On the other hand, an axis $X_2$ of the first nozzle hole 23 forms an angle $\theta_2$ with the axis C. The axes $X_1$ and $X_2$ intersect at a point P on the axis C. The first and second nozzle holes 22 and 23 are formed so that the ratio $\alpha$ between a square root of the cross-sectional area $S_{21}$ and a square root of the cross-sectional area $S_{22}$ is in the range of 1.25–3.50. That is, the relationship is defined as follows:

$$1.25 \leq \alpha = (S_1)^{1/2}/(S_2)^{1/2} \leq 3.50.$$

The manner of operation of the thus arranged fuel injection valve will be discussed hereinafter. The above-mentioned range of the ratio $\alpha$ is determined according the same reason in the first embodiment.

Figure 72:
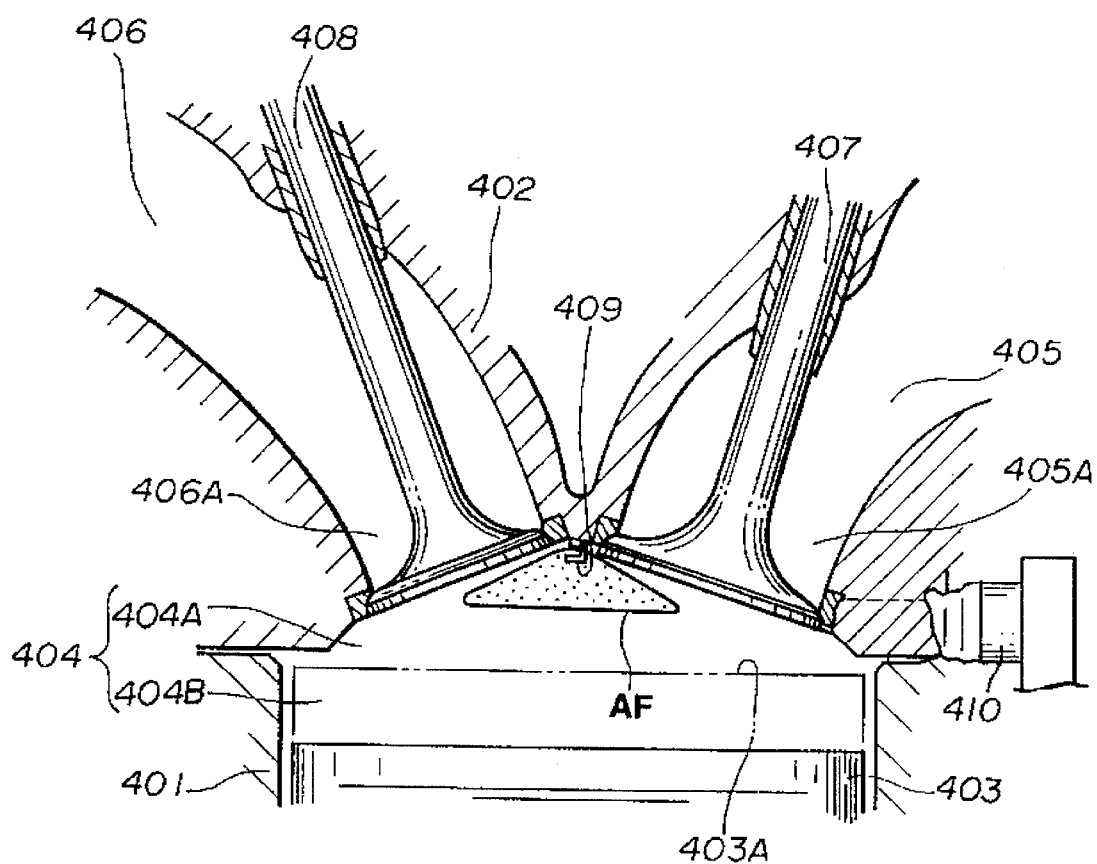
FIG. 72 is an sectional view for explaining a condition of a mixed fuel and air just before ignition in the combustion chamber.
Figure 73:
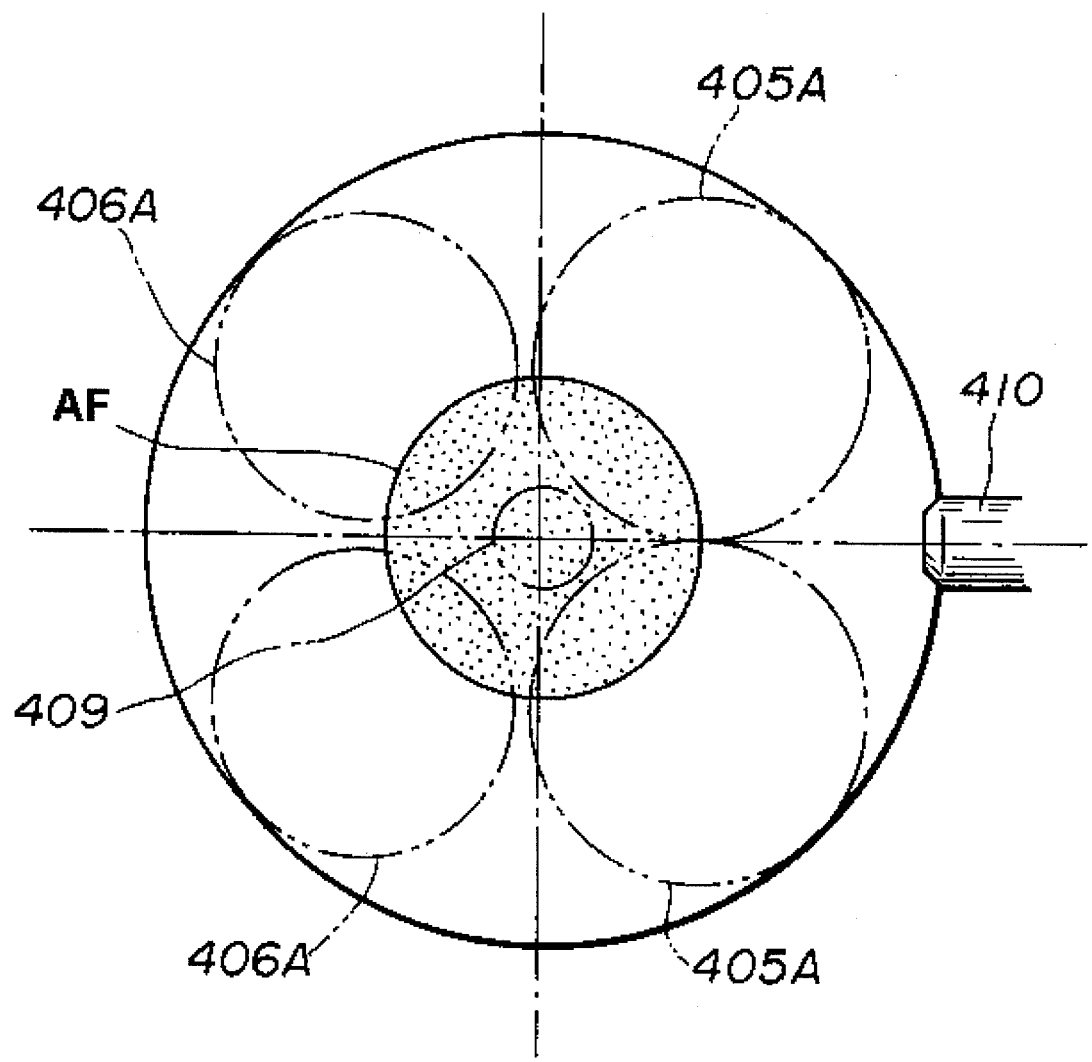
FIG. 73 is a plan view which shows a shape of the mixed fuel and air just before ignition in the combustion chamber.

The magnetic actuator 3 is energized according to a control signal from a controller (not shown) which outputs the signal upon detecting an ignition timing according to a signal from a crank angle sensor (not shown). Then, the valve plug 5 is pulled by the core 5. Therefore, the fuel in a fuel chamber 10 is flowed into a hole 9A of the valve sheet portion 9, and the fuel in supplied to the hole 9a is injected through the first and second nozzle holes 22 and 23 to the outside of the injection valve. The injected fuels through the first and second nozzle holes 22 and 23 are collided with each other at the point P with an angle $\theta_1+\theta_2$. The collided fuel is atomized by the above-mentioned resonance phenomenon and is spread in the combustion chamber 404 to form in a flat sector shape as shown in FIGS. 69 and 70. The atomized fuel F is mixed with heated compressed air in the combustion chamber 404 and moved toward an opposing wall of the cylinder 401. Accordingly, the atomized fuel F is rapidly vaporized and exists as air-fuel mixture AF in the combustion chamber 404. The air-fuel mixture AF is pushed toward an upper portion 404A due to a stroke of the piston 403 toward a TDC (top dead center), and located in the vicinity of the spark plug 409, as shown in FIGS. 72 and 73. This enables the air-fuel mixture AF to exist in the form of a stratum in the combustion chamber 404.

With the thus arranged fuel injection valve, since fuel is immediately vaporized and exists in the form of a stratum of air-fuel mixture in the vicinity of the spark plug in the combustion chamber, the combustion of the engine is smoothly implemented without wetting the spark plug. Furthermore, since the fuel injection is implemented at a time in the vicinity of a spark timing, the fuel is stably formed into a stratum of air-fuel mixture without being influenced by fluctuating flows, such as swirl or tumble. This enables to facilitate a provision of a special device for generation a stratum of air-fuel mixture.

While the invention has been particularly shown and described with reference to preferred embodiments thereof, it is to be understood by those skilled in the art that various modifications and changes in form and details can be made therein without departing from the spirit and scope of the invention.

What is claimed is:

1. A liquid injection valve comprising:

a valve body to which liquid to be injected is supplied;

a nozzle tip connected at an end portion of said valve body;

a valve member installed in said valve body, said valve member stopping and starting a supply of the liquid to said nozzle tip; and means defining first and second nozzle holes in said nozzle tip, said first and second nozzle holes being formed so that liquid injection through said first nozzle hole is collided with liquid injected through said second nozzle hole and that a ratio between a square root of a cross-sectional area of said first nozzle hole and a square root of a cross-sectional area of said second nozzle hole is within a range 1.25 to 3.5.

2. A fuel injection valve comprising:

a casing to which fuel to be injected is supplied;

a valve body for the fuel injection valve;

nozzle tip integrally connected with an end portion of said valve body;

valve member installed in said valve body, said valve member stopping and starting a supply of the fuel to said nozzle tip; and means defining at least three nozzle holes in said nozzle tip, said nozzle holes being formed so that fuel injected through each of said nozzle holes is collided with fuel injected through the other of said nozzle holes and so that a ratio between a square root of a cross-sectional area of at least one of said nozzle holes and a square root of a cross-sectional area of another one of said nozzle holes is larger than 1.2.

3. A fuel injection valve comprising:

a casing to which fuel to be injected is supplied;

a valve body for the fuel injection valve;

a nozzle tip integrally connected with an end portion of said valve body;

a valve member installed in said valve body, said valve member stopping and starting a supply of the fuel to said nozzle tip; and means defining at least four nozzle holes in said nozzle tip, said nozzle holes being formed so that fuel injected through each of said nozzle holes is collided with fuel injected through the other of said nozzle holes and that a cross-sectional area of at least one of said nozzle holes is different from a cross-sectional area of the other of said nozzle holes.

4. A fuel injection valve as claimed in claim 2, wherein said nozzle holes are arranged so that injection axes of said nozzle holes lie in a plane.

5. A fuel injection valve as claimed in claim 3, wherein said nozzle holes are arranged so that injection axes of said nozzle holes lie in a plane.

6. A liquid injection valve as claimed in claim 1, wherein said first and second nozzle holes are formed non-circular in cross-section.

7. A fuel injection valve as claimed in claim 2, wherein said nozzle holes are non-circular in cross-section.

8. A fuel injection valve as claimed in claim 3, wherein said nozzle holes are non-circular in cross-section.

9. A liquid injection valve as claimed in claim 1, further comprising means for injecting air toward a portion in the vicinity of a collision point of the injected liquid through said first and second nozzle holes.

10. A fuel injection valve as claimed in claim 2, further comprising means for injecting air toward a portion in the vicinity of a collision point of the injected fuel through said nozzle holes.

11. A fuel injection valve as claimed in claim 3, further comprising means for injecting air toward a portion in the vicinity of a collision point of the injected fuel through said nozzle holes.

12. A liquid injection valve as claimed in claim 1, wherein said first and second nozzle holes are from so that a ratio between a cross-sectional area of said first nozzle hole and a cross-sectional area of said second nozzle hole is within a range 1.56 to 12.3.

13. A liquid injection valve as claimed in claim 1, wherein an axis of said first nozzle hole and an axis of said second nozzle hole intersect at a point located out of said liquid injection valve.

14. A fuel injection valve as claimed in claim 1, wherein a larger one of said nozzle holes is formed at a portion nearer to an upstream side of cross-section.

15. A liquid injection valve as claimed in claim 1, wherein the liquid injection valve is disposed so as to directly inject fuel into a combustion chamber of an internal combustion engine.

16. A fuel injection valve as claimed in claim 15, wherein the liquid injection valve injects fuel at a time near an ignition timing so that the injected fuel forms a flat sector shape which is generally parallel with a top surface of a cylinder of the engine.

17. A fuel injection valve as claimed in claim 15, wherein the liquid injection valve is disposed so that an axis of the liquid injection valve is generally parallel with a top surface of a cylinder of the engine.

\* \* \* \* \*